United States Patent
Amirichimeh et al.

(10) Patent No.: US 7,450,529 B2
(45) Date of Patent: Nov. 11, 2008

(54) CROSS LINK MULTIPLEXER BUS

(75) Inventors: Abbas Amirichimeh, Irvine, CA (US); Howard Baumer, Laguna Hills, CA (US); Dwight Oda, Cypress, CA (US)

(73) Assignee: Broadcom Corporation, Irvine, CA (US)

( * ) Notice: Subject to any disclaimer, the term of this patent is extended or adjusted under 35 U.S.C. 154(b) by 868 days.

(21) Appl. No.: 10/695,458

(22) Filed: Oct. 29, 2003

(65) Prior Publication Data

US 2004/0141531 A1 Jul. 22, 2004

Related U.S. Application Data

(60) Provisional application No. 60/421,780, filed on Oct. 29, 2002.

(51) Int. Cl.
*H04L 7/00* (2006.01)
*H04L 13/10* (2006.01)

(52) U.S. Cl. .................. 370/304; 370/299; 370/300; 370/301; 370/307; 375/353; 375/355; 375/356; 375/357; 375/359

(58) Field of Classification Search .................. None
See application file for complete search history.

(56) References Cited

U.S. PATENT DOCUMENTS

| | | | |
|---|---|---|---|
| 4,627,070 A * | 12/1986 | Champlin et al. | 375/211 |
| 4,833,605 A | 5/1989 | Terada et al. | |
| 4,833,695 A | 5/1989 | Greub | |
| 5,594,908 A | 1/1997 | Hyatt | |
| 5,617,547 A * | 4/1997 | Feeney et al. | 710/316 |
| 5,793,990 A | 8/1998 | Jirgal et al. | |
| 5,933,021 A | 8/1999 | Mohd | |
| 5,954,811 A | 9/1999 | Garde | |
| 6,137,734 A * | 10/2000 | Schoner et al. | 365/194 |
| 6,215,412 B1 * | 4/2001 | Franaszek et al. | 340/825.02 |

(Continued)

OTHER PUBLICATIONS

International Search Report issued Dec. 14, 2004, for International Application No. PCT/US003/34234, 5 pages.

(Continued)

*Primary Examiner*—Raj Jain
(74) *Attorney, Agent, or Firm*—Sterne, Kessler, Goldstein & Fox P.L.L.C.

(57) ABSTRACT

A cross link multiplexer bus comprising a plurality of cross link multiplexers and a plurality of interconnects. The plurality of cross link multiplexers has a destination port configured to receive a signal and an origin port configured to produce the signal. The plurality of interconnects has a set of interconnects coupled between a pair of adjacent cross link multiplexers. Preferably, the destination port is in a first cross link multiplexer, the origin port is in a second cross link multiplexer, and the first cross link multiplexer is configured to convey the signal toward the second cross link multiplexer in more than one direction. In an embodiment, the signal is capable of being represented as a series of characters, and a character is capable of being represented as a number of bits. Preferably, the plurality of cross link multiplexers includes a delay buffer to delay conveyance of a first bit so that it remains substantially synchronized with a second bit. Preferably, the set of interconnects includes a first interconnect to convey the first bit and a second interconnect to convey the second bit. The lengths of the first and the second interconnects are substantially equal.

34 Claims, 30 Drawing Sheets

U.S. PATENT DOCUMENTS

| | | | |
|---|---|---|---|
| 6,259,693 | B1 | 7/2001 | Ganmukhi et al. |
| 6,317,804 | B1 | 11/2001 | Levy et al. |
| 6,483,849 | B1 | 11/2002 | Bray et al. |
| 7,032,139 | B1 | 4/2006 | Iryami et al. |
| 7,035,228 | B2 | 4/2006 | Baumer |
| 2003/0214974 | A1* | 11/2003 | Beverly et al. .............. 370/476 |

OTHER PUBLICATIONS

*Alaska Quad-Port Gigabit Ethernet Over Copper Transceivers*, from http://www.marvell.com/products/transceivers/quadport/ ...., 1 page, printed May 8, 2007.

*Alaska X10 Gigabit Ethernet Alaska Gigabit Ethernet Fast Ethernet Physical Layer (PHY) Transceiver Families Provide a Full Range of Ethernet Transceiver Solutions for the Broadband Communications Industry*, from http://www.nuhorizons.com/FeaturedProducts/Volume3/Marvell/phy_transceiver.asp, 4 pages, Copyright 2007, printed May 8, 2007.

*Cisco Search: Results for "cdl" within "News@Cisco"*, from http://www.cisco.com/pcgi-bin/search/search.pl, Copyright 1992-2003, printed Jul. 29, 2003.

*Industry Breakthrough: Maxwell Announces the First Quad-Port Transceiver to Support Both Copper and Fiber-Optic Gigabit Ethernet Interfaces*, from Business Wire at www.encyclopedia.com/printable/aspx?id=1G1:68912211, 4 pages, Jan. 9, 2001, printed May 8, 2007.

David Maliniak (ed.), *Bel's integrated connector modules support Marvell's Alaska quad Gigabit Ethernet transceiver*, from http://www.electronicsweb.com/Content/news/ ...., 1 page, Dec. 14, 2000, printed May 8, 2007.

*Marvell Gets Small*, from http://www.lightreading.com/document.asp?doc_id=12004&print=true, 1 page, Feb. 19, 2002, printed May 8, 2007.

*Marvell Introduces the Industry's Smallest Quad-Port Gigabit Transceiver Device, Enabling Ultra High Port Density Enterprise Switching Systems*, from http://www.marvell.com/press/pressNewsDisplay.do?releaseID-41, 3 pages, Feb. 19, 2002, printed May 8, 2007.

*Q&A: Hiroshi Suzuki on Extending Ethernet Beyond the LAN*, from http://newsroom.cisco.com/dlls/innovators/optical.hiroshi_suzuki_qa.html, 3 pages, Copyright 1992-2003, printed Jul. 29, 2003.

Ed Turner and David Law, *IEEE P802.3ae MDC/MDIO*, from http://www.ieee802.org/3/efm/public/sep01/turner_1_0901.pdf, 21 pages, Sep. 17-19, 2001.

* cited by examiner

TABLE 400

| XAUI Protocol | | |
|---|---|---|
| Received From Out of Bus | Communicated Within Bus | Transmitted to Out of Bus |
| 40 data bits | 40 data bits | 80 data bits |
| 4 link bits | 4 link bits | |
| 4 lock bits | 4 lock bits | |
| 4 clock bits | 4 clock bits | 4 clock bits |
| 4 fast clock bits | 4 fast clock bits | |
| 1 CLOCK MODE SELECT bit | 1 CLOCK MODE SELECT bit | |

| CDL Protocol | | |
|---|---|---|
| Received From Out of Bus | Communicated Within Bus | Transmitted to Out of Bus |
| 40 data bits | 40 data bits | 80 data bits |
| 4 link bits | 4 link bits | 4 link bits |
| 4 lock bits | 4 lock bits | 4 lock bits |
| 4 clock bits | 4 clock bits | 4 clock bits |
| 4 fast clock bits | 4 fast clock bits | |
| 1 CLOCK MODE SELECT bit | 1 CLOCK MODE SELECT bit | |

| XGMII Protocol | | |
|---|---|---|
| Received From Out of Bus | Communicated Within Bus | Transmitted to Out of Bus |
| 40 data bits | 80 data bits | 40 data bits |
| 4 lock bits | 4 lock bits | |
| 4 clock bits | 4 clock bits | 4 clock bits |
| 3 MODE SELECT bits | | |
| 1 DIFFERENTIAL CLOCK MODE SELECT bit | 1 CLOCK MODE SELECT bit | 4 output enable bits |

2602 During a First Cycle of a Clock, Convey a First Character From an Input of a First Interconnect to an Output of the First Interconnect

2604 During the First Cycle of the Clock, Convey the First Character From an Input of a Second Interconnect to a Delay Flip-Flop

2606 During a Second Cycle of the Clock, Convey the Second Character From the Input of the First Interconnect to the Output of the First Interconnect

2608 During the Second Cycle of the Clock, Convey the First Character From the Delay Flip-Flop to an Output of the Second Interconnect

2702 Determine a First Time for the First Bit to Be Conveyed
Via a First Interconnect
From a First Cross Link Multiplexer
to a Second Cross Link Multiplexer
When a First Series of Delay Buffers Is Bypassed

2704 Determine a Second Time for the Second Bit to Be
Conveyed Via a Second Interconnect
From the First Cross Link Multiplexer
to the Second Cross Link Multiplexer
When a Second Series of Delay Buffers Is Bypassed

2706 Determine a Desired Delay Time for the First Bit
So That the First Bit Is Synchronized With the Second Bit

2708 Align the First Series of Delay Buffers
to Increase the First Time by the Desired Delay Time
So That the First Bit Is Synchronized With the Second Bit

FIG. 27

CROSS LINK MULTIPLEXER BUS

CROSS-REFERENCE TO RELATED APPLICATIONS

This application claims the benefit of U.S. Provisional Application No. 60/421,780, filed Oct. 29, 2002, which is incorporated herein in its entirety by reference.

BACKGROUND OF THE INVENTION

1. Field of the Invention

The present invention relates to a cross link multiplexer bus.

2. Background Art

Ethernet protocol is a popular technology used to implement Local Area Networks (LANs), and was originally developed in the late 1970s. In 1985, Ethernet was adopted by the Standards Board of the Institute of Electrical and Electronics Engineers Standards Association (IEEE-SA) as IEEE Std 802.3® entitled "Carrier Sense Multiple Access with Collision Detection (CSMA/CD) Access Method and Physical Layer Specifications". Since its initial release, IEEE Std 802.3 has been amended on several occasions to capture the benefits of advances in networking technologies and to drive the development of future advancements. For example, the IEEE-SA has approved an amendment for "Media Access Control (MAC) Parameters, Physical Layers, and Management Parameters for 10 Gb/s Operation" to IEEE Std 802.3. The amended standard is designated IEEE Std 802.3ae™. The technology it supports is commonly referred to as "10 Gigabit Ethernet" and it represents a substantial increase in the speed at which signals can be communicated over an Ethernet medium.

IEEE Std 802.3ae introduced Clause 48 entitled "Physical Coding Sublayer (PCS) and Physical Medium Attachment (PMA) Sublayer, Type 10GBASE-X." 10GBASE-X refers to a family of 10 Gb/s Physical Layer implementations. FIG. 1 shows the relationships among the 10GBASE-X sublayers and other layers in the CSMA/CD LAN hierarchy. The 10 Gigabit Media Independent Interface (XGMII) protocol is used to communicate between the Reconciliation Sublayer (RS) and the PCS. XGMII characters are converted to code groups by the PCS. The code groups are communicated in a parallel format to the medium by the Media Dependent Interface (MDI), which is used to communicate between the Physical Medium Dependent (PMD) sublayer and the medium. Optionally, XGMII Extender Sublayers (XGXSs) can be used to extend the operational distance of the XGMII. A Data Terminal Equipment (DTE) XGXS can be coupled to the RS and a Physical (PHY) XGXS can coupled to the Physical layer. The 10 Gigabit Attachment Unit Interface (XAUI) protocol can be used to communicate between the DTE XGXS and the PHY XGXS.

Manufacturers of network devices can implement the requirements of the Ethernet processes in any manner they choose. They are also free to include other processes so long as these do not conflict with the standard. Network devices that meet these criteria are said to be compliant with the standard. For example, Cisco Systems, Inc. developed the Converged Data Link (CDL) protocol, which can increase the distance over which signals are communicated over an Ethernet medium.

A signal is conveyed by a bus. Traditionally, a bus is configured to convey a signal received at a destination port directly to an origin port. Systems having more than two ports can use a cross link multiplexer at each destination port to route the signal directly to a desired origin port. Such a bus is referred to as a cross link multiplexer bus. The signal is often represented as a series of characters, which in turn can be represented by data bits and control bits. What is needed is a cross link multiplexer bus configured so that the bits of a character remain synchronized as they are conveyed in parallel by interconnects within the cross link multiplexer bus.

BRIEF SUMMARY OF THE INVENTION

The present invention relates to a cross link multiplexer bus. The cross link multiplexer bus of the present invention comprises a plurality of cross link multiplexers and a plurality of interconnects. In an embodiment, the plurality of cross link multiplexers has a destination port configured to receive a signal and an origin port configured to produce the signal. A set of interconnects of the plurality of interconnects is coupled between a pair of adjacent cross link multiplexers of the plurality of cross link multiplexers. A first interconnect of the set of interconnects has a first length. A second interconnect of the set of interconnects has a second length. The first length and the second length are substantially equal. In one configuration, the plurality of cross link multiplexers can be arranged in a substantially circular configuration. In another configuration, the plurality of cross link multiplexers can be arranged in a substantially spherical configuration. In yet another configuration, a cross link multiplexer of the plurality of cross link multiplexers can comprise a cross link multiplexer pair. Optionally, the signal can be represented as a series of characters. A character of said series of characters can be represented as a number of bits. The first interconnect can be configured to convey a first bit of the number of bits. The second interconnect can be configured to convey a second bit of the number of bits. Preferably, the first bit remains substantially synchronized with the second bit.

In another embodiment, the plurality of cross link multiplexers has a destination port configured to receive a signal, at least one delay buffer configured to delay conveyance of the signal, and an origin port configured to produce the signal. A set of interconnects of the plurality of interconnects is coupled between a pair of adjacent cross link multiplexers of the plurality of cross link multiplexers. Optionally, the signal can be represented as a series of characters. A character of the series of characters can be represented as a number of bits. An interconnect of the set of interconnects can be configured to convey a first bit of the number of bits. A delay buffer of the at least one delay buffer can be configured to convey the first bit. In a configuration, the delay buffer can be one of a series of delay buffers. The series of delay buffers can be capable of conveying the first bit through the delay buffer. The series of delay buffers can be capable of bypassing the first bit around the delay buffer. The cross link multiplexer can have a control circuit. The control circuit can be capable of aligning the series of delay buffers to be capable of conveying the first bit through the delay buffer or bypassing the first bit around the delay buffer. Preferably, the control circuit is configured to align the series of delay buffers so that the first bit remains substantially synchronized with a second bit of the number of bits.

In yet another embodiment, the plurality of cross link multiplexers has a first cross link multiplexer with a destination port configured to receive a signal and a second cross link multiplexer with an origin port configured to produce the signal. A set of interconnects of the plurality of interconnects is coupled between a pair of adjacent cross link multiplexers of the plurality of cross link multiplexers. The first cross link multiplexer is configured to convey the signal toward the second cross link multiplexer in a first direction via a first interconnect of the plurality of interconnects and in a second direction via a second interconnect of the plurality of interconnects. The first direction is substantially different from the second direction. In a configuration, the plurality of cross link multiplexers can have a third cross link multiplexer adjacent in the first direction to the first cross link multiplexer. The third cross link multiplexer can be configured to convey the signal toward the second cross link multiplexer. In another configuration, the plurality of cross link multiplexers can have a third cross link multiplexer adjacent to the second multiplexer. The second cross link multiplexer can be configured to receive the signal from the third cross link multiplexer.

In still another embodiment, the plurality of cross link multiplexers has a destination port configured to receive a signal and an origin port configured to produce the signal. A set of interconnects of the plurality of interconnects is coupled between a pair of adjacent cross link multiplexers of the plurality of cross link multiplexers. The signal is represented as a series of characters. A character of the series of characters is a number of bits. At least one of the plurality of cross link multiplexers and the plurality of interconnects is configured so that a first bit of the number of bits remains substantially synchronized with a second bit of the number of bits. In one configuration, the plurality of cross link multiplexers can be configured to delay conveyance of the first bit by a gate delay time. The plurality of interconnects can be configured to delay conveyance of the second bit by a path delay time. The gate delay time and the path delay time can be set so that the first bit remains substantially synchronized with the second bit. In another configuration, a first cross link multiplexer of the plurality of cross link multiplexers can be configured to process the signal formatted according to a first physical layer communications protocol. The first physical layer communications protocol can be a 10 Gigabit Media Independent Interface (XGMII) protocol. A second cross link multiplexer of the plurality of cross link multiplexers can be configured to process the signal formatted according to a second physical layer communications protocol. The second physical layer communications protocol can be a 10 Gigabit Attachment Unit Interface (XAUI) protocol. The second physical layer communications protocol can be a Converged Data Link (CDL) protocol. Optionally, the first cross link multiplexer can be configured to reformat the signal formatted according to the first physical layer communications protocol.

The present invention also relates to methods of conveying a signal across a cross link multiplexer bus. In an embodiment, the present invention comprises a method for conveying a signal across a cross link multiplexer bus. The signal can be received at a first cross link multiplexer of the cross link multiplexer bus. The signal is conveyed from the first cross link multiplexer in a first direction toward a second cross link multiplexer of the cross link multiplexer bus. The signal is also conveyed from the first cross link multiplexer in a second direction toward the second cross link multiplexer. In a configuration, the signal can be received from the first cross link multiplexer in the first direction at a third cross link multiplexer of the cross link multiplexer bus. Optionally, the signal can be conveyed from the third cross link multiplexer in the first direction toward the second cross link multiplexer. In another configuration, the signal can be received at the second cross link multiplexer from a third cross link multiplexer of the cross link multiplexer bus. The signal can be transmitted from the second cross link multiplexer.

In another embodiment, the present invention comprises a method for conveying, in parallel, bits of a character of a signal across a cross link multiplexer bus. A first bit of the bits is conveyed from a first cross link multiplexer of the cross link multiplexer bus to a second cross link multiplexer of the cross link multiplexer bus. A second bit of the bits is conveyed from the first cross link multiplexer to the second cross link multiplexer. The conveyance of the first bit is delayed so that the first bit remains substantially synchronized with the second bit. For example, the first bit can be conveyed through a delay buffer.

In yet another embodiment, the present invention comprises a method for conveying a signal across a cross link multiplexer bus. The signal can be received at a first cross link multiplexer of the cross link multiplexer bus. The signal is conveyed from the first cross link multiplexer to a second cross link multiplexer of the cross link multiplexer bus. The signal is converted from a first format to a second format. The signal can be converted at the first cross link multiplexer or the second cross link multiplexer. Optionally, the signal can be reconverted from the second format to the first format. Optionally, bits of a character of the signal can be synchronized. For example, each bit can be conveyed through a corresponding delay flip-flop. A bit can also be conveyed through a delay buffer. The signal can be transmitted from the second cross link multiplexer.

In a configuration, the signal is capable of being represented as a series of characters. One character of the series of characters can be conveyed during one cycle of a clock that controls conveyance of the signal. The first format can have a first number of bits for data for a first character. The second format can have a second number of bits for data for the first character and data for a second character. During a first cycle of a clock, a first character is conveyed from an input of a first interconnect to an output of the first interconnect. Also during the first cycle of the clock, the first character is conveyed from an input of a second interconnect to a delay flip-flop. During a second cycle of the clock, the second character is conveyed from the input of the first interconnect to the output of the first interconnect. Also during the second cycle of the clock, the first character is conveyed from the delay flip-flop to an output of the second interconnect.

In still another embodiment, the present invention comprises a method, in a cross link multiplexer bus configured to convey a signal in which a character is represented by a first bit and a second bit, for synchronizing the first bit and the second bit. A first time is determined for the first bit to be conveyed via a first interconnect from a first cross link multiplexer to a second cross link multiplexer when a first series of delay buffers is bypassed. A second time is determined for the second bit to be conveyed via a second interconnect from the first cross link multiplexer to the second cross link multiplexer when a second series of delay buffers is bypassed. The second time is greater than the first time. A desired delay time is determined for the first bit so that the first bit is synchronized with the second bit. The first series of delay buffers is aligned to increase the first time by the desired delay time so that the first bit is synchronized with the second bit. For example, the first series of delay buffers can be configured so that the first bit can be conveyed through a first delay buffer of the first series of delay buffers. The first series of delay buffers can also be configured so that the first bit can bypass a second delay buffer of the first series of delay buffers.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 4 shows a table 400 that summarizes, for different protocols, the formatting of signals received from outside of bus 300, communicated within bus 300, and transmitted to outside of bus 300.

FIG. 26 shows a flow chart of a method 2600 for an embodiment of converting the signal from the first format to the second format.

FIG. 27 shows a flow chart of a method 2700, in a cross link multiplexer bus configured to convey a signal in which a character is represented by a first bit and a second bit, for synchronizing the first bit and the second bit.

The preferred embodiments of the invention are described with reference to the figures where like reference numbers indicate identical or functionally similar elements. Also in the figures, the left most digit of each reference number identifies the figure in which the reference number is first used.

DETAILED DESCRIPTION OF THE INVENTION

The cross link multiplexer bus of the present invention comprises a collection of bus multiplexers arranged so that each bus multiplexer is substantially equidistant from all of its adjacent bus multiplexers. In a two-dimensional embodiment, such an arrangement can be realized with a substantially circular configuration. In a three-dimensional embodiment, such an arrangement can be realized with a substantially spherical configuration. Rather than conveying a signal received at a destination port directly to an origin port, a signal received at a destination port of a multiplexer of the bus of the present invention is routed to an origin port outside of the multiplexer in multiple directions via adjacent multiplexers. To facilitate maintaining signals in synchronization as they are simultaneously conveyed from a first bus multiplexer to an adjacent second bus multiplexer, the bus of the present invention can be configured so that the lengths of all of the interconnects between two adjacent multiplexers are substantially the same.

Figure 1:
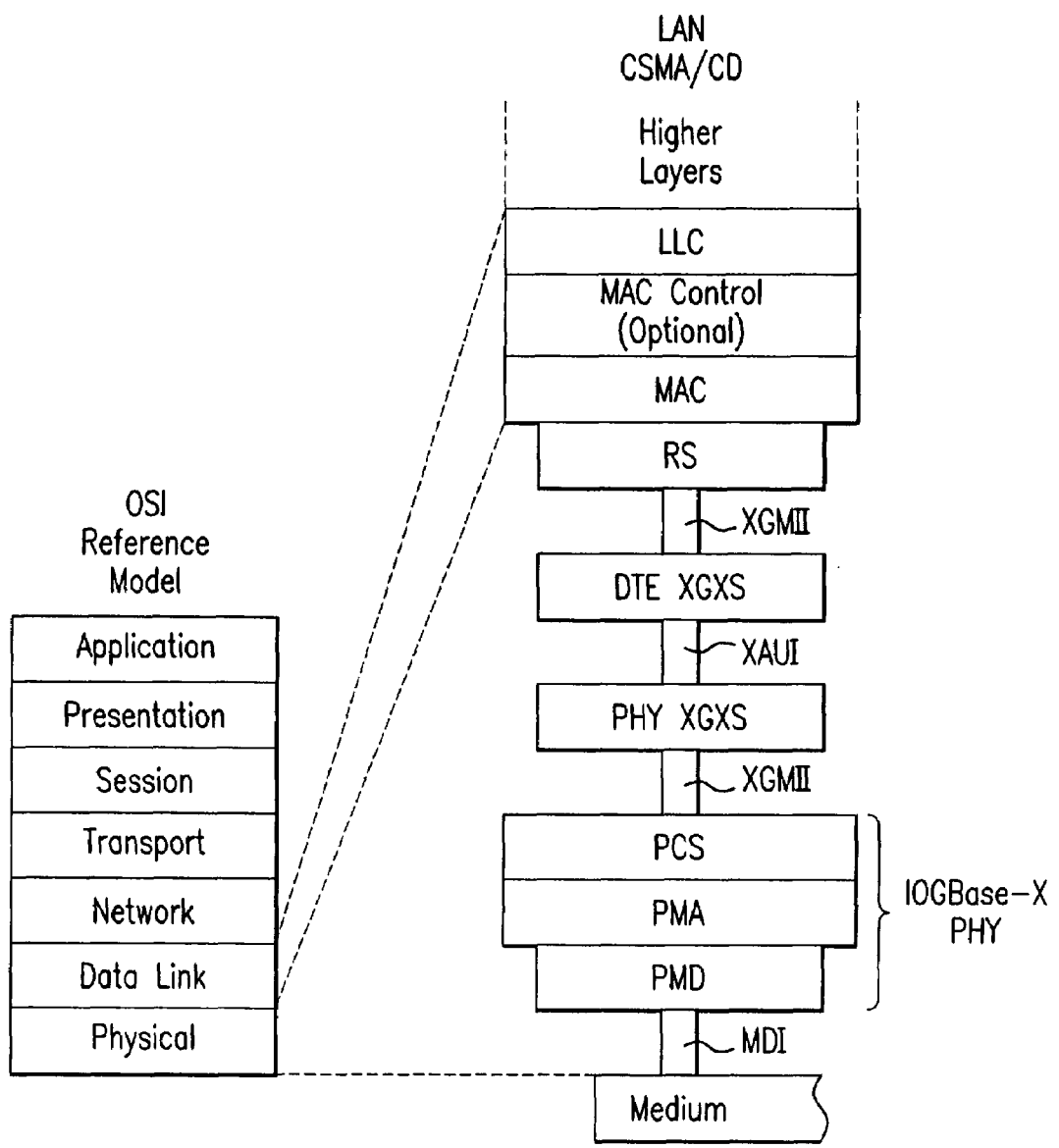
FIG. 1 shows the relationships among the 10GBASE-X sublayers and other layers in the CSMA/CD LAN hierarchy.
Figure 2:
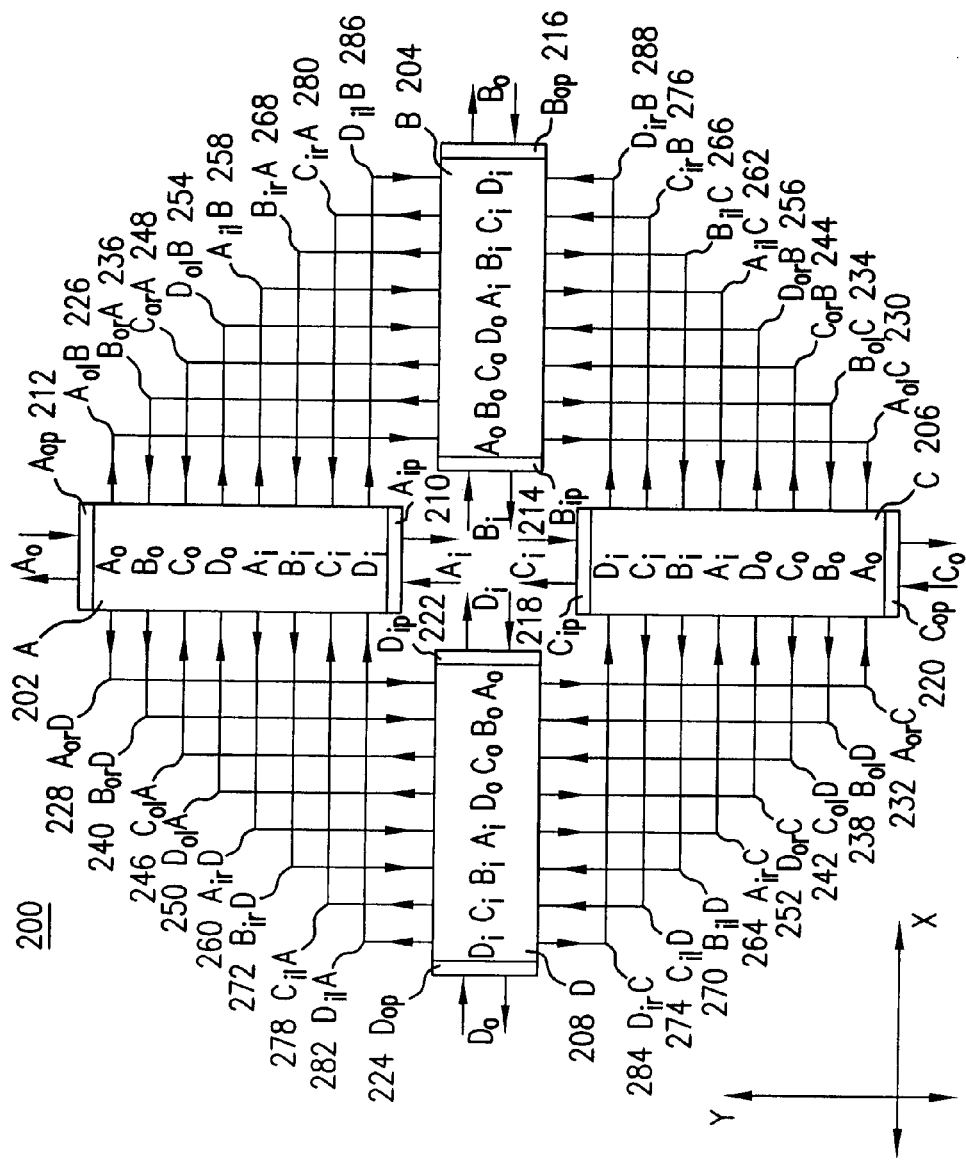
FIG. 2 is a block diagram of an example of a cross link multiplexer bus 200 in the manner of the present invention.

FIG. 2 is a block diagram of an example of a cross link multiplexer bus 200 in the manner of the present invention. Bus 200 includes, for example, four bus multiplexers: A 202, B 204, C 206, and D 208 arranged in a substantially circular configuration. In bus 200, the distance between adjacent multiplexers A 202 and B 204 is substantially the same as the distance between adjacent multiplexers A 202 and D 208. Likewise, the distance between adjacent multiplexers C 206 and B 204 is substantially the same as the distance between adjacent multiplexers C 206 and D 208. Bus 200 could be configured to include more or fewer bus multiplexers.

Advantageously, with the bus multiplexers arranged in a substantially circular configuration, a bus multiplexer can be configured with at least one internal port (located near the center of the circular configuration) and at least one external port (located along the circumference of the circular configuration). For example, multiplexer A 202 has at least one internal port $A_{ip}$ 210 and at least one external port $A_{op}$ 212, multiplexer B 204 has at least one internal port $B_{ip}$ 214 and at least one external port $B_{op}$ 216, multiplexer C 206 has at least one internal port $C_{ip}$ 218 and at least one external port $C_{op}$ 220, and multiplexer D 208 has at least one internal port $D_{ip}$ 222 and at least one external port $D_{op}$ 224. Each at least one internal port can receive and transmit at least one internal signal: $A_{ip}$ 210 can receive and transmit $A_i$, $B_{ip}$ 214 can receive and transmit $B_i$, $C_{ip}$ 218 can receive and transmit $C_i$, and $D_{ip}$ 222 can receive and transmit $D_i$. Likewise, each at least one external port can receive and transmit at least one external signal: $A_{op}$ 212 can receive and transmit $A_o$, $B_{op}$ 216 can receive and transmit $B_o$, $C_{op}$ 220 can receive and transmit $C_o$, and $D_{op}$ 224 can receive and transmit $D_o$.

Rather than conveying a signal received at a destination port directly to an origin port, a signal received at a destination port of a multiplexer of bus 200 can be routed to an origin port outside of the multiplexer in two directions via adjacent multiplexers. For example, signal $A_i$ is received by internal port $A_{ip}$ 210 of multiplexer A 202. If the origin port of signal $A_i$ is not at multiplexer A 202 (e.g., it is not external port $A_{op}$ 212), multiplexer A 202 routes signal $A_i$ to multiplexer B 204 via an interconnect $A_{ii}B$ 258 and to multiplexer D 208 via an interconnect $A_{ii}D$ 260. If the origin port of signal $A_i$ is at multiplexer B 204, multiplexer B 204 routes signal $A_i$ to its origin port. Otherwise, multiplexer B 204 routes signal $A_i$ to multiplexer C 206 via an interconnect $A_{ii}C$ 262. Likewise, if the origin port of signal $A_i$ is at multiplexer D 208, multiplexer D 208 routes signal $A_i$ to its origin port. Otherwise, multiplexer D 208 routes signal $A_i$ to multiplexer C 206 via an interconnect $A_{ii}C$ 264. If the origin port of signal $A_i$ is not at multiplexers A 202, B 204, or D 208, then the origin port of signal $A_i$ is at multiplexer C 206.

At any given point in time, an interconnect can only convey a finite number of signals. Therefore, a signal should not unnecessarily be conveyed from multiplexer to multiplexer. To avoid this, bus 200 can be configured so that the signal is not routed beyond a multiplexer that is the maximum number of adjacent multiplexers removed from the multiplexer of the destination port. For example, signal $A_i$ is not routed beyond multiplexer C 206. Multiplexer C 206 is two adjacent multiplexers removed from multiplexer A 202, which for bus 200 is the maximum number of multiplexers removed from the multiplexer of the origin port. Signal $A_o$ is likewise not routed beyond multiplexer C 206. Signals $B_i$ and $B_o$ are not routed beyond multiplexer D 208; signals $C_i$ and $C_o$ are not routed beyond multiplexer A 202; and signals $D_i$ and $D_o$ are not routed beyond multiplexer B 204.

Often a first device coupled to a first bus multiplexer of bus 200 will simultaneously need to convey more than one signal to a second device coupled to a second bus multiplexer of bus 200. In this situation it can be important that the signals remain synchronized as they are conveyed. To facilitate this, bus 200 can be configured so that the lengths of all of the interconnects between two adjacent multiplexers are substantially the same. By having the lengths of all of the interconnects between two adjacent multiplexers substantially the same, the time consumed for the signals to traverse their respective interconnects (i.e., the path delay time) should be substantially the same. For example, a first device (not shown) coupled to multiplexer A 202 may simultaneously need to communicate signals $A_i$ and $A_o$ to a second device (not shown) coupled to multiplexer B 204. To facilitate synchronization between signals $A_i$ and $A_o$, interconnects $A_{ii}B$ 258 and $A_{oi}B$ 226 are configured to have the same length. Interconnect $A_{ii}B$ 258 measures, for example, six units along the abscissa and five units along the ordinate for a total length of eleven units. Likewise, interconnect $A_{oi}B$ 226 measures two units along the abscissa and nine units along the ordinate for a total length of eleven units.

The two-dimensional configuration of bus 200 can be extended to a third dimension. In bus 200, multiplexers B 204 and D 208 are substantially aligned along an x-axis and multiplexers A 202 and C 206 are substantially aligned along a y-axis. The y-axis is perpendicular to the x-axis. A z-axis (not shown), which extends into and out of the page and is perpendicular to both the x- and y-axes, could be added. Two additional multiplexers (not shown) could be added and substantially aligned along the z-axis. The bus multiplexers would be arranged in a substantially spherical configuration. In such a three-dimensional configuration, each multiplexer would have four adjacent multiplexers. The distance between any two adjacent multiplexers would be substantially the same as the distance between any other two adjacent multiplexers. From any given multiplexer, interconnects would be routed to each of its adjacent multiplexers. The lengths of all of the interconnects between any two adjacent multiplexers would be substantially the same.

Figure 3A:
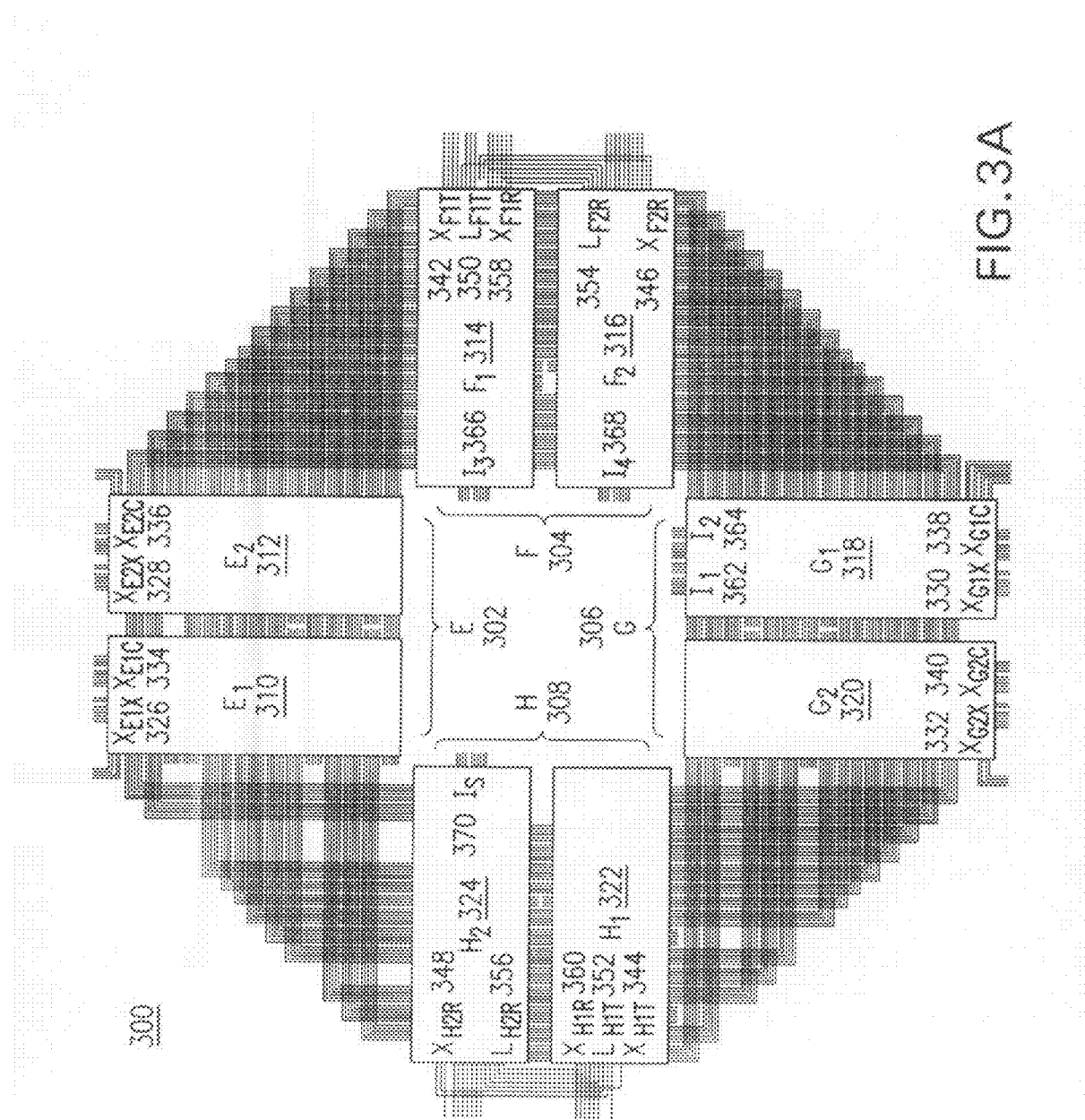
FIG. 3A is a block diagram of an embodiment of a cross link multiplexer bus 300 in the manner of the present invention.

FIG. 3A is a block diagram of an embodiment of a cross link multiplexer bus 300 in the manner of the present invention. Bus 300 includes, for example, four cross link bus multiplexer pairs: E 302, F 304, G 306, and H 308 arranged in a substantially circular configuration. Each cross link bus multiplexer bus pair can comprise two cross link bus multiplexers that are coupled together by interconnects. For example, bus multiplexer pair E 302 comprises bus multiplexers $E_1$ 310 and $E_2$ 312; bus multiplexer pair F 304 comprises bus multiplexers $F_1$ 314 and $F_2$ 316; bus multiplexer pair G 306 comprises bus multiplexers $G_1$ 318 and $G_2$ 320; and bus multiplexer pair H 308 comprises bus multiplexers $H_1$ 322 and $H_2$ 324. In bus 300, the distance between adjacent multiplexer pairs E 302 and F 304 is substantially the same as the distance between adjacent multiplexer pairs E 302 and H 308. Likewise, the distance between adjacent multiplexer pairs G 306 and F 304 is substantially the same as the distance between adjacent multiplexer pairs G 306 and H 308. The lengths of all of the interconnects between two adjacent multiplexer pairs are substantially the same.

Bus 300 can be configured to convey signals formatted according to a variety of physical layer communications protocols, and to convert signal formats from one communications protocol to another. For example, bus 300 can be configured to support the 10 Gigabit Attachment Unit Interface (XAUI) protocol, the Converged Data Link (CDL) protocol, and the 10 Gigabit Media Independent Interface (XGMII) protocol. XGMII protocol and CDL protocol are examples of parallel formatted protocols, while XAUI protocol is an example of a serial formatted protocol. Each of these protocols can use data bits and control bits to represent a character. Depending upon variations in data rate, bit width, or both, different numbers of data bits can be used. For example, each of these protocols has a 40-bit configuration and an 80-bit configuration. Devices that implement each of these protocols will first assemble the bits that represent the character in a register before transmitting them according to the protocol. For XGMII protocol and CDL protocol, the bits are simultaneously transmitted in parallel. For XAUI protocol, the bits are divided into four lanes. Each lane has an equal number of bits. The bits in each lane are transmitted in series, but the four lanes are simultaneously transmitted in parallel. However, in terms of interfacing with bus 300 or communicating within it, all of the bits are simultaneously transmitted and received in parallel.

In an embodiment, interconnects in bus 300 that communicate power, ground, or control bits can be positioned between interconnects that communicate data bits in order to reduce cross-talk due to inductive and capacitive couplings.

Furthermore, if interconnects in bus 300 are fabricated in different layers within an integrated circuit chip, then interconnects in a first layer that communicate power, ground, or control bits can be positioned above or below interconnects in a second layer that communicate data bits in order to reduce cross-talk. For example, FIGS. 3B and 3C show exemplary configurations of interconnects in the manner of the present invention.

Figure 3C:
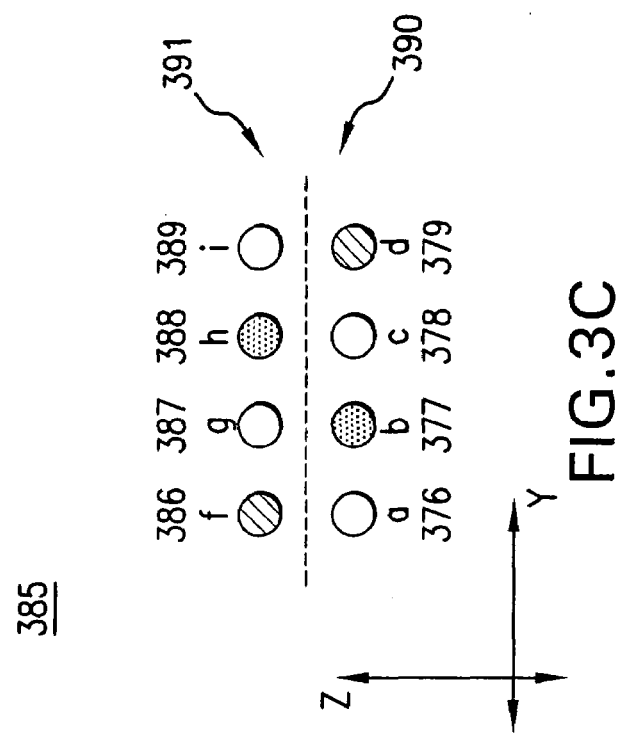
FIGS. 3B and 3C show exemplary configurations of interconnects in the manner of the present invention.
Figure 3B:
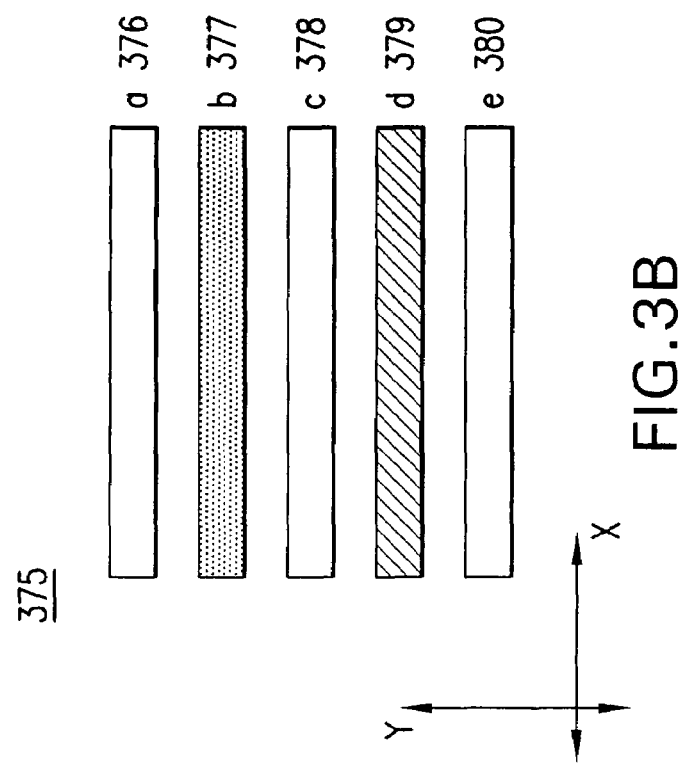

FIG. 3B shows portions of a set 375 of interconnects configured in a manner to reduce cross-talk: a 376, b 377, c 378, d 379, and e 380. Interconnects a 376, b 377, c 378, d 379, and e 380 can be aligned substantially along an x-axis. Interconnects a 376, b 377, c 378, d 379, and e 380 can be fabricated on a common layer within an integrated circuit chip. Interconnect a 376 can be configured to convey a first data bit. Interconnect b 377 can be configured to convey a control bit. Interconnect c 378 can be configured to convey a second data bit. Interconnect d 379 can be configured to convey a power supply voltage (or ground). Interconnect e 380 can be configured to convey a third data bit.

FIG. 3C shows cross-section portions of a set 385 of interconnects configured in a manner to reduce cross-talk: a 376, b 377, c 378, d 379, f 386, g 387, h 388, and i 389. Interconnects a 376, b 377, c 378, d 379, f 386, g 387, h 388, and i 389 can be aligned substantially along an x-axis (not shown), which extends into and out of the page and is perpendicular to both the y- and z-axes. Interconnects a 376, b 377, c 378, and d 379 can be fabricated on a first layer 390 within an integrated circuit chip, and interconnects f 386, g 387, h 388, and i 389 can be fabricated on a second layer 391 within the integrated circuit chip. Interconnect a 376 can be configured to convey a first data bit. Interconnect b 377 can be configured to convey a first control bit. Interconnect c 378 can be configured to convey a second data bit. Interconnect d 379 can be configured to convey a power supply voltage. Interconnect f 386 can be configured to convey ground. Interconnect g 387 can be configured to convey a third data bit. Interconnect h 388 can be configured to convey a second control bit. Interconnect i 389 can be configured to convey a fourth data bit.

Returning to FIG. 3A, external ports of the multiplexers can be configured to receive and to transmit signals formatted according to the appropriate protocol. For example, multiplexers $E_1$ 310, $E_2$ 312, $G_1$ 318, and $G_2$ 320 have, respectively, external ports $X_{E1X}$ 326, $X_{E2X}$ 328, $X_{G1X}$ 330, and $X_{G2X}$ 332 that can receive and transmit XGMII protocol signals, and, respectively, external ports $X_{E1C}$ 334, $X_{E2C}$ 336, $X_{G1C}$ 338, and $X_{G2C}$ 340 that can receive and transmit CDL protocol signals. Multiplexers $F_1$ 314 and $H_1$ 322 have, respectively, external ports $X_{F1T}$ 342 and $X_{H1T}$ 344 that can transmit XAUI protocol signals. Multiplexers $F_2$ 316 and $H_2$ 324 have, respectively, external ports $X_{F2R}$ 346 and $X_{H2R}$ 348 that can receive XAUI protocol signals. Additionally, multiplexer pairs F 304 and H 308 can each have loop back ports that can transmit serial formatted signals from one multiplexer in the pair and can receive serial formatted signals at the other multiplexer in the pair. For example, multiplexers $F_1$ 314 and $H_1$ 322 have, respectively, loop back ports $L_{F1T}$ 350 and $L_{H1T}$ 352 that can transmit serial formatted signals, and multiplexers $F_2$ 316 and $H_2$ 324 have, respectively, loop back ports $L_{F2R}$ 354 and $L_{H2R}$ 356 that can receive serial formatted signals. Multiplexers $F_1$ 314 and $H_1$ 322 can also have, respectively, external ports $X_{F1R}$ 358 and $X_{H1R}$ 360 that can receive serial formatted signals. The serial formatted signals received by external ports $X_{F1R}$ 358 and $X_{H1R}$ 360 can be used to test bus 300.

Figure 3D:
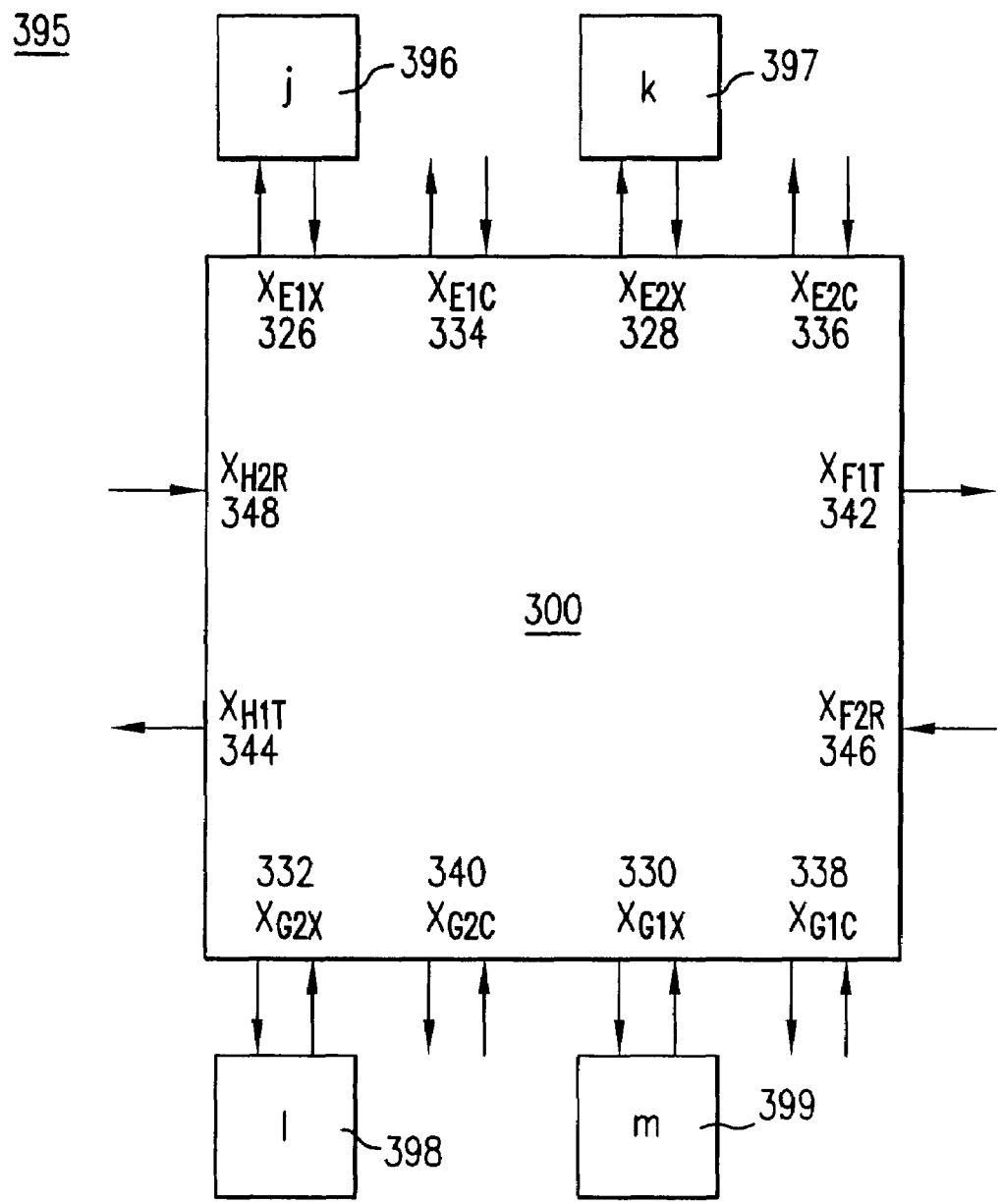
FIG. 3D is a block diagram of an embodiment of a serial/deserializer circuit 395 in which the present invention can reside.

FIG. 3D is a block diagram of an embodiment of a serial/deserializer circuit 395 in which the present invention can reside. Circuit 395 includes cross link multiplexer bus 300 and four serial-to-parallel converters: j 396, k 397, l 398, and m 399. Serial-to-parallel converters j 396, k 397, l 398, and m 399 convert serial signals formatted according to a serial protocol (e.g., XUAI protocol) to a parallel format for interfacing with bus 300. Serial-to-parallel converter j 396 interfaces with external port $X_{E1X}$ 326. Serial-to-parallel converter k 397 interfaces with external port $X_{E2X}$ 328. Serial-to-parallel converter l 398 interfaces with external port $X_{G2X}$ 332. Serial-to-parallel converter m 399 interfaces with external port $X_{G1X}$ 330.

Returning to FIG. 3A, a logic core (not shown) can be located substantially at the center of the circular configuration. Some of the multiplexers can have internal ports coupled to the logic core. The arrangement of such internal ports is dictated by the configuration of the logic core. For example, multiplexer $G_1$ 318 has two internal ports, $I_1$ 362 and $I_2$ 364, that can receive and transmit signals from the logic core. Multiplexer $F_1$ 314 has an internal port $I_3$ 366 that can receive and transmit signals from the logic core. Multiplexer $F_2$ 316 has an internal port $I_4$ 368 that can receive and transmit signals from the logic core. The signals associated with the internal ports can be parallel formatted. For example, signals can be received by the multiplexers from the logic core, communicated within bus 300, and transmitted by the multiplexers to the logic core in the same format as described above for CDL protocol signals.

At least one of the multiplexers can have an internal port coupled to a Packet Bit Error Rate Tester (PBERT) (not shown). For example, multiplexer $H_2$ 324 has an internal port $I_5$ 370 that can receive and transmit signals from the PBERT. PBERT signals can be parallel formatted. For example, PBERT signals can be received by the multiplexers from internal port $I_5$ 370, communicated within bus 300, and transmitted by the multiplexers to internal port $I_5$ 370 in the same format as described above for CDL protocol signals. The PBERT is a Built-In Self Test circuit. The PBERT can preclude the need to perform expensive external testing of bus 300 after it is manufactured. Therefore, the PBERT can be conducive to manufacturing bus 300 in commercial quantities at a reasonable cost.

In an embodiment, XAUI protocol and CDL protocol signals can be received by the multiplexers from outside of bus 300 and can be communicated within bus 300 in the following format each clock cycle: forty data bits, four link bits, four lock bits, four clock bits, four fast clock bits, and one CLOCK MODE SELECT bit. In an embodiment, CDL protocol signals can be transmitted by the multiplexers outside of bus 300 in the following format each clock cycle: eighty data bits, four link bits, four lock bits, four clock bits. In an embodiment, XAUI protocol signals can be transmitted by the multiplexers outside of bus 300 in the following format each clock cycle: eighty data bits and four clock bits.

In both protocols, a stream of clock cycles can be represented as 1, 2, 3, 4, ..., and a corresponding stream of data for characters can be represented as $Z_1, Z_2, Z_3, Z_4$ .... Each of the data for characters corresponds to forty data bits. If, for stream of clock cycles 1, 2, 3, 4, ..., stream of data for characters $Z_1, Z_2, Z_3, Z_4, ...$ is received by the multiplexers from outside of bus 300 and communicated within bus 300, then a corresponding stream of data for two characters $Z_2Z_1$, $Z_3Z_2, Z_4Z_3, ...$ can be transmitted by the multiplexers outside of bus 300. Each of the data for two characters (e.g., $Z_2Z_1$), corresponds to eighty data bits. Within the eighty data bits, at a first clock cycle, the forty least significant bits are used for data for a first character (e.g., $Z_1$) from the stream of data characters, while the forty most significant bits are used for data for a second character (e.g., $Z_2$) from the stream of data for characters. The data for the second character (e.g., $Z_2$) follows the data for the first character (e.g., $Z_1$) in the stream of data for characters. At a second clock cycle, the forty least significant bits are used for data for the second character (e.g., $Z_2$), while the forty most significant bits are used for data for a third character (e.g., $Z_3$) from the stream of data for characters. The second clock cycle follows the first clock cycle in the stream of clock cycles. The data for the third character (e.g., $Z_3$) follows the data for the second character (e.g., $Z_2$) in the stream of data for characters. Thus, within the stream of data for two characters, data for each character from the stream of data for characters is transmitted twice: first within the forty most significant bits of the eighty data bits, then within the forty least significant bits of the eighty data bits.

In an embodiment, XGMII protocol signals can be received by the multiplexers from outside of bus 300 in the following format each clock cycle: forty data bits, four lock bits, four clock bits, three MODE SELECT bits, and (optionally) one DIFFERENTIAL CLOCK MODE SELECT bit. In an embodiment, XGMII protocol signals can be communicated by the multiplexers within bus 300 in the following format each clock cycle: eighty data bits, four lock bits, four clock bits, and one CLOCK MODE SELECT bit. In an embodiment, XGMII protocol signals can be transmitted by the multiplexers outside of bus 300 in the following format: forty data bits, four clock bits, and four output enable bits. Additionally, bus 300 can support a variety of modes by which XGMII protocol signals can be communicated. These modes vary based upon clock formatting, rate, polarity, and the like.

As is done with XAUI protocol and CDL protocol signals when they are reformatted from forty data bits to eighty data bits, when XGMII protocol signals are reformatted from forty data bits to eighty data bits, data for each character is transmitted twice. When a clock signal of a received XGMII protocol signal has a positive polarity, data for each character is transmitted first within the forty most significant bits of the eighty data bits, then within the forty least significant bits of the eighty data bits (e.g., $Z_2Z_1, Z_3Z_2, Z_4Z_3, \ldots$). When a clock signal of a received XGMII protocol signal has a negative polarity, data for each character is transmitted first within the forty least significant bits of the eighty data bits, then within the forty most significant bits of the eighty data bits (e.g., $Z_1Z_2, Z_2Z_3, Z_3Z_4, \ldots$).

As described above, bus 300 can communicate fifteen different signals: XAUI protocol signals from each of external ports $X_{E1X}$ 326, $X_{E2X}$ 328, $X_{G1X}$ 330, and $X_{G2X}$ 332, CDL protocol signals from each of external ports $X_{E1C}$ 334, $X_{E2C}$ 336, $X_{G1C}$ 338, and $X_{G2C}$ 340, and parallel formatted signals from each of internal ports $I_1$ 362, $I_2$ 364, $I_3$ 366, $I_4$ 368, and $I_5$ 370, and XGMII protocol signals from each of external ports $X_{F2R}$ 346 and $X_{H2R}$ 348. FIG. 4 shows a table 400 that summarizes, for different protocols, the formatting of signals received from outside of bus 300, communicated within bus 300, and transmitted to outside of bus 300.

Figure 5:
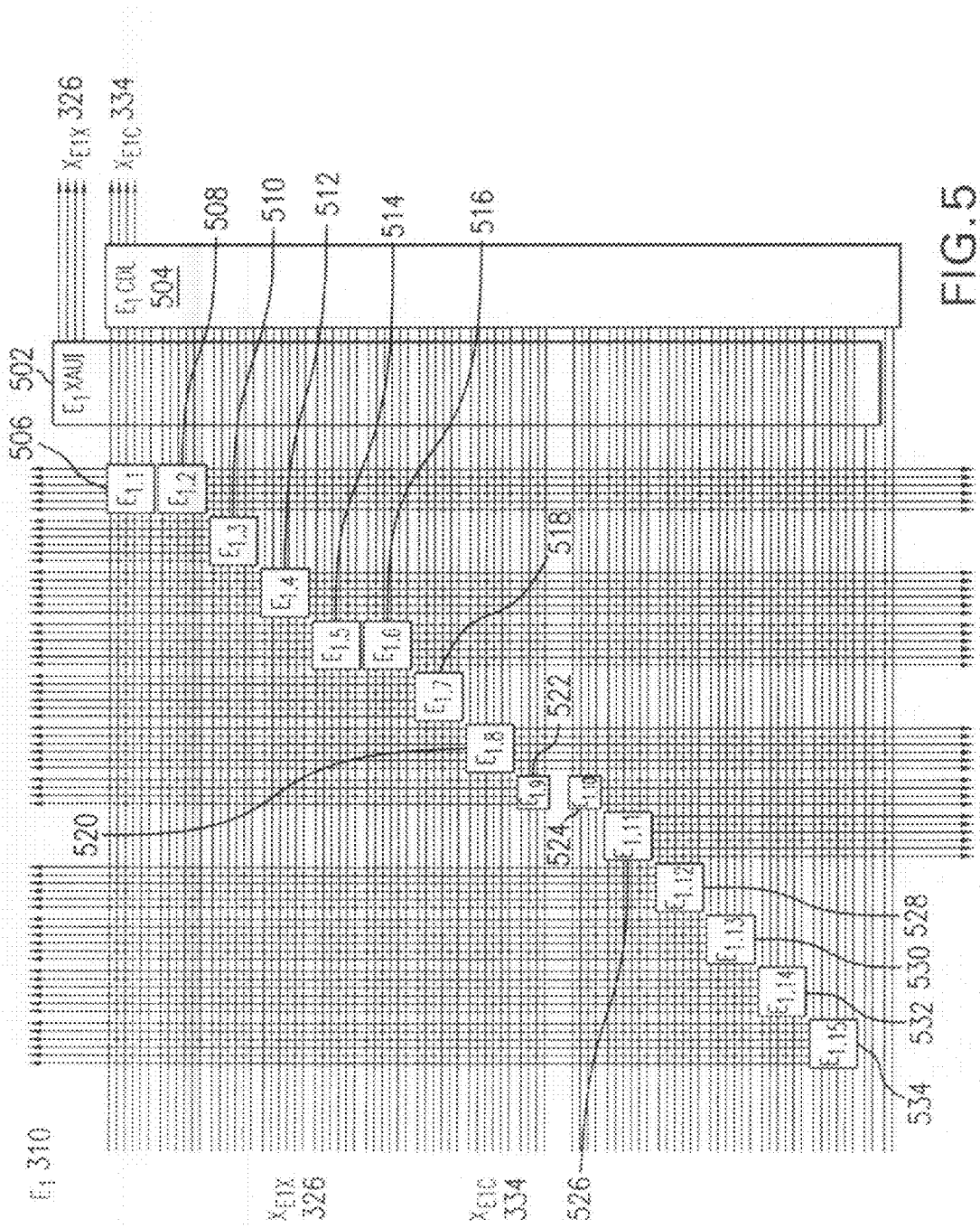
FIG. 5 is a block diagram of an embodiment of cross link bus multiplexer $E_1$ 310.

FIG. 5 is a block diagram of an embodiment of cross link bus multiplexer $E_1$ 310. Bus multiplexer $E_1$ 310 comprises two cross link multiplexers: $E_1$XAUI 502 and $E_1$CDL 504, two three-way bus drivers: $E_{1.4}$ 512 and $E_{1.8}$ 520, and thirteen two-way bus drivers: $E_{1.1}$ 506, $E_{1.2}$ 508, $E_{1.3}$ 510, $E_{1.5}$ 514, $E_{1.6}$ 516, $E_{1.7}$ 518, $E_{1.9}$ 522, $E_{1.10}$ 524, $E_{1.11}$ 526, $E_{1.12}$ 528, $E_{1.13}$ 530, $E_{1.14}$ 532, and $E_{1.15}$ 534. Each of the bus drivers can receive a signal and transmit it to cross link multiplexers $E_1$XAUI 502 and $E_1$CDL 504. Bus multiplexer $E_1$ 310 has external port $X_{E1X}$ 326 that can receive and transmit XAUI protocol signals. Bus multiplexer $E_1$ 310 also has external port $X_{E1C}$ 334 that can receive and transmit CDL protocol signals.

Two-way bus driver $E_{1.1}$ 506 can receive a XAUI protocol signal from external port $X_{G1X}$ 330 via bus multiplexer $E_2$ 312. Two-way bus driver $E_{1.2}$ 508 can receive a XAUI protocol signal from external port $X_{G2X}$ 332 via bus multiplexer $H_2$ 324. Two-way bus driver $E_{1.3}$ 510 can receive a XAUI protocol signal from external port $X_{E2X}$ 328. Driver $E_{1.3}$ 510 can transmit this signal to bus multiplexer $H_1$ 322 via bus multiplexer $H_2$ 324. Three-way bus driver $E_{1.4}$ 512 can receive a XAUI protocol signal from external port $X_{E1X}$ 326. Driver $E_{1.4}$ 512 can transmit this signal to bus multiplexer $G_2$ 320 via bus multiplexer $H_2$ 324 and to bus multiplexer $G_1$ 318 via bus multiplexer $F_1$ 314.

Two-way bus driver $E_{1.5}$ 514 can receive a CDL protocol signal from external port $X_{G1C}$ 338 via bus multiplexer $E_2$ 312. Two-way bus driver $E_{1.6}$ 516 can receive a CDL protocol signal from external port $X_{G2C}$ 340 via bus multiplexer $H_2$ 324. Two-way bus driver $E_{1.7}$ 518 can receive a CDL protocol signal from external port $X_{E2C}$ 336. Driver $E_{1.7}$ 518 can transmit this signal to bus multiplexer $H_1$ 322 via bus multiplexer $H_2$ 324. Three-way bus driver $E_{1.8}$ 520 can receive a CDL protocol signal from external port $X_{E1C}$ 334. Driver $E_{1.8}$ 520 can transmit this signal to bus multiplexer $G_2$ 320 via bus multiplexer $H_2$ 324 and to bus multiplexer $G_1$ 318 via bus multiplexer $F_1$ 314.

Two-way bus driver $E_{1.9}$ 522 can receive an XGMII protocol signal from external port $X_{F2R}$ 346 via bus multiplexer $E_2$ 312. Driver $E_{1.9}$ 522 can transmit this signal to bus multiplexer $H_2$ 324. Two-way bus driver $E_{1.10}$ 524 can receive an XGMII protocol signal from external port $X_{H2R}$ 348. Driver $E_{1.10}$ 524 can transmit this signal to bus multiplexer $F_1$ 314 via bus multiplexer $E_2$ 312.

Two-way bus driver $E_{1.11}$ 526 can receive a PBERT signal from internal port $I_5$ 370. Driver $E_{1.11}$ 526 can transmit this signal to bus multiplexer $F_1$ 314 via bus multiplexer $E_2$ 312.

Two-way bus driver $E_{1.12}$ 528 can receive a signal from internal port $I_1$ 362 via bus multiplexer $E_2$ 312. Two-way bus driver $E_{1.13}$ 530 can receive a signal from internal port $I_2$ 364 via bus multiplexer $E_2$ 312. Two-way bus driver $E_{1.14}$ 532 can receive a signal from internal port $I_3$ 366 via bus multiplexer $E_2$ 312. Driver $E_{1.14}$ 532 can transmit this signal to bus multiplexer $H_2$ 324. Two-way bus driver $E_{1.15}$ 534 can receive a signal from internal port $I_4$ 368 via bus multiplexer $E_2$ 312. Driver $E_{1.15}$ 534 can transmit this signal to bus multiplexer $H_2$ 324.

Bus multiplexers $E_2$ 312 and $G_2$ 320 can each be configured in a similar manner to that of bus multiplexer $E_1$ 310. Bus multiplexer $G_1$ 318 can also configured in a similar manner to that of bus multiplexer $E_1$ 310, but bus multiplexer $G_1$ 318 also comprises a third cross link multiplexer $E_1$CORE$_1$ for routing signals received from and transmitted to internal port $I_1$ 358, and a fourth cross link multiplexer $E_1$CORE$_2$ for routing signals received from and transmitted to internal port $I_2$ 360.

Figure 6:
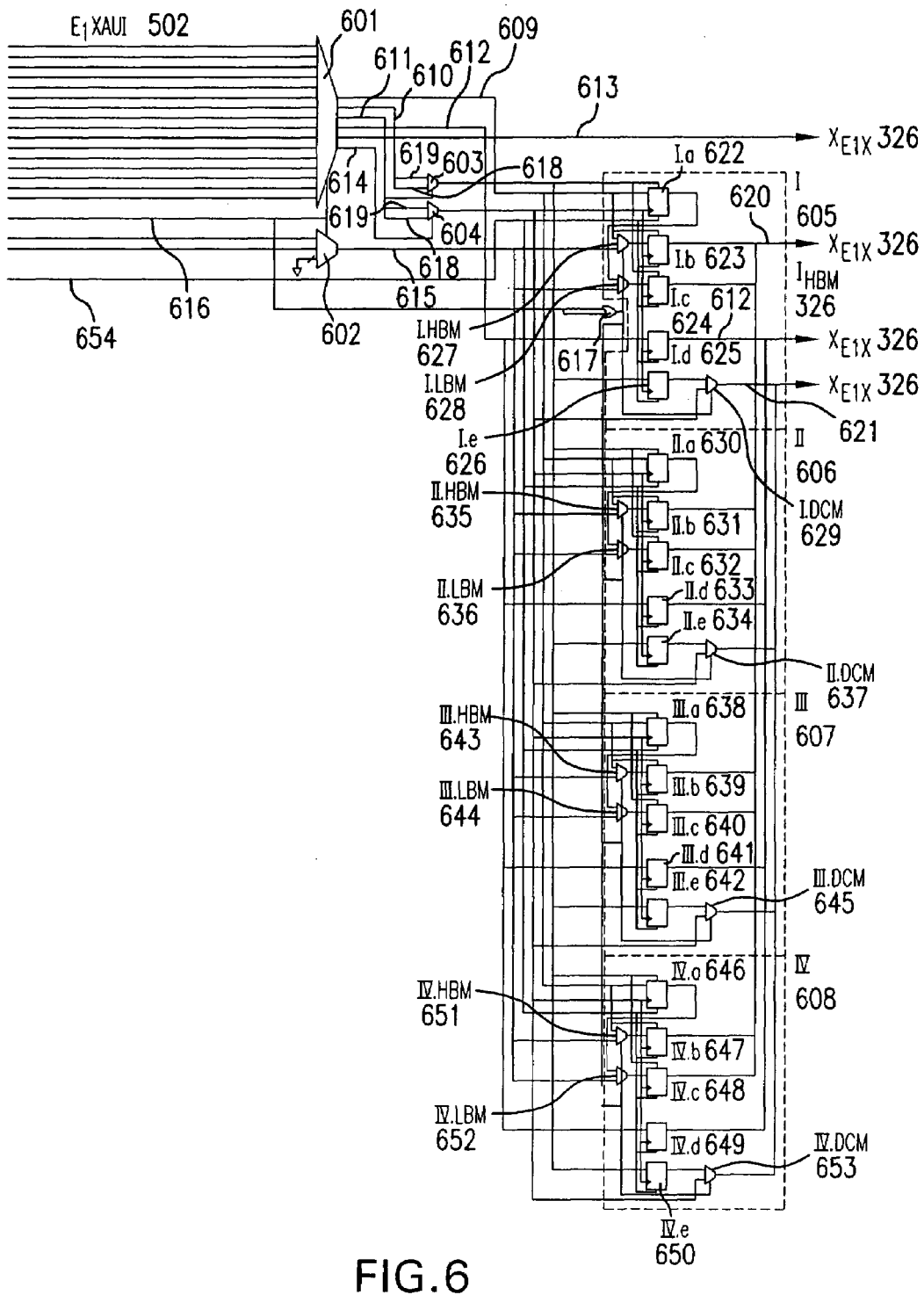
FIG. 6 is a schematic diagram of an embodiment of cross link multiplexer $E_1$XAUI 502.

FIG. 6 is a schematic diagram of an embodiment of cross link multiplexer $E_1$XAUI 502. Cross link multiplexer $E_1$CDL 504 can be configured in a similar manner. Multiplexer $E_1$XAUI 502 comprises a first multiplexer 601, a second multiplexer 602, a clock multiplexer 603, a fast clock multiplexer 604, and four common formatting circuits: I 605, II 606, III 607, and IV 608.

First multiplexer 601 can receive sixteen signals. The sixteen signals include each of the fifteen different signals described above and a default signal. The bits of each signal are positioned as follows: forty data bits, four clock bits, four fast clock bits, four link bits, four lock bits, and one CLOCK MODE SELECT bit. For the default signal, dummy bits are placed in the positions of all of the bits. For an XGMII protocol signal, dummy bits are placed in the positions of the forty data bits, the four clock bits, and the four link bits. For an XGMII protocol signal, its four clock bits are placed in the positions of the four fast clock bits. First multiplexer 601 can transmit a forty bit 40-bit data signal 609, a four bit input clock signal 610, a four bit fast clock signal 611, a four bit link signal 612, a four bit lock signal 613, and a one bit CLOCK MODE SELECT signal 614. Second multiplexer 602 can receive XGMII protocol data signals from each of multiplexers $F_2$ 316 and $H_2$ 324. Second multiplexer 602 can transmit an input 80-bit data signal 615 (eighty bits). First and second multiplexers 601 and 602 can also receive a four bit DATA SELECT signal 616 to determine which one of the sixteen signals will be transmitted from external port $X_{E1X}$. An OR gate 617 can also receive DATA SELECT signal 616 to determine whether it is set to select one of the two XGMII data signals.

First multiplexer 601 can transmit lock signal 613 to external port $X_{E1X}$ 326. Input clock signal 610 and fast clock signal 611 can be configured for two modes of operation. In a first mode 618, all four bits of each of input clock signal 610 and fast clock signal 611 are transmitted in parallel along four interconnect routes (only one interconnect route is shown in FIG. 6). In a second mode 619, one of the four bits of each of input clock signal 610 and fast clock signal 611 is transmitted in parallel along each of the four interconnect routes. For example, in second mode 619 the second least significant bit of the four bits of each of input clock signal 610 and fast clock signal 611 is transmitted in parallel along each of the four interconnect routes. Clock multiplexer 603 and fast clock multiplexer 604 can receive, respectively, input clock signal 610 (both first mode 618 and second mode 619) and fast clock signal 611 (both first mode 618 and second mode 619). Clock multiplexer 603 and fast clock multiplexer 604 can also receive CLOCK MODE SELECT signal 614 to determine which of first mode 618 and second mode 619 will be transmitted to common formatting circuits: I 605, II 606, III 607, and IV 608. First multiplexer 601 can transmit 40-bit data signal 609 and link signal 613 to common formatting circuits: I 605, II 606, III 607, and IV 608. Second multiplexer 602 can transmit input 80-bit data signal 615 to common formatting circuits: I 605, II 606, III 607, and IV 608.

Each common formatting circuit can receive ten data bits (e.g., a lane) from 40-bit data signal 609 and twenty data bits from input 80-bit data signal 615. Each common formatting circuit can also receive one bit from each of input clock signal 610, fast clock signal 611, and link signal 612. Each common formatting circuit can transmit twenty data bits of an output 80-bit data signal 620 to external port $X_{E1X}$ 326. Each common formatting circuit can also transmit one bit to each of an output clock signal 621 and link signal 612 to external port $X_{E1X}$ 326. (For XAUI protocol signals, link signal 612 and lock signal 613 are not transmitted outside of bus 300.)

Common formatting circuit I 605 comprises five delay flip-flops: I.a 622, I.b 623, I.c 624, I.d 625, and I.e 626, a higher bit multiplexer I.HBM 627, a lower bit multiplexer I.LBM 628, and a delayed clock multiplexer I.DCM 629. The one bit from fast clock signal 611 is used to clock all of the delay flip-flops. Each delay flip-flop is default enabled. However, the one bit from clock signal 610 is used to disable each of delay flip-flops I.a 622, I.b 623, and I.c 624. Common formatting circuit I 605 can receive the $1^{st}$ through $10^{th}$ least significant bits of 40-bit data signal 609, the $1^{st}$ through $10^{th}$ least significant bits of input 80-bit data signal 615, and the $41^{st}$ through $50^{th}$ least significant bits of input 80-bit data signal 615. Common formatting circuit I 605 can produce the $1^{st}$ through $10^{th}$ least significant bits of output 80-bit data signal 620 and the $41^{st}$ through $50^{th}$ least significant bits of output 80-bit data signal 620.

Common formatting circuit II 606 comprises five delay flip-flops: II.a 630, II.b 631, II.c 632, II.d 633, and II.e 634, a higher bit multiplexer II.HBM 635, a lower bit multiplexer II.LBM 636, and a delayed clock multiplexer II.DCM 637. The one bit from fast clock signal 611 is used to clock all of the delay flip-flops. Each delay flip-flop is default enabled. However, the one bit from clock signal 610 is used to disable each of delay flip-flops II.a 630, II.b 631, and II.c 632. Common formatting circuit II 606 can receive the $11^{th}$ through $20^{th}$ least significant bits of 40-bit data signal 609, the $11^{th}$ through $20^{th}$ least significant bits of input 80-bit data signal 615, and the $51^{st}$ through $60^{th}$ least significant bits of input 80-bit data signal 615. Common formatting circuit II 606 can produce the $11^{th}$ through $20^{th}$ least significant bits of output 80-bit data signal 620 and the $51^{st}$ through $60^{th}$ least significant bits of output 80-bit data signal 620.

Common formatting circuit III 607 comprises five delay flip-flops: III.a 638, III.b 639, III.c 640, III.d 641, and III.e 642, a higher bit multiplexer III.HBM 643, a lower bit multiplexer III.LBM 644, and a delayed clock multiplexer III.DCM 645. The one bit from fast clock signal 611 is used to clock all of the delay flip-flops. Each delay flip-flop is default enabled. However, the one bit from clock signal 610 is used to disable each of delay flip-flops III.a 638, III.b 639, and III.c 640. Common formatting circuit III 607 can receive the $21^{st}$ through $30^{th}$ least significant bits of 40-bit data signal 609, the $21^{st}$ through $30^{th}$ least significant bits of input 80-bit data signal 615, and the $61^{st}$ through $70^{th}$ least significant bits of input 80-bit data signal 615. Common formatting circuit III 607 can produce the $21^{st}$ through $30^{th}$ least significant bits of output 80-bit data signal 620 and the $61^{st}$ through $70^{th}$ least significant bits of output 80-bit data signal 620.

Common formatting circuit IV 608 comprises five delay flip-flops: IV.a 646, III.b 647, III.c 648, III.d 649, and III.e 650, a higher bit multiplexer III.HBM 651, a lower bit multiplexer III.LBM 652, and a delayed clock multiplexer III.DCM 653. The one bit from fast clock signal 611 is used to clock all of the delay flip-flops. Each delay flip-flop is default enabled. However, the one bit from clock signal 610 is used to disable each of delay flip-flops IV.a 646, IV.b 647, and IV.c 648. Common formatting circuit IV 608 can receive the $31^{st}$ through $40^{th}$ least significant bits of 40-bit data signal 609, the $31^{st}$ through $40^{th}$ least significant bits of input 80-bit data signal 615, and the $71^{st}$ through $80^{th}$ least significant bits of input 80-bit data signal 615. Common formatting circuit IV 608 can produce the $31^{st}$ through $40^{th}$ least significant bits of output 80-bit data signal 620 and the $71^{st}$ through $80^{th}$ least significant bits of output 80-bit data signal 620.

A one bit RESET signal 654 can be used to reset the delay flip-flops in all of the common formatting circuits. The delay flip-flops are used to synchronize bits of a signal. Although the lengths of all of the interconnects between two adjacent multiplexer pairs are substantially the same, the bits can become unsynchronized due to coupling phase shifts, variations in the timing of wave formations, and the like. Also, limitations in fabrication processes can result in differences in interconnect lengths. In these situations, the bits can be received by the delay flip-flops at various points in time of a clock cycle (unsynchronized). However, once received by the delay flip-flops, the bits are stored and then, at the next clock cycle, transmitted at the same point in time of that clock cycle (synchronized). In this manner variations in the time consumed for the bits to traverse their respective interconnects (i.e., the path delay times) are compensated by the time consumed for the bits to traverse across the cross link multiplexer (i.e., the gate delay times). A bit that traverses its interconnect "quickly" will arrive at its delay flip-flop "early" where it will "wait" for the other bits to arrive. Thus, the path delay time and the gate delay time complement each other to yield a substantially constant total delay time.

Higher bit multiplexer I.HBM 627 can receive the $41^{st}$ through $50^{th}$ least significant bits of input 80-bit data signal 615 and the $1^{st}$ through $10^{th}$ least significant bits of 40-bit data signal 609. Lower bit multiplexer I.LBM 628 can receive the $1^{st}$ through $10^{th}$ least significant bits of input 80-bit data signal 615. Higher bit multiplexer II.HBM 635 can receive the $51^{st}$ through $60^{th}$ least significant bits of input 80-bit data signal 615 and the $11^{th}$ through $20^{th}$ least significant bits of 40-bit data signal 609. Lower bit multiplexer II.LBM 636 can receive the $11^{th}$ through $20^{th}$ least significant bits of input 80-bit data signal 615. Higher bit multiplexer III.HBM 643 can receive the $61^{st}$ through $70^{th}$ least significant bits of input 80-bit data signal 615 and the $21^{st}$ through $30^{th}$ least significant bits of 40-bit data signal 609. Lower bit multiplexer III.LBM 644 can receive the $21^{st}$ through $30^{th}$ least significant bits of input 80-bit data signal 615. Higher bit multiplexer IV.HBM 651 can receive the $71^{st}$ through $80^{th}$ least significant bits of input 80-bit data signal 615 and the $31^{st}$ through $40^{th}$ least significant bits of 40-bit data signal 609. Lower bit multiplexer IV.LBM 652 can receive the $31^{st}$ through $40^{th}$ least significant bits of input 80-bit data signal 615.

Each higher bit multiplexer, each lower bit multiplexer, and each delayed clock multiplexer can also receive an output of OR gate 617 to determine whether serial or parallel formatted signals will be processed by the common formatting circuits. If DATA SELECT signal 616 is set to select one of the two XGMII protocol signals, then serial formatted signals will be processed; otherwise, parallel formatted signals will be processed.

For example, in common formatting circuit I 605, if DATA SELECT signal 616 is set to select one of the two XGMII protocol signals, then serial formatted signals will be processed. Delay flip-flop I.a 622 is not used. As described above, input 80-bit data signal 615 comprises a stream of data for two characters $Z_2Z_1, Z_3Z_2, Z_4Z_3, \ldots$. At a first clock cycle: (1) the $41^{st}$ through $50^{th}$ least significant bits of input 80-bit data signal 615 can be transmitted through higher bit multiplexer I.HBM 627 and delay flip-flop I.b 623 to the $41^{st}$ through $50^{th}$ least significant bits of output 80-bit data signal 620; (2) the $1^{st}$ through $10^{th}$ least significant bits of input 80-bit data signal 615 can be transmitted through lower bit multiplexer I.LBM 628 and delay flip-flop I.c 624 to the $1^{st}$ through $10^{th}$ least significant bits of output 80-bit data signal 620; (3) the one dummy bit from link signal 612 can be transmitted through delay flip-flop I.d 625; and (4) the one bit from fast clock signal 611 can be transmitted through delayed clock multiplexer I.DCM 629 to output clock signal 621, rather than the one dummy bit from input clock signal 610 from delay flip-flop I.e 626.

Common formatting circuits II 606, III 607, and IV 608 can similarly transmit, respectively, the $51^{st}$ through $60^{th}$ and the $11^{th}$ through $_{20}$th, the $61^{st}$ through $70^{th}$ and the $21^{st}$ through $30^{th}$, and the $71^{st}$ through $80^{th}$ and the $31^{st}$ through $40^{th}$ least significant bits of input 80-bit data signal 615 to output 80-bit data signal 620. Thus, output 80-bit data signal 620 is, from its least to its most significant bit: the 1st through $10^{th}$, the $11^{th}$ through $20^{th}$, the $21^{st}$ through $30^{th}$, the $31^{st}$ through $40^{th}$, the $41^{st}$ through $50^{th}$, the $51^{st}$ through $60^{th}$, the $61^{st}$ through $70^{th}$, and the $71^{st}$ through $80^{th}$ least significant bits of input 80-bit data signal 615. As described above, within output 80-bit data signal 620, the forty least significant bits are used for data for a first character and the forty most significant bits are used for data for a second character.

Alternatively, if DATA SELECT signal 616 is not set to select one of the two XGMII protocol signals, then parallel formatted signals will be processed. For example, in common formatting circuit I 605, if DATA SELECT signal 616 is not set to select one of the two XGMII protocol signals, then parallel formatted signals will be processed. As described above, 40-bit data signal 609 comprises a stream of data for characters that can be represented as $Z_1, Z_2, Z_3, Z_4 \ldots$.

At a first clock cycle: (1) the $1^{st}$ through $10^{th}$ least significant bits of 40-bit data signal 609 for a first character (e.g., $Z_1$) can be transmitted through delay flip-flop I.a 622 and lower bit multiplexer I.LBM 628 to delay flip-flop I.c 624; (2) the $1^{st}$ through $10^{th}$ least significant bits of 40-bit data signal 609 for the first character (e.g., $Z_1$) can be transmitted through higher bit multiplexer I.HBM 627 and delay flip-flop I.b 623 to the $41^{st}$ through $50^{th}$ least significant bits of output 80-bit data signal 620; (3) the one bit from link signal 612 for the first character can be transmitted through delay flip-flop I.d 625; and (4) the one bit from input clock signal 610 for the first character can be transmitted through delay flip-flop I.e 626 and delayed clock multiplexer I.DCM 629 to output clock signal 621, rather than the one bit from fast clock signal 611.

At a second clock cycle: (1) the $1^{st}$ through $10^{th}$ least significant bits of 40-bit data signal 609 for a second character (e.g., $Z_2$) can be transmitted through delay flip-flop I.a 622 and lower bit multiplexer I.LBM 628 to delay flip-flop I.c 624; (2) the $1^{st}$ through $10^{th}$ least significant bits of 40-bit data signal 609 for the second character (e.g., $Z_2$) can be transmitted through higher bit multiplexer I.HBM 627 and delay flip-flop I.b 623 to the $41^{st}$ through $50^{th}$ least significant bits of output 80-bit data signal 620; (3) the $1^{st}$ through $10^{th}$ least significant bits of 40-bit data signal 609 for the first character (e.g., $Z_1$) can be transmitted through delay flip-flop I.c 624 to the $1^{st}$ through $10^{th}$ least significant bits of output 80-bit data signal 620; (4) the one bit from link signal 612 for the second character can be transmitted through delay flip-flop I.d 625; and (5) the one bit from input clock signal 610 for the second character can be transmitted through delay flip-flop I.e 626 and delayed clock multiplexer I.DCM 629 to output clock signal 62 1, rather than the one bit from fast clock signal 611.

Common formatting circuits II 606, III 607, and IV 608 can similarly transmit, respectively, the $11^{th}$ through $20^{th}$, the $21^{st}$ through $30^{th}$, and the $31^{st}$ through $40^{th}$ least significant bits of 40-bit data signal 609 for the first character (e.g., $Z_1$) to, respectively, the $11^{th}$ through $20^{th}$, the $21^{st}$ through $30^{th}$, and the $31^{st}$ through $40^{th}$ least significant bits of output 80-bit data signal 620. Common formatting circuits II 606, III 607, and IV 608 can also transmit, respectively, the $11^{th}$ through $20^{th}$, the $21^{st}$ through $30^{th}$, and the $31^{st}$ through $40^{th}$ least significant bits of 40-bit data signal 609 for the second character (e.g., $Z_2$) to, respectively, the $51^{st}$ through $60^{th}$, the $60^{st}$ through $70^{th}$, and the $71^{st}$ through $80^{th}$ least significant bits of output 80-bit data signal 620. Thus, output 80-bit data signal 620 is, from its least to its most significant bit: the $1^{st}$ through $10^{th}$, the $11^{th}$ through $20^{th}$, the $21^{st}$ through $30^{th}$, and the $31^{st}$ through $40^{th}$ least significant bits of 40-bit data signal 609 for the first character (e.g., $Z_1$), and the $1^{st}$ through $10^{th}$, the $11^{th}$ through $20^{th}$, the $21^{st}$ through $30^{th}$, and the $31^{st}$ through $40^{th}$ least significant bits of 40-bit data signal 609 for the second character (e.g., $Z_2$).

Figure 7:
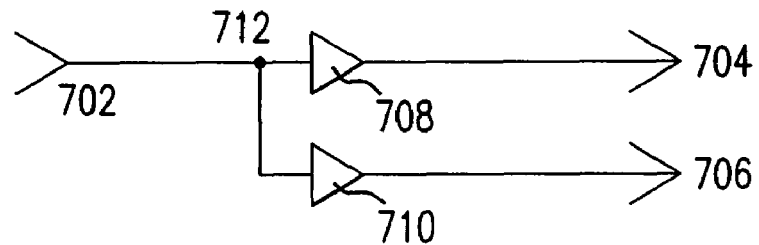
FIG. 7 is a schematic diagram of an embodiment of two-way bus driver $E_{1.1}$ 506.

FIG. 7 is a schematic diagram of an embodiment of two-way bus driver $E_{1.1}$ 506. Two-way bus drivers $E_{1.2}$ 508, $E_{1.3}$ 510, $E_{1.5}$ 514, $E_{1.6}$ 516, $E_{1.7}$ 518, $E_{1.9}$ 522, $E_{1.10}$ 524, $E_{1.11}$ 526, $E_{1.12}$ 528, $E_{1.13}$ 530, $E_{1.14}$ 532, and $E_{1.15}$ 534 can each be configured in a similar manner. Bus driver $E_{1.1}$ 506 comprises an input 702, a first output 704, a second output 706, a first delay buffer 708, a second delay buffer 710, and a node 712. Input 702 is coupled to node 712. First delay buffer 708 is coupled between node 712 and first output 704. Second delay buffer 710 is coupled between node 712 and second output 706. A signal can be received at input 702, conveyed to first and second delay buffers 708 and 710, and conveyed, respectively, to first and second outputs 704 and 706.

Figure 8:
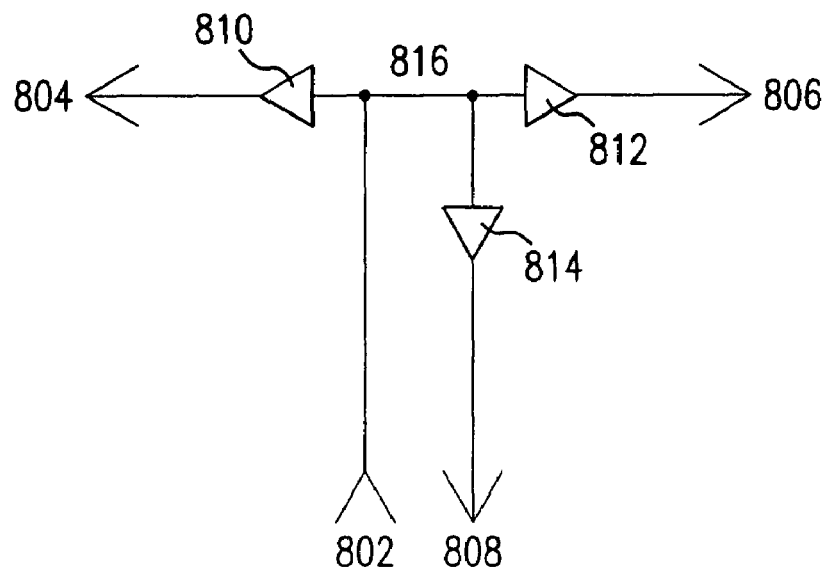
FIG. 8 is a schematic diagram of an embodiment of three-way bus driver $E_{1.4}$ 512.

FIG. 8 is a schematic diagram of an embodiment of three-way bus driver $E_{1.4}$ 512. Three-way bus driver $E_{1.8}$ 520 can be configured in a similar manner. Bus driver $E_{1.4}$ 512 comprises an input 802, a first output 804, a second output 806, a third output 808, a first delay buffer 810, a second delay buffer 812, a third delay buffer 814, and a node 816. Input 802 is coupled to node 816. First delay buffer 810 is coupled between node 816 and first output 804. Second delay buffer 812 is coupled between node 816 and second output 806. Third delay buffer 814 is coupled between node 816 and third output 808. A signal can be received at input 802, conveyed to first, second, and third delay buffers 810, 812, and 814, and conveyed, respectively, to first, second, and third outputs 804, 806, and 808.

Figure 9:
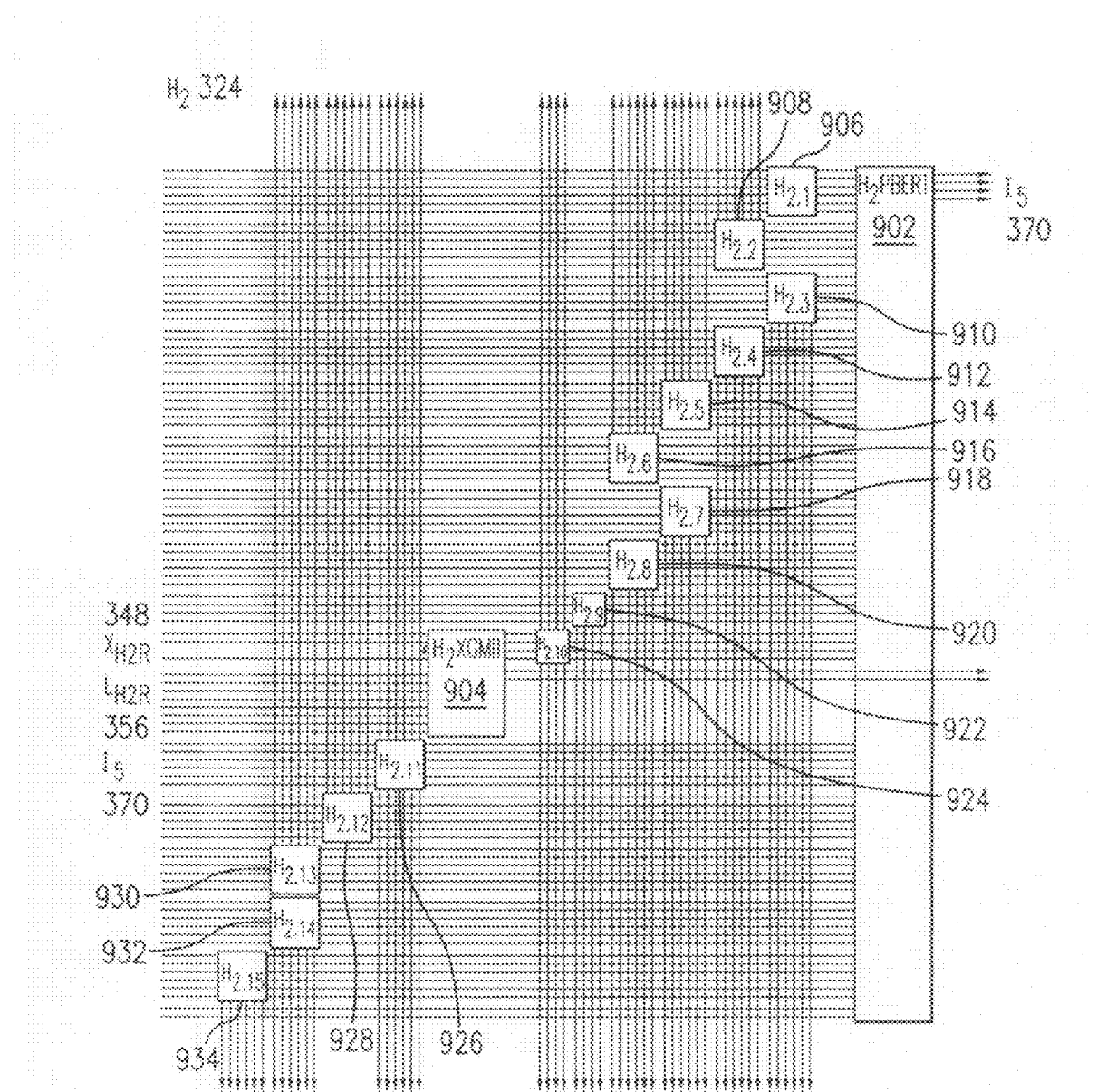
FIG. 9 is a block diagram of an embodiment of cross link bus multiplexer $H_2$ 324.

FIG. 9 is a block diagram of an embodiment of cross link bus multiplexer $H_2$ 324. Bus multiplexer $H_2$ 324 comprises a cross link multiplexer $H_2$PBERT 902, a parallel transmitter pad register $H_2$XGMII 904, two three-way bus drivers: $H_{2.10}$ 924 and $H_{2.11}$ 926, and thirteen two-way bus drivers: $H_{2.1}$ 906, $H_{2.2}$ 908, $H_{2.3}$ 910, $H_{2.4}$ 912, $H_{2.5}$ 914, $H_{2.6}$ 916, $H_{2.7}$ 918, $H_{2.8}$ 920, $H_{2.9}$ 922, $H_{2.12}$ 928, $H_{2.13}$ 930, $H_{2.14}$ 932, and $H_{2.15}$ 934. Each of the bus drivers can receive a signal and transmit it to cross link multiplexer $H_2$PBERT 902. Cross link multiplexer $H_2$PBERT 902 can be configured in a similar manner as cross link multiplexer $E_1$XAUI 502, described above with reference to FIG. 6. The two-way bus drivers can each be configured in a similar manner as two-way bus driver $E_{1.1}$ 506, described above with reference to FIG. 7. The three-way bus drivers can each be configured in a similar manner as three-way bus driver $E_{1.4}$ 512, described above with reference to FIG. 8. Bus multiplexer $H_2$ 324 has internal port $I_5$ 370 that can receive and transmit signals from the PBERT. Bus multiplexer $H_2$ 324 also has external port $X_{H2R}$ 348 that can receive XGMII protocol signals. Bus multiplexer $H_2$ 324 also has loop back port $L_{H2R}$ 356 that can receive serial formatted signals from bus multiplexer $H_1$ 322.

Two-way bus driver $H_{2.1}$ 906 can receive a XAUI protocol signal from external port $X_{G1X}$ 330 via bus multiplexer $H_1$ 322. Two-way bus driver $H_{2.2}$ 908 can receive a XAUI protocol signal from external port $X_{G2X}$ 332 via bus multiplexer $H_1$ 322. Driver $H_{2.2}$ 908 can transmit this signal to bus multiplexer $E_1$ 310. Two-way bus driver $H_{2.3}$ 910 can receive a XAUI protocol signal from external port $X_{E2X}$ 328 via bus multiplexer $E_1$ 310. Driver $H_{2.3}$ 910 can transmit this signal to bus multiplexer $H_1$ 322. Two-way bus driver $H_{2.4}$ 912 can receive a XAUI protocol signal from external port $X_{E1X}$ 326. Driver $H_{2.4}$ 912 can transmit this signal to bus multiplexer $G_2$ 320 via bus multiplexer $H_1$ 322.

Two-way bus driver $H_{2.5}$ 914 can receive a CDL protocol signal from external port $X_{G1C}$ 338 via bus multiplexer $H_1$ 322. Two-way bus driver $H_{2.6}$ 916 can receive a CDL protocol signal from external port $X_{G2C}$ 340 via bus multiplexer $H_1$ 322. Driver $H_{2.6}$ 916 can transmit this signal to bus multiplexer $E_1$ 310. Two-way bus driver $H_{2.7}$ 918 can receive a CDL protocol signal from external port $X_{E2C}$ 336 via bus multiplexer $E_1$ 310. Driver $H_{2.7}$ 918 can transmit this signal to bus multiplexer $H_1$ 322. Two-way bus driver $H_{2.8}$ 920 can receive a CDL protocol signal from external port $X_{E1C}$ 334. Driver $H_{2.8}$ 920 can transmit this signal to bus multiplexer $G_2$ 320 via bus multiplexer $H_1$ 322.

Two-way bus driver $H_{2.9}$ 922 can receive an XGMII protocol signal from external port $X_{F2R}$ 346 via bus multiplexer $E_1$ 310. Three-way bus driver $H_{2.10}$ 924 can receive an XGMII protocol signal from external port $X_{H2R}$ 348 via parallel transmitter pad register $H_2$XGMII 904. Driver $H_{2.10}$ 924 can transmit this signal to bus multiplexer $F_1$ 314 via bus multiplexer $E_1$ 310 and to bus multiplexer $F_2$ 316 via bus multiplexer $H_1$ 322.

Three-way bus driver $H_{2.11}$ 926 can receive a PBERT signal from internal port $I_5$ 370. Driver $H_{2.11}$ 926 can transmit this signal to bus multiplexer $F_1$ 314 via bus multiplexer $E_1$ 310 and to bus multiplexer $F_2$ 316 via bus multiplexer $H_1$ 322.

Two-way bus driver $H_{2.12}$ 928 can receive a signal from internal port $I_1$ 362 via bus multiplexer $H_1$ 322. Two-way bus driver $H_{2.13}$ 930 can receive a signal from internal port $I_2$ 364 via bus multiplexer $H_1$ 322. Two-way bus driver $H_{2.14}$ 932 can receive a signal from internal port $I_3$ 366 via bus multiplexer $E_1$ 310. Two-way bus driver $H_{2.15}$ 934 can receive a signal from internal port $I_4$ 368 via bus multiplexer $E_1$ 310.

Bus multiplexer $F_2$ 316 can be configured in a similar manner to that of bus multiplexer $H_2$ 324, but bus multiplexer $F_2$ 316 includes, rather than cross link multiplexer $H_2$PBERT 902, a cross link multiplexer $F_2$CORE$_4$ for routing signals received from and transmitted to internal port $I_4$ 364.

Figure 10:
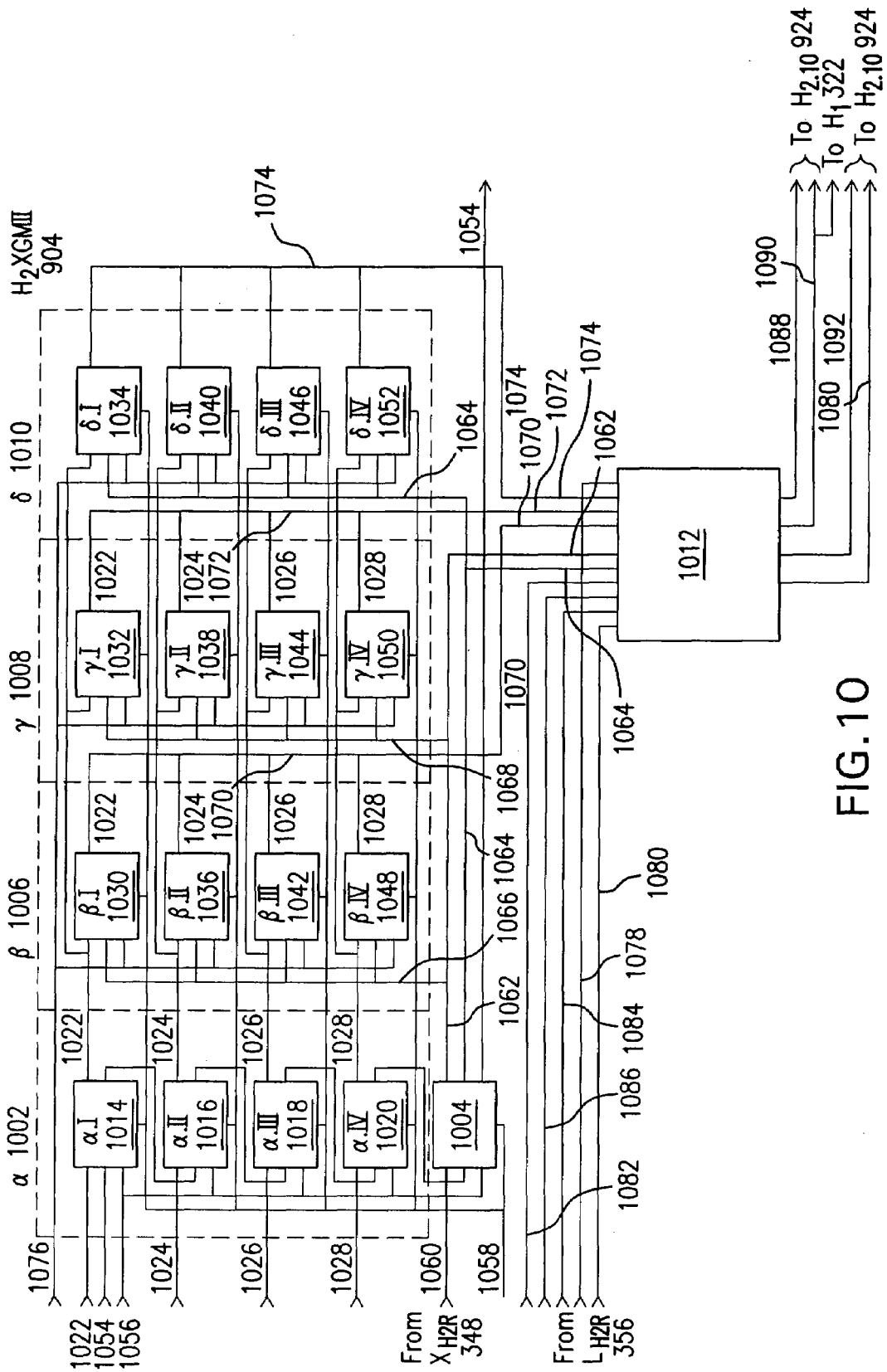
FIG. 10 is a block diagram of an embodiment of parallel transmitter pad register $H_2$XGMII 904.

FIG. 10 is a block diagram of an embodiment of parallel transmitter pad register $H_2$XGMII 904. Parallel transmitter pad register $H_2$XGMII 904 comprises a bank of transmitter data pad delay circuits α 1002, a transmitter clock pad delay circuit 1004, three banks of transmitter pad registers: β 1006, γ 1008, and δ 1010, and a transmitter register multiplexer 1012.

Bank of transmitter data pad delay circuits α 1002 comprises four transmitter data pad delay circuits: α.I 1014, α.II 1016, α.III 1018, and α.IV 1020. Each transmitter data pad delay circuit can receive ten data bits (e.g., a lane) of an XGMII protocol signal from external port $X_{H2R}$ 348. Transmitter pad delay circuit α.I 1014 can receive the $1^{st}$ through $10^{th}$ least significant data bits 1022 of the XGMII protocol signal. Transmitter pad delay circuit α.II 1016 can receive the $11^{th}$ through $20^{th}$ least significant data bits 1024 of the XGMII protocol signal. Transmitter pad delay circuit α.III 1018 can receive the $21^{st}$ through $30^{th}$ least significant data bits 1026 of the XGMII protocol signal. Transmitter pad delay circuit α.IV 1020 can receive the $31^{st}$ through $40^{th}$ least significant data bits 1028 of the XGMII protocol signal.

Each transmitter data pad delay circuit can transmit its ten data bits to corresponding transmitter pad registers in each bank of transmitter pad registers: β 1006, γ 1008, and δ 1010. Transmitter data pad delay circuit α.I 1014 can transmit the $1^{st}$ through $10^{th}$ least significant data bits 1022 to each of transmitter pad registers β.I 1030, γ.I 1032, and δ.I 1034. Transmitter data pad delay circuit α.II 1016 can transmit the $11^{th}$ through $20^{th}$ least significant data bits 1024 to each of transmitter pad registers β.II 1036, γ.II 1038, and δ.II 1040. Transmitter data pad delay circuit α.III 1018 can transmit the $21^{st}$ through $30^{th}$ least significant data bits 1026 to each of transmitter pad registers β.III 1042, γ.III 1044, and δ.III 1046. Transmitter data pad delay circuit α.IV 1020 can transmit the $31^{st}$ through $40^{th}$ least significant data bits 1028 to each of transmitter pad registers β.IV 1048, γ.IV 1050, and δ.IV 1052.

Each transmitter data pad delay circuit can also receive a delay set bit stream 1054 and a delay set clock 1056. Each transmitter data pad delay circuit can transmit delay set bit stream 1054. Delay set bit stream 1054 and delay set clock 1056 are described in greater detail below. Each transmitter data pad delay circuit comprises ten pad delay circuits. Each pad delay circuit comprises three delay flip-flops. A one bit RESET signal 1058 can be used to reset all of the delay flip-flops in all of the transmitter data pad delay circuits.

Transmitter clock pad delay circuit 1004 can receive a five bit transmitter clock pad delay clock signal 1060 from external port $X_{H2R}$ 348. Five bit transmitter clock pad delay clock signal 1060 comprises a four bit transmitter clock signal 1062 from the XGMII protocol signal and, optionally, a one bit transmitter differential clock signal 1064. (If transmitter differential clock signal 1064 is not received from external port $X_{H2R}$ 348, the one bit of transmitter differential clock signal 1064 is set to ground.) Transmitter clock signal 1062 can be configured for two modes of operation. In a first mode 1066, all four bits of transmitter clock signal 1062 are transmitted in parallel along four interconnect routes (only one interconnect route is shown in FIG. 10). In a second mode 1068, one of the four bits of transmitter clock signal 1062 is transmitted in parallel along each of the four interconnect routes. For example, in second mode 1068 the second least significant bit of the four bits on transmitter clock signal 1062 is transmitted in parallel along each of the four interconnect routes.

First mode 1066 of transmitter clock signal 1062 can be transmitted to each transmitter pad register in bank of transmitter pad registers β 1006: β.I 1030, β.II 1036, β.III 1042, and β.IV 1048. Second mode 1068 of transmitter clock signal 1062 can be transmitted to each transmitter pad register in bank of transmitter pad registers γ 1006: γ.I 1032, γ.II 1038, γ.III 1044, and γ.IV 1050. Transmitter differential clock signal 1064 can be transmitted to each transmitter pad register in bank of transmitter pad registers δ 1010: δ.I 1034, δ.II 1040, δ.III 1046, and δ.IV 1052. Transmitter clock signal 1062 and transmitter differential clock signal 1064 can also be transmitted to transmitter register multiplexer 1012.

Transmitter clock pad delay circuit 1004 can also receive delay set bit stream 1054 and delay set clock 1056. Transmitter clock pad delay circuit 1004 can transmit delay set bit stream 1054. Delay set bit stream 1054 and delay set clock 1056 are described in greater detail below. Transmitter clock pad delay circuit 1004 comprises five pad delay circuits. Each pad delay circuit comprises three delay flip-flops. RESET signal 1058 can be used to reset all of the delay flip-flops in transmitter clock pad delay circuit 1004.

Each bank of transmitter pad registers β 1006, γ 1008, and δ 1010 comprises four transmitter pad registers. Bank of transmitter pad registers β 1006 comprises transmitter pad registers β.I 1030, β.II 1036, β.III 1042, and β.IV 1048. Bank of transmitter pad registers γ 1008 comprises transmitter pad registers γ.I 1032, γ.II 1038, γ.III 1044, and γ.IV 1050. Bank of transmitter pad registers δ 1010 comprises transmitter pad registers δ.I 1034, δ.II 1040, δ.III 1046, and δ.IV 1052. Each bank of transmitter pad registers can produce formatted data bits. The formatted data bits have eighty bits. Bank of transmitter pad registers β 1006 can produce first formatted data bits 1070. Bank of transmitter pad registers γ 1008 can produce second formatted data bits 1072. Bank of transmitter pad registers δ 1010 can produce third formatted data bits 1074. Each formatted data bits can support at least one of the modes by which XGMII protocol signals can be communicated.

Each transmitter pad register comprises four delay flip-flops. These are described in greater detail below. A one bit CLOCK POLARITY signal 1076 can be used to configure all of the transmitter pad registers to process received data bits in response to a clock signal having either a positive or a negative polarity. RESET signal 1058 can be used to reset all of the delay flip-flops in all of the transmitter pad registers.

Transmitter pad register β.I 1030 can receive the $1^{st}$ through $10^{th}$ least significant data bits 1022 from transmitter data pad delay circuit α.I 1014. Transmitter pad register β.I 1030 can receive first mode 1066 of transmitter clock signal 1062 from transmitter clock pad delay circuit 1004. Transmitter pad register β.I 1030 can produce the $1^{st}$ through $10^{th}$ and the $41^{st}$ through $50^{th}$ least significant data bits of first formatted data bits 1070.

Transmitter pad register β.II 1036 can receive the $11^{th}$ through $20^{th}$ least significant data bits 1024 from transmitter data pad delay circuit α.II 1016. Transmitter pad register β.II 1036 can receive first mode 1066 of transmitter clock signal 1062 from transmitter clock pad delay circuit 1004. Transmitter pad register β.II 1036 can produce the $11^{th}$ through $20^{th}$ and the $51^{st}$ through $60^{th}$ least significant data bits of first formatted data bits 1070.

Transmitter pad register β.III 1042 can receive the $21^{st}$ through $30^{th}$ least significant data bits 1026 from transmitter data pad delay circuit α.III 1018. Transmitter pad register β.III 1042 can receive first mode 1066 of transmitter clock signal 1062 from transmitter clock pad delay circuit 1004. Transmitter pad register β.III 1042 can produce the $21^{st}$ through $30^{th}$ and the $61^{st}$ through $70^{th}$ least significant data bits of first formatted data bits 1070.

Transmitter pad register β.IV 1048 can receive the $31^{st}$ through $40^{th}$ least significant data bits 1028 from transmitter data pad delay circuit α.IV 1020. Transmitter pad register β.IV 1048 can receive first mode 1066 of transmitter clock signal 1062 from transmitter clock pad delay circuit 1004. Transmitter pad register β.IV 1048 can produce the $31^{st}$ through $40^{th}$ and the $71^{st}$ through $80^{th}$ least significant data bits of first formatted data bits 1070.

Transmitter pad register γ.I 1032 can receive the $1^{st}$ through $10^{th}$ least significant data bits 1022 from transmitter data pad delay circuit α.IV 1014. Transmitter pad register γ.I 1032 can receive second mode 1068 of transmitter clock signal 1062 from transmitter clock pad delay circuit 1004. Transmitter pad register γ.I 1032 can produce the $1^{st}$ through $10^{th}$ and the $41^{st}$ through $50^{th}$ least significant data bits of second formatted data bits 1072.

Transmitter pad register γ.II 1038 can receive the $11^{th}$ through $20^{th}$ least significant data bits 1024 from transmitter data pad delay circuit α.II 1016. Transmitter pad register γ.II 1038 can receive second mode 1068 of transmitter clock signal 1062 from transmitter clock pad delay circuit 1004. Transmitter pad register γ.II 1038 can produce the $11^{th}$ through $20^{th}$ and the $51^{st}$ through $60^{th}$ least significant data bits of second formatted data bits 1072.

Transmitter pad register γ.III 1044 can receive the $21^{st}$ through $30^{th}$ least significant data bits 1026 from transmitter data pad delay circuit α.III 1018.

Transmitter pad register γ.III 1044 can receive second mode 1068 of transmitter clock signal 1062 from transmitter clock pad delay circuit 1004. Transmitter pad register γ.III 1044 can produce the $21^{st}$ through $30^{th}$ and the $61^{st}$ through $70^{th}$ least significant data bits of second formatted data bits 1072.

Transmitter pad register γ.IV 1050 can receive the $31^{st}$ through $40^{th}$ least significant data bits 1028 from transmitter data pad delay circuit α.IV 1020. Transmitter pad register γ.IV 1050 can receive second mode 1068 of transmitter clock signal 1062 from transmitter clock pad delay circuit 1004. Transmitter pad register γ.IV 1050 can produce the $31^{st}$ through $40^{th}$ and the $71^{st}$ through $80^{th}$ least significant data bits of second formatted data bits 1072.

Transmitter pad register δ.I 1034 can receive the 1$^{st}$ through 10$^{th}$ least significant data bits 1022 from transmitter data pad delay circuit α.I 1014. Transmitter pad register δ.I 1034 can receive transmitter differential clock signal 1064 from transmitter clock pad delay circuit 1004. Transmitter pad register δ.I 1034 can produce the 1$^{st}$ through 10$^{th}$ and the 41$^{st}$ through 50$^{th}$ least significant data bits of third formatted data bits 1074.

Transmitter pad register δ.II 1040 can receive the 11$^{th}$ through 20$^{th}$ least significant data bits 1024 from transmitter data pad delay circuit α.II 1016. Transmitter pad register δ.II 1040 can receive transmitter differential clock signal 1064 from transmitter clock pad delay circuit 1004. Transmitter pad register δ.II 1040 can produce the 11$^{th}$ through 20$^{th}$ and the 51$^{st}$ through 60$^{th}$ least significant data bits of third formatted data bits 1074.

Transmitter pad register δ.III 1046 can receive the 21$^{st}$ through 30$^{th}$ least significant data bits 1026 from transmitter data pad delay circuit α.III 1018. Transmitter pad register δ.III 1046 can receive transmitter differential clock signal 1064 from transmitter clock pad delay circuit 1004. Transmitter pad register δ.III 1046 can produce the 21$^{st}$ through 30$^{th}$ and the 61$^{st}$ through 70$^{th}$ least significant data bits of third formatted data bits 1074.

Transmitter pad register δ.IV 1052 can receive the 31$^{st}$ through 40$^{th}$ least significant data bits 1028 from transmitter data pad delay circuit α.IV 1020. Transmitter pad register δ.IV 1052 can receive transmitter differential clock signal 1064 from transmitter clock pad delay circuit 1004. Transmitter pad register δ.IV 1052 can produce the 31$^{st}$ through 40$^{th}$ and the 71$^{st}$ through 80$^{th}$ least significant data bits of third formatted data bits 1074.

Transmitter register multiplexer 1012 can receive transmitter clock signal 1062, transmitter differential clock signal 1064, first formatted data bits 1070, second formatted data bits 1072, third formatted data bits 1074, a forty bit serial formatted signal 1078 from bus multiplexer H$_1$ 322 via loop back port L$_{H2R}$ 356, a four bit lock signal 1080 from the XGMII protocol signal, a four bit DATA SELECT signal 1082, a three bit MODE SELECT signal 1084, and a one bit DIFFERENTIAL CLOCK MODE SELECT signal 1086. Transmitter register multiplexer 1012 can transmit an eighty bit serial routing signal 1088, four bit lock signal 1080, a four bit routing clock signal 1090, and a one bit CLOCK MODE SELECT signal 1092 to three-way bus driver H$_{2.10}$ 924. Routing clock signal 1090 can also be transmitted to bus multiplexer H$_1$ 322.

Figure 11:
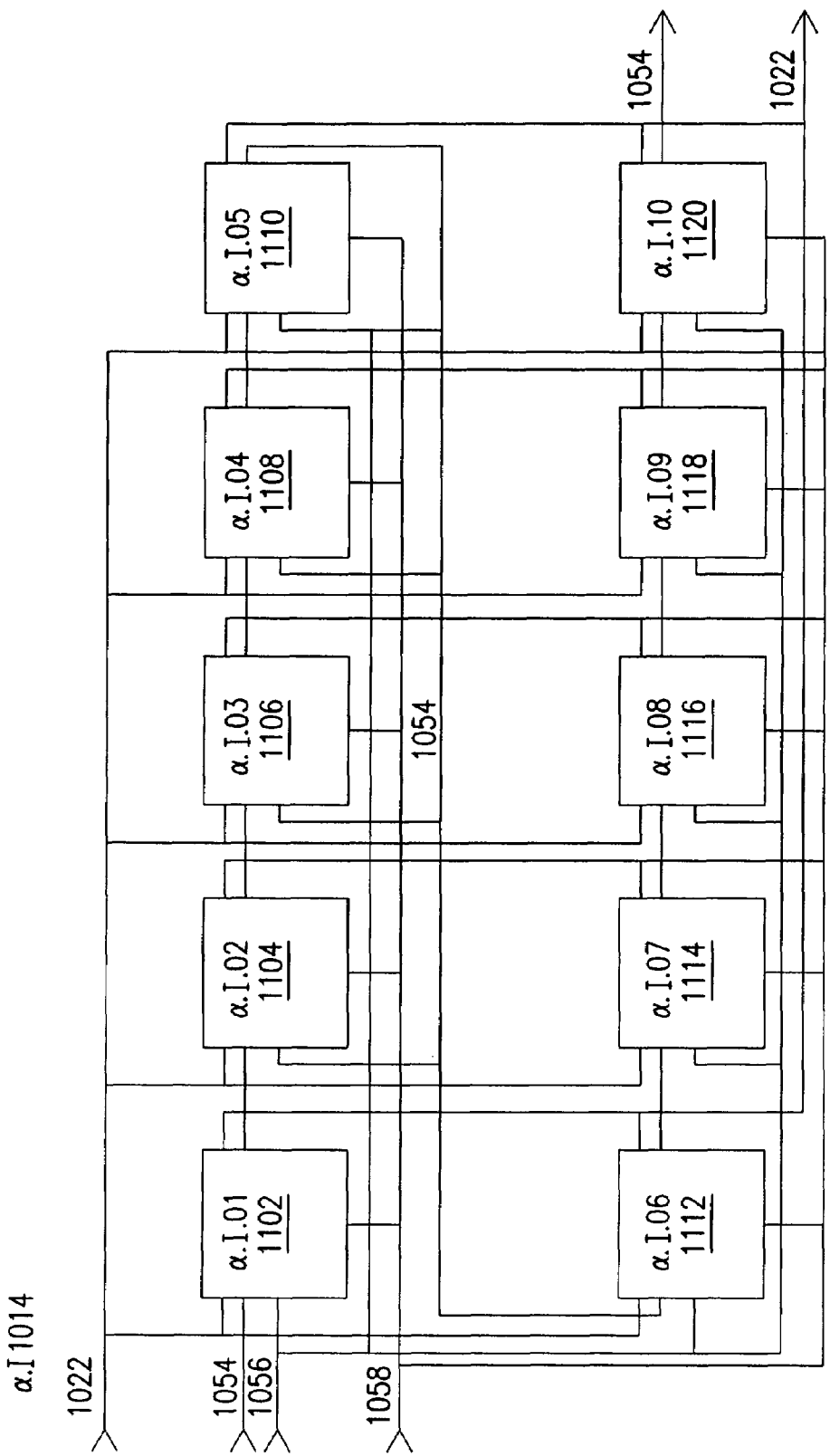
FIG. 11 is a block diagram of an embodiment of transmitter data pad delay circuit α.I 1014.

FIG. 11 is a block diagram of an embodiment of transmitter data pad delay circuit α.I 1014. Transmitter data pad delay circuits α.II 1016, α.III 1018, and α.IV 1020 can each be configured in a similar manner. Transmitter data pad delay circuit α.I 1014 comprises ten pad delay circuits: α.I.01 1102, α.I.02 1104, α.I.03 1106, α.I.04 1108, α.I.05 1110, α.I.06 1112, α.I.07 1114, α.I.08 1116, α.I.09 1118, and α.I.10 1120. Transmitter pad delay circuit α.I 1014 can receive the 1$^{st}$ through 10$^{th}$ least significant data bits 1022 of the XGMII protocol signal. Transmitter data pad delay circuit α.I 1014 can transmit the 1$^{st}$ through 10$^{th}$ least significant data bits 1022 to each of transmitter pad registers β.I 1030, γ.I 1032, and δ.I 1034. Transmitter pad delay circuit α.I 1014 can be used to synchronize the 1$^{st}$ through 10$^{th}$ least significant data bits 1022 of the XGMII protocol signal.

Each pad delay circuit can receive and transmit one data bit from the 1$^{st}$ through 10$^{th}$ least significant data bits 1022. Pad delay circuits α.I.01 1102, α.I.02 1104, α.I.03 1106, α.I.04 1108, α.I.05 1110, α.I.06 1112, α.I.07 1114, α.I.08 1116, α.I.09 1118, and α.I.10 1120 can receive and transmit, respectively, the 1$^{st}$ the 2$^{nd}$, the 3$^{rd}$, the 4$^{th}$, the 5$^{th}$, the 6$^{th}$, the 7$^{th}$, the 8$^{th}$, the 9$^{th}$, and the 10$^{th}$ least significant data bit 1140 of the 1$^{st}$ through 10$^{th}$ least significant data bits 1022. Each pad delay circuit can also receive delay set bit stream 1054 and delay set clock 1056. Each pad delay circuit can transmit delay set bit stream 1054. Delay set bit stream 1054 and delay set clock 1056 are described in greater detail below. Each pad delay circuit comprises three delay flip-flops. These are described in greater detail below. RESET signal 1058 can be used to reset all of the delay flip-flops in all of the pad delay circuits.

Figure 12:
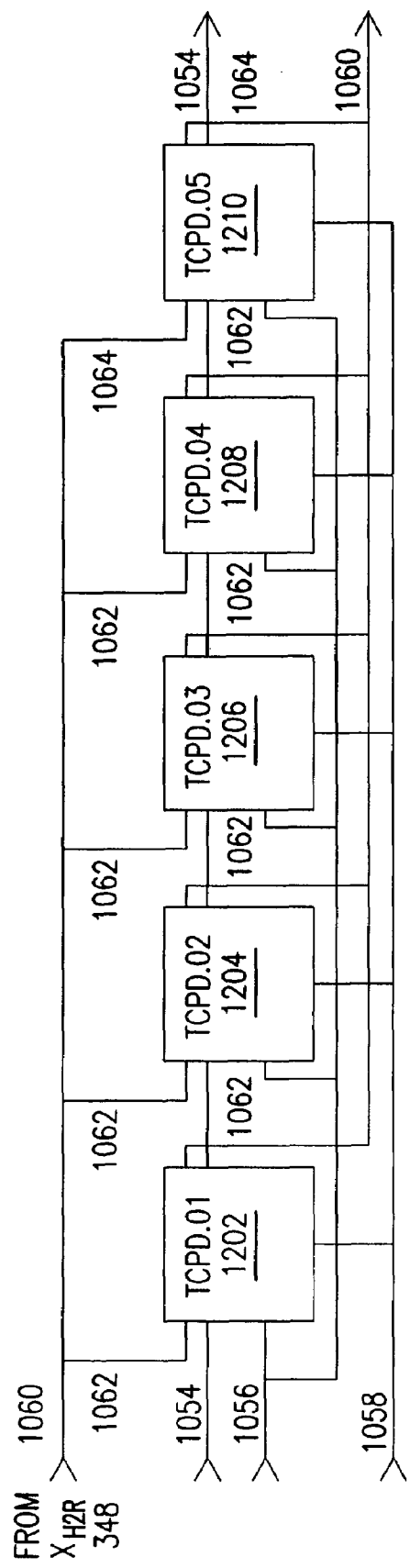
FIG. 12 is a block diagram of an embodiment of transmitter clock pad delay circuit 1004.

FIG. 12 is a block diagram of an embodiment of transmitter clock pad delay circuit 1004. Transmitter clock pad delay circuit 1004 can be used to synchronize the bits of transmitter clock pad delay clock signal 1060. Transmitter clock pad delay circuit 1004 comprises five pad delay circuits: TCPD.01 1202, TCPD.02 1204, TCPD.03 1206, TCPD.04 1208, and TCPD.05 1210.

Transmitter clock pad delay circuit 1004 can receive a five bit transmitter clock pad delay clock signal 1060 from external port X$_{H2R}$ 348. Five bit transmitter clock pad delay clock signal 1060 comprises four bit transmitter clock signal 1062 from the XGMII protocol signal and, optionally, one bit transmitter differential clock signal 1064. (If transmitter differential clock signal 1064 is not received from external port X$_{H2R}$ 348, the one bit of transmitter differential clock signal 1064 is set to ground.)

Transmitter clock pad delay circuit 1004 can transmit first mode 1066 of transmitter clock signal 1062 to each transmitter pad register in bank of transmitter pad registers β 1006, second mode 1068 of transmitter clock signal 1062 to each transmitter pad register in bank of transmitter pad registers γ 1006, and transmitter differential clock signal 1064 to each transmitter pad register in bank of transmitter pad registers δ 1010. Transmitter clock signal 1062 and transmitter differential clock signal 1064 can also be transmitted to transmitter register multiplexer 1012.

Each pad delay circuit can receive and transmit one bit from transmitter clock pad delay clock signal 1060. Pad delay circuits TCPD.01 1202, TCPD.02 1204, TCPD.03 1206, TCPD.04 1208, and TCPD.05 1210 can receive and transmit, respectively, the 1$^{st}$ least significant bit of transmitter clock signal 1062, the 2$^{nd}$ least significant bit of transmitter clock signal 1062, the 3$^{rd}$ least significant bit of transmitter clock signal 1062, the 4$^{th}$ least significant bit of transmitter clock signal 1062, and the one bit of transmitter differential clock signal 1064. Each pad delay circuit can also receive delay set bit stream 1054 and delay set clock 1056. Each pad delay circuit can transmit delay set bit stream 1054. Delay set bit stream 1054 and delay set clock 1056 are described in greater detail below. Each pad delay circuit comprises three delay flip-flops. These are described in greater detail below. RESET signal 1058 can be used to reset all of the delay flip-flops in all of the pad delay circuits.

Figures 13A, 13B:
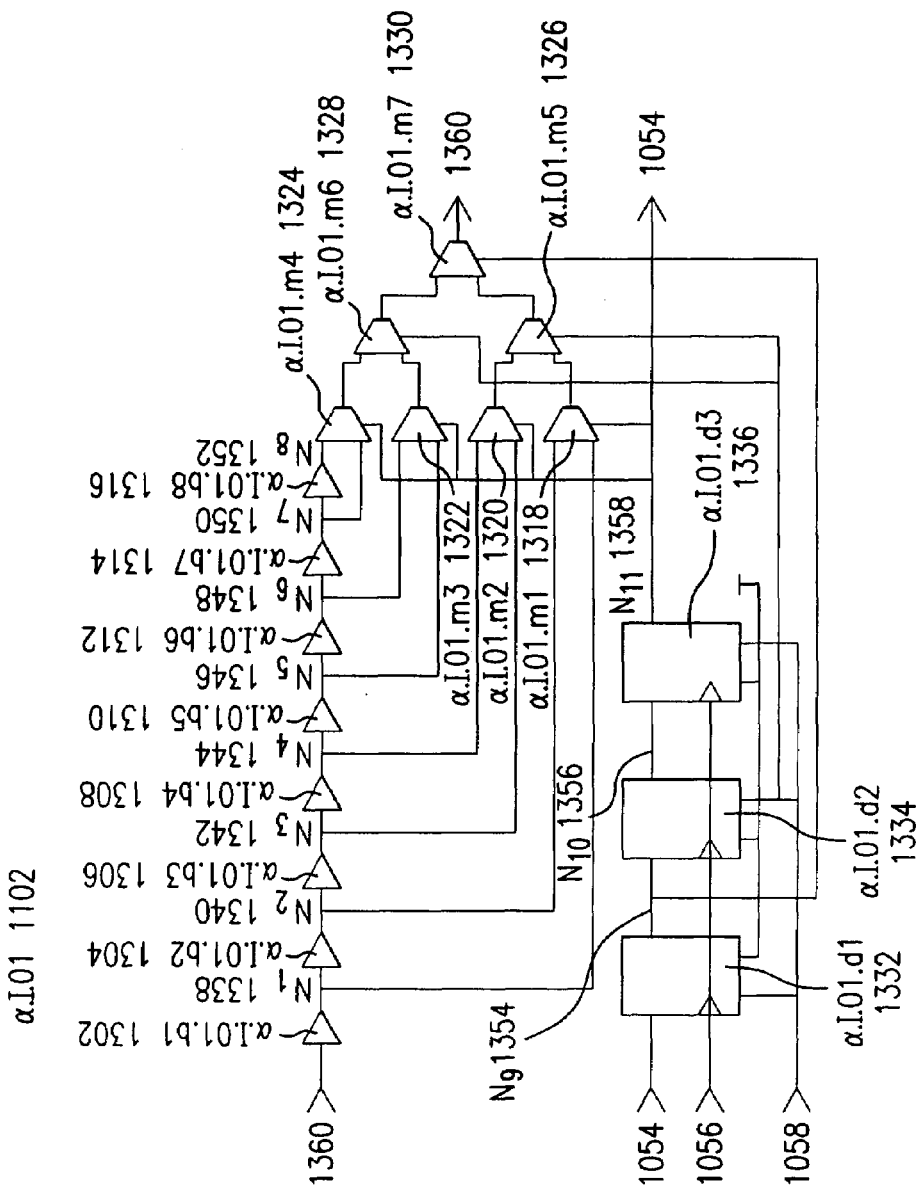
FIG. 13A is a schematic diagram of an embodiment of pad delay circuit α.I.01 1102.
FIG. 13B is a truth table 1380 that shows, as a function of the value of each of nodes $N_9$ 1354, $N_{10}$ 1356, and $N_{11}$ 1358, the delay buffer node that is connected to output 1364.

FIG. 13A is a schematic diagram of an embodiment of pad delay circuit α.I.01 1102. Pad delay circuits α.I.02 1104, α.I.03 1106, α.I.04 1108, α.I.05 1110, α.I.06 1112, α.I.07 1114, α.I.08 1116, α.I.09 1118, α.I.10 1120, TCPD.01 1202, TCPD.02 1204, TCPD.03 1206, TCPD.04 1208, and TCPD.05 1210 can each be configured in a similar manner.

Pad delay circuit α.I.01 1102 comprises eight delay buffers: α.I.01.b1 1302, α.I.01.b2 1304, α.I.01.b3 1306, α.I.01.b4 1308, α.I.01.b5 1310, α.I.01.b6 1312, α.I.01.b7 1314, and α.I.01.b8 1316, seven multiplexers: α.I.01.m1 1318, α.I.01.m2 1320, α.I.01.m3 1322, α.I.01.m4 1324, α.I.01.m5 1326, α.I.01.m6 1328, and α.I.01.m7 1330, and three delay flip-flops: α.I.01.d1 1332, α.I.01.d2 1334, and α.I.01.d3 1336.

The eight delay buffers are coupled in series: α.I.01.b1 1302 is coupled to a.1.01 .b2 1304 at a node $N_1$ 1338, α.I.01.b2 1304 is coupled to α.I.01.b3 1306 at a node $N_2$ 1340, α.I.01.b3 1306 is coupled to α.I.01.b4 1308 at a node $N_3$ 1342, α.I.01.b4 1308 is coupled to α.I.01.b5 1310 at a node $N_4$ 1344, α.I.01.b5 1310 is coupled to α.I.01.b6 1312 at a node $N_5$ 1346, α.I.01.b6 1312 is coupled to α.I.01.b7 1314 at anode $N_6$ 1348, and α.I.01.b7 1314 is coupled to α.I.01.b8 1316 at a node $N_7$ 1350. The output of delay buffer α.I.01.b8 1316 is at a node $N_8$ 1352.

The three delay flip-flops are coupled in series: α.I.01.d1 1332 is coupled to α.I.01.d2 1334 at a node $N_9$ 1354, and α.I.01.d2 1334 is coupled to α.I.01.d3 1336 at a node $N_{10}$ 1356. The output of delay flip-flop α.I.01.d3 1336 is at anode $N_{11}$ 1358. RESET signal 1058 can be used to reset all of the delay flip-flops.

Multiplexer α.I.01.m1 1318 can receive inputs from nodes $N_1$ 1338 and $N_2$ 1340. The value of node $N_{11}$ 1358 determines whether multiplexer α.I.01.m1 1318 will transmit the value of node $N_1$ 1338 or the value of node $N_2$ 1340. Multiplexer α.I.01.m2 1320 can receive inputs from nodes $N_3$ 1342 and $N_4$ 1344. The value of node $N_{11}$ 1358 determines whether multiplexer α.I.01.m2 1320 will transmit the value of node $N_3$ 1342 or the value of node $N_4$ 1344. Multiplexer α.I.01.m3 1322 can receive inputs from nodes $N_5$ 1346 and $N_6$ 1348. The value of node $N_{11}$ 1358 determines whether multiplexer α.I.01.m3 1322 will transmit the value of node $N_5$ 1346 or the value of node $N_6$ 1348. Multiplexer α.I.01.m4 1324 can receive inputs from nodes $N_7$ 1350 and $N_8$ 1352. The value of node $N_{11}$ 1358 determines whether multiplexer α.I.01.m4 1324 will transmit the value of node $N_7$ 1350 or the value of node $N_8$ 1352.

Multiplexer α.I.01.m5 1326 can receive inputs from multiplexers α.I.01.m1 1318 and α.I.01.m2 1320. The value of node $N_{10}$ 1356 determines whether multiplexer α.I.01.m5 1326 will transmit the value of multiplexer α.I.01.m1 1318 or the value of multiplexer α.I.01.m2 1320. Multiplexer α.I.01.m6 1328 can receive inputs from multiplexers α.I.01.m3 1322 and α.I.01.m4 1324. The value of node $N_{10}$ 1356 determines whether multiplexer α.I.01.m6 1328 will transmit the value of multiplexer α.I.01.m3 1322 or the value of multiplexer α.I.01.m4 1324. Multiplexer α.I.01.m7 1330 can receive inputs from multiplexers α.I.01.m5 1326 and α.I.01.m6 1328. The value of node $N_9$ 1354 determines whether multiplexer α.I.01.m7 1330 will transmit the value of multiplexer α.I.01.m5 1326 or the value of multiplexer α.I.01.m6 1328.

Pad delay circuit α.I.01 1102 can receive a bit 1360 at an input 1362 and transmit bit 1360 at an output 1364. Each delay buffer delays bit 1360 as it traverses the interconnect. The multiplexers determine the number of delay buffers through which bit 1360 traverses en route to output 1364. FIG. 13B is a truth table 1380 that shows, as a function of the value of each of nodes $N_9$ 1354, $N_{10}$ 1356, and $N_{11}$ 1358, the delay buffer node that is connected to output 1364. For example, truth table 1380 shows that if the value of each of nodes $N_9$ 1354, $N_{10}$ 1356, and $N_{11}$ 1358 is, respectively, 1, 0, and 1, then node $N_5$ 1346 is connected to output 1364. In this situation, bit 1360 received at input 1362 traverses through five delay buffers en route to output 1364. Thus, the degree to which bit 1360 is delayed can be adjusted in increments by changing the value of any of nodes $N_9$ 1354, $N_{10}$ 1356, and $N_{11}$ 1358.

Pad delay circuit α.I.01 1102 can also receive delay set bit stream 1054 and delay set clock 1056. Delay set clock 1056 is used to clock all of the delay flip-flops. Delay set bit stream 1054 is used to change the values of nodes $N_9$ 1354, $N_{10}$ 1356, and $N_{11}$ 1358. For example, a first bit of delay set bit stream 1054 is received from outside of bus 300 at delay flip-flop α.I.01.d1 1332. With a first cycle of delay set clock 1056, the first bit is produced at the output of delay flip-flop α.I.01.d1 1332 ($N_9$ 1354) and is received at delay flip-flop α.I.01.d2 1334, and a second bit of delay set bit stream 1054 is received at delay flip-flop α.I.01.d1 1332. With a second cycle of delay set clock 1056, the first bit is produced at the output of delay flip-flop α.I.01.d2 1334 ($N_{10}$ 1356) and is received at delay flip-flop α.I.01.d3 1336, the second bit is produced at the output of delay flip-flop α.I.01.d1 1332 ($N_9$ 1354) and is received at delay flip-flop α.I.01.d2 1334, and a third bit of delay set bit stream 1054 is received at delay flip-flop α.I.01.d1 1332. With a third cycle of delay set clock 1056, the first bit is produced at the output of delay flip-flop α.I.01.d3 1336 ($N_{11}$ 1358) and is received at a delay flip-flop (not shown) of pad delay circuit α.I.02 1104 (at FIG. 11), the second bit is produced at the output of delay flip-flop α.I.01.d2 1334 ($N_{10}$ 1356) and is received at delay flip-flop α.I.01.d1 1332, the third bit is produced at the output of delay flip-flop α.I.01.d1 1332 ($N_9$ 1354) and is received at delay flip-flop α.I.01.d2 1334, and a fourth bit of delay set bit stream 1054 is received at delay flip-flop α.I.01.d1 1332.

As cycles of delay set clock 1056 continue in this manner, the first bit is received at a delay flip-flop (not shown) of a pad delay circuit (not shown) of transmitter data pad delay circuit α.II 1016 (at FIG. 10). As cycles of delay set clock 1056 continue in this manner, the first bit is received at a delay flip-flop (not shown) of pad delay circuit TCPD.01 1202 (at FIG. 12) of transmitter clock pad delay circuit 1004 (at FIG. 10). As cycles of delay set clock 1056 continue in this manner, the first bit is received at a delay flip-flop (not shown) of bus multiplexer $H_1$ 322. The manner in which bus multiplexer $H_1$ 322 uses delay set bit stream 1054 is described in greater detail below.

After bus 300 is manufactured, tests can be performed to determine a value for each of nodes $N_9$ 1354, $N_{10}$ 1356, and $N_{11}$ 1358 for each of the pad delay circuits that yields a desired delay time for the corresponding bit 1360 processed by the pad delay circuit. Once a value for each of nodes $N_9$ 1354, $N_{10}$ 1356, and $N_{11}$ 1358 for each of the pad delay circuits is determined, the values are assembled as delay set bit stream 1054 and clocked to their appropriate delay flip-flops using delay set clock 1056. Once each of nodes $N_9$ 1354, $N_{10}$ 1356, and $N_{11}$ 1358 for each of the pad delay circuits is set to its corresponding determined value, delay set clock 1056 is disabled so that each of nodes $N_9$ 1354, $N_{10}$ 1356, and $N_{11}$ 1358 for each of the pad delay circuits is locked at its corresponding determined value.

The pad delay circuits augment the process described above in which variations in the time consumed for the bits to traverse their respective interconnects (i.e., the path delay times) are compensated by the time consumed for the bits to traverse across the cross link multiplexer (i.e., the gate delay times). Recall that having the lengths of all of the interconnects between two adjacent multiplexer pairs substantially the same facilitates maintaining synchronization among the bits as they traverse their respective interconnects. However, the bits can become unsynchronized due to coupling phase shifts, variations in the timing of wave formations, and the like. Also, limitations in fabrication processes can result in differences in interconnect lengths. In these situations, the bits can be received by the cross link multiplexer delay flip-flops at various points in time of a clock cycle. Once received by the cross link multiplexer delay flip-flops, the bits are stored and then, at the next clock cycle, transmitted at the same point in time of that clock cycle.

This process assumes that the variations in the time consumed for the bits to traverse their respective interconnects are within a clock cycle. It is possible that this may not be the case when the signals are received from outside of bus 300, where the lengths of the various interconnects traversed by the bits may be unknown. Difficulties with synchronization may also be more likely among serial formatted signals than among parallel formatted signals because protocols that use parallel formatted signals are inherently concerned with maintaining synchronization among the bits. For at least these reasons, bus 300 can include pad delay circuits in bus multiplexers $F_1$ 314, $F_2$ 316, $H_1$ 322, $H_2$ 324, or any combination of the foregoing.

Figure 14:
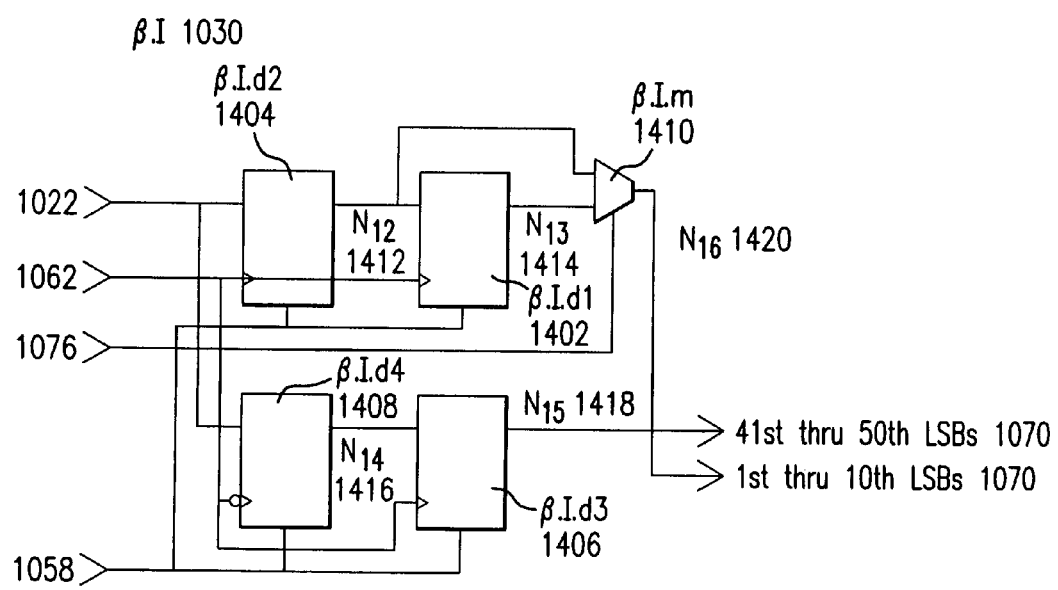
FIG. 14 is a schematic diagram of an embodiment of transmitter pad register β.I 1030.

FIG. 14 is a schematic diagram of an embodiment of transmitter pad register β.I 1030. Transmitter pad registers β.II 1036, β.III 1042, β.IV 1048, β.I 1032, γ.II 1038, γ.III 1044, γ.IV 1050, δ.I 1034, δ.II 1040, δ.III 1046, and δ.IV 1052 can each be configured in a similar manner. Transmitter pad register β.I 1030 comprises four delay flip-flops: β.I.d1 1402, β.I.d2 1404, β.I.d3 1406, and β.I.d4 1408, and a multiplexer β.I.m 1410. Delay flip-flops β.I.d1 1402, β.I.d2 1404, and β.I.d3 1406 are rising edge flip-flops. They each receive a bit on a rising edge of a clock cycle. Delay flip-flop β.I.d4 1408 is a falling edge flip-flop. It receives a bit on a falling edge of a clock cycle.

Delay flip-flops β.I.d1 1402 and β.I.d2 1404 are coupled in series at a node $N_{12}$ 1412. The output of delay flip-flop β.I.d1 1402 is at a node $N_{13}$ 1414. Delay flip-flops β.I.d3 1406 and β.I.d4 1408 are coupled in series at a node $N_{14}$ 1416. The output of delay flip-flop β.I.d3 1406 is at a node $N_{15}$ 1418. First mode 1066 of transmitter clock signal 1062 is used to clock all of the delay flip-flops. RESET signal 1058 can be used to reset all of the delay flip-flops.

Multiplexer β.I.m 1410 can receive inputs from nodes $N_{12}$ 1412 and $N_{13}$ 1414. The output of multiplexer β.I.m 1410 is at a node $N_{16}$ 1420. The value of CLOCK POLARITY signal 1076 determines whether multiplexer β.I.m 1410 will transmit the value of node $N_{12}$ 1412 or the value of node $N_{13}$ 1414. If transmitter clock signal 1062 has a positive polarity, then multiplexer β.I.m 1410 will transmit the value of node $N_{12}$ 1412. If transmitter clock signal 1062 has a negative polarity, then multiplexer β.I.m 1410 will transmit the value of node $N_{13}$ 1414.

Transmitter pad register β.I 1030 can receive the $1^{st}$ through $10^{th}$ least significant data bits 1022 from transmitter data pad delay circuit α.I 1014 at an input 1422. Input 1422 is coupled to the inputs of both delay flip-flop β.I.d2 1404 and delay flip-flop β.I.d4 1408. Transmitter pad register β.I 1030 can produce the $1^{st}$ through $10^{th}$ least significant data bits of first formatted data bits 1070 at node $N_{16}$ 1420. Transmitter pad register β.I 1030 can produce the $41^{st}$ through $50^{th}$ least significant data bits of first formatted data bits 1070 at node $N_{15}$ 1418.

Figure 15A:
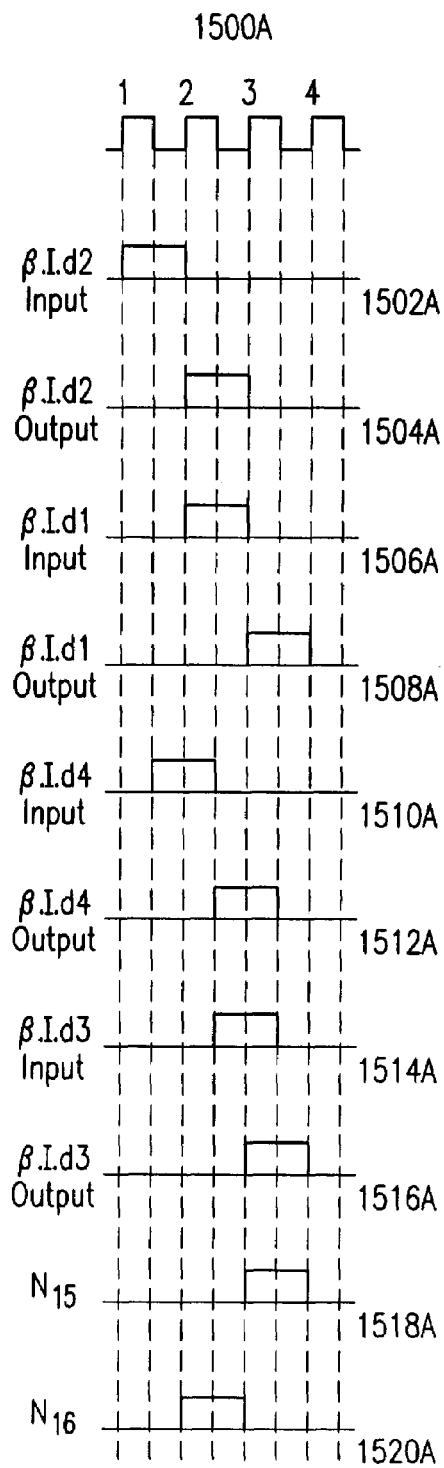
FIGS. 15A and 15B show series of graphs 1500A and 1500B that depict a bit being processed by transmitter pad register β.I 1030 in response to, respectively, transmitter clock signal 1062 having a positive polarity and transmitter clock signal 1062 having a negative polarity.
Figure 15B:
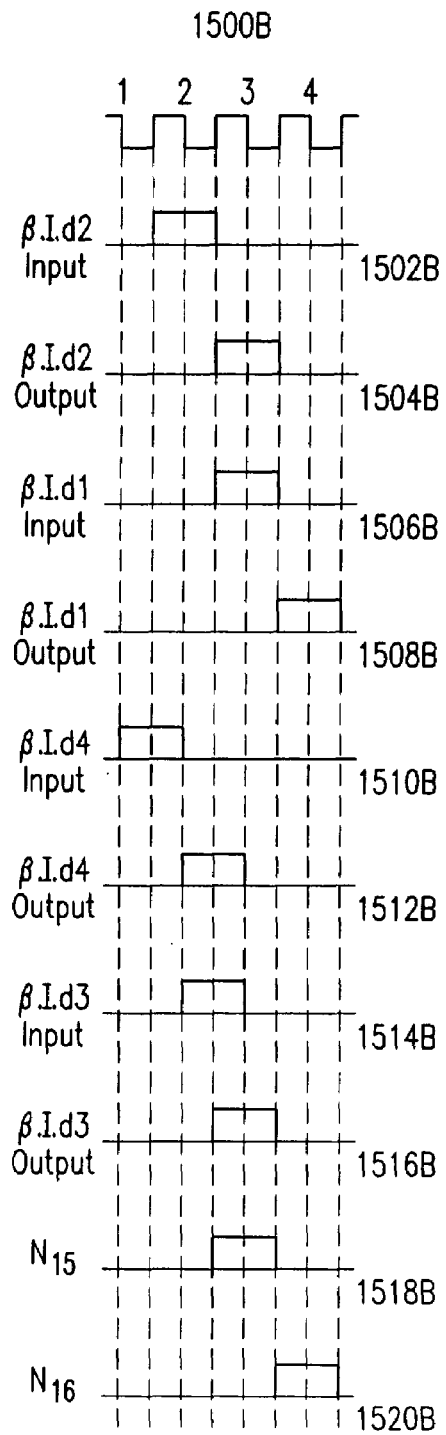

FIGS. 15A and 15B show series of graphs 1500A and 1500B that depict a bit being processed by transmitter pad register β.I 1030 in response to, respectively, transmitter clock signal 1062 having a positive polarity and transmitter clock signal 1062 having a negative polarity. Series of graphs 1500A and 1500B assume that: (1) transmitter pad register β.I 1030 has processed a stream of bits with values of zero, (2) at a first clock cycle, a bit with a value of one is received at input 1422, and (3) at subsequent clock cycles, a stream of bits with values of zero are received at input 1422.

At series of graphs 1500A, at a rising edge of a first clock cycle, the bit with the value of one is received at the input of delay flip-flop β.I.d2 1404 (graph 1502A). At a falling edge of first clock cycle, the bit with the value of one is received at the input of delay flip-flop β.I.d4 1408 (graph 1510A). At a rising edge of a second clock cycle, the bit with the value of one is received at the output of delay flip-flop β.I.d2 1404 (graph 1504A), at the input of delay flip-flop β.I.d1 1402 (graph 1506A), and at node $N_{16}$ 1420 (graph 1520A) as the $1^{st}$ through $10^{th}$ least significant data bits of first formatted data bits 1070. At a falling edge of second clock cycle, the bit with the value of one is received at the output of delay flip-flop β.I.d4 1408 (graph 1512A) and at the input of delay flip-flop β.I.d3 1406 (graph 1514A). At a rising edge of a third clock cycle, the bit with the value of one is received at the output of delay flip-flop β.I.d1 1402 (graph 1508A), at the output of delay flip-flop β.I.d3 1406 (graph 1516A), and at node $N_{15}$ 1418 (graph 1518A) as the $41^{st}$ through $50^{th}$ least significant data bits of first formatted data bits 1070. Thus, when transmitter clock signal 1062 has a positive polarity, data for each XGMII character is first transmitted within the forty least significant bits of first formatted data bits 1070, then within the forty most significant bits of first formatted data bits 1070.

At series of graphs 1500B, at a falling edge of a first clock cycle, the bit with the value of one is received at the input of delay flip-flop β.I.d4 1408 (graph 1510B). At a rising edge of first clock cycle, the bit with the value of one is received at the input of delay flip-flop β.I.d2 1404 (graph 1502B). At a falling edge of a second clock cycle, the bit with the value of one is received at the output of delay flip-flop β.I.d4 1408 (graph 1512B) and at the input of delay flip-flop β.I.d3 1406 (graph 1514B). At a rising edge of second clock cycle, the bit with the value of one is received at the output of delay flip-flop β.I.d2 1404 (graph 1504B), at the input of delay flip-flop β.I.d1 1402 (graph 1506B), at the output of delay flip-flop β.I.d3 1406 (graph 1516B), and at node $N_{15}$ 1418 (graph 1518B) as the $41^{st}$ through $50^{th}$ least significant data bits of first formatted data bits 1070. At a falling edge of a third clock cycle, the bit with the value of one is received at the output of delay flip-flop β.I.d1 1402 (graph 1508B) and at node $N_{16}$ 1420 (graph 1520B) as the $1^{st}$ through $10^{th}$ least significant data bits of first formatted data bits 1070. Thus, when transmitter clock signal 1062 has a negative polarity, data for each XGMII character is first transmitted within the forty most significant bits of first formatted data bits 1070, then within the forty least significant bits of first formatted data bits 1070.

Figure 16:
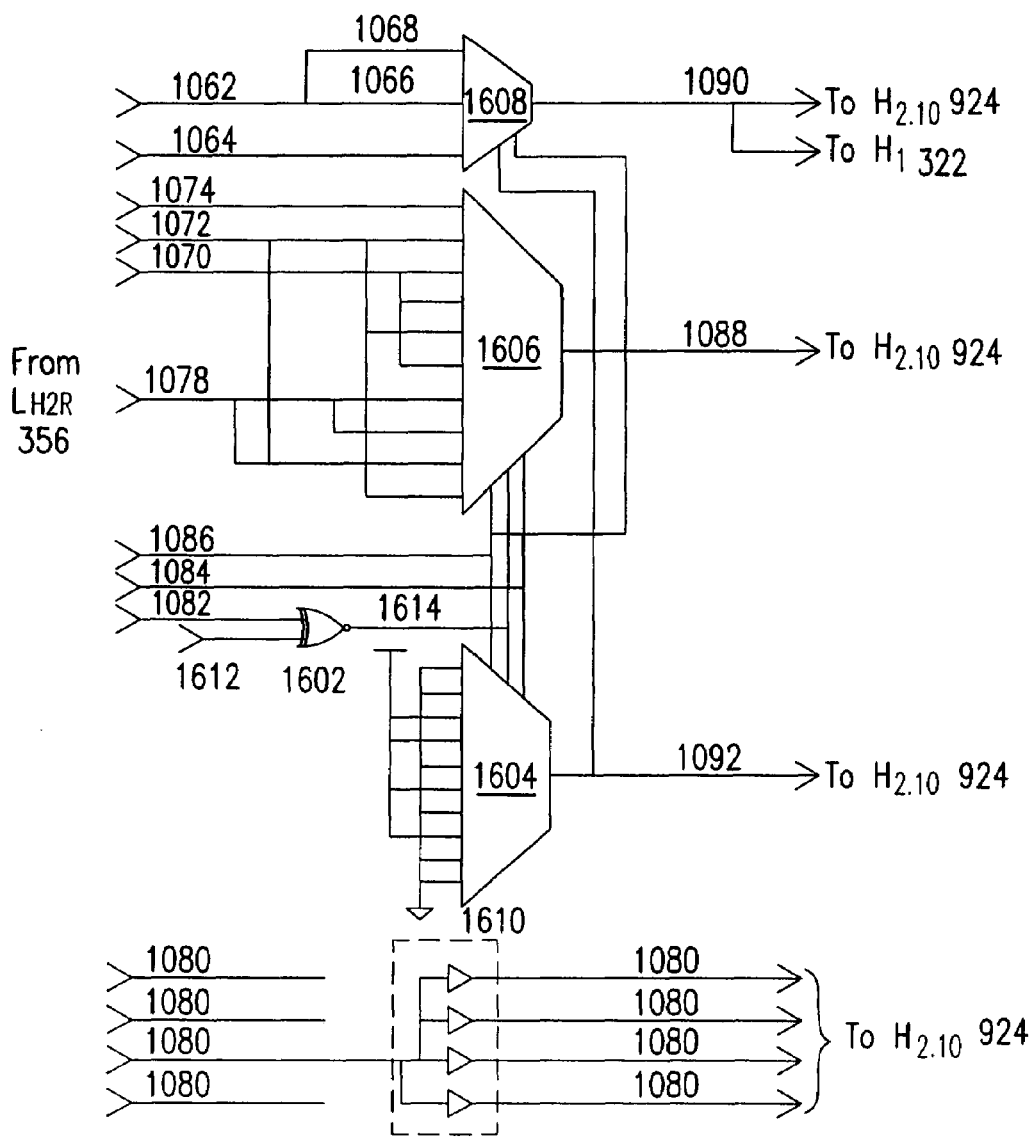
FIG. 16 is a schematic diagram of an embodiment of transmitter register multiplexer 1012.

FIG. 16 is a schematic diagram of an embodiment of transmitter register multiplexer 1012. Transmitter register multiplexer 1012 comprises an Exclusive NOR gate 1602, a first multiplexer 1604, a second multiplexer 1606, a third multiplexer 1608, and a bank of delay buffers 1610.

Exclusive NOR gate 1602 can receive four bit DATA SELECT signal 1082 and a four bit AUXILIARY MODE SELECT signal 1612. Exclusive NOR gate 1602 can produce a one bit COMPARE signal 1614. If DATA SELECT signal 1082 and AUXILIARY MODE SELECT signal 1612 match each other, then COMPARE signal 1614 is one; otherwise, COMPARE signal 1614 is zero.

First multiplexer 1604 can receive ten different one bit inputs. Each input is related to a mode by which XGMII protocol signals can be communicated. The values of one bit DIFFERENTIAL CLOCK MODE SELECT signal 1086, three bit MODE SELECT signal 1084, and one bit COMPARE signal 1614 determine which of the ten different inputs that first multiplexer 1604 will transmit to three-way bus driver $H_{2.10}$ 924 as one bit CLOCK MODE SELECT signal 1092.

Second multiplexer 1606 can receive ten different eighty bit inputs. Each input is related to a mode by which XGMII protocol signals can be communicated. Each input is first formatted data bits 1070, second formatted data bits 1072, third formatted data bits 1074, forty bit serial formatted signal 1078 from loop back port $L_{H2R}$ 356, or some combination of the foregoing. For serial formatted signal 1078, forty dummy bits are used as the forty most significant bits. The values of one bit DIFFERENTIAL CLOCK MODE SELECT signal 1086, three bit MODE SELECT signal 1084, and one bit COMPARE signal 1614 determine which of the ten different inputs that second multiplexer 1606 will transmit to three-way bus driver $H_{2.10}$ 924 as eighty bit serial routing signal 1088.

Third multiplexer 1608 can receive transmitter clock signal 1062 and transmitter differential clock signal 1064. Transmitter clock signal 1062 can be configured for two modes of operation. In first mode 1066, all four bits of transmitter clock signal 1062 are transmitted in parallel along four interconnect routes. In second mode 1068, one of the four bits of transmitter clock signal 1062 is transmitted in parallel along each of the four interconnect routes. For example, in second mode 1068 the second least significant bit of the four bits on transmitter clock signal 1062 is transmitted in parallel along each of the four interconnect routes. The values of one bit DIFFERENTIAL CLOCK MODE SELECT signal 1086 and one bit CLOCK MODE SELECT signal 1092 which of first mode 1066 of transmitter clock signal 1062, second mode 1068 of transmitter clock signal 1062, or transmitter differential clock signal 1064 that third multiplexer 1608 will transmit to three-way bus driver $H_{2.10}$ 924 as four bit routing clock signal 1090. Routing clock signal 1090 can also be transmitted to bus multiplexer $H_1$ 322. The manner in which bus multiplexer $H_1$ 322 uses routing clock signal 1090 is described in greater detail below.

Bank of delay buffers 1610 can receive one of the four bits of lock signal 1080. For example, bank of delay buffers 1610 can receive the second least significant bit of the four bits of lock signal 1080. The received bit of lock signal 1080 is transmitted in parallel along each of four interconnect routes through corresponding delay buffers of bank of delay buffers 1610 to three-way bus driver $H_{2.10}$ 924 as four bit lock signal 1080.

Figure 17:
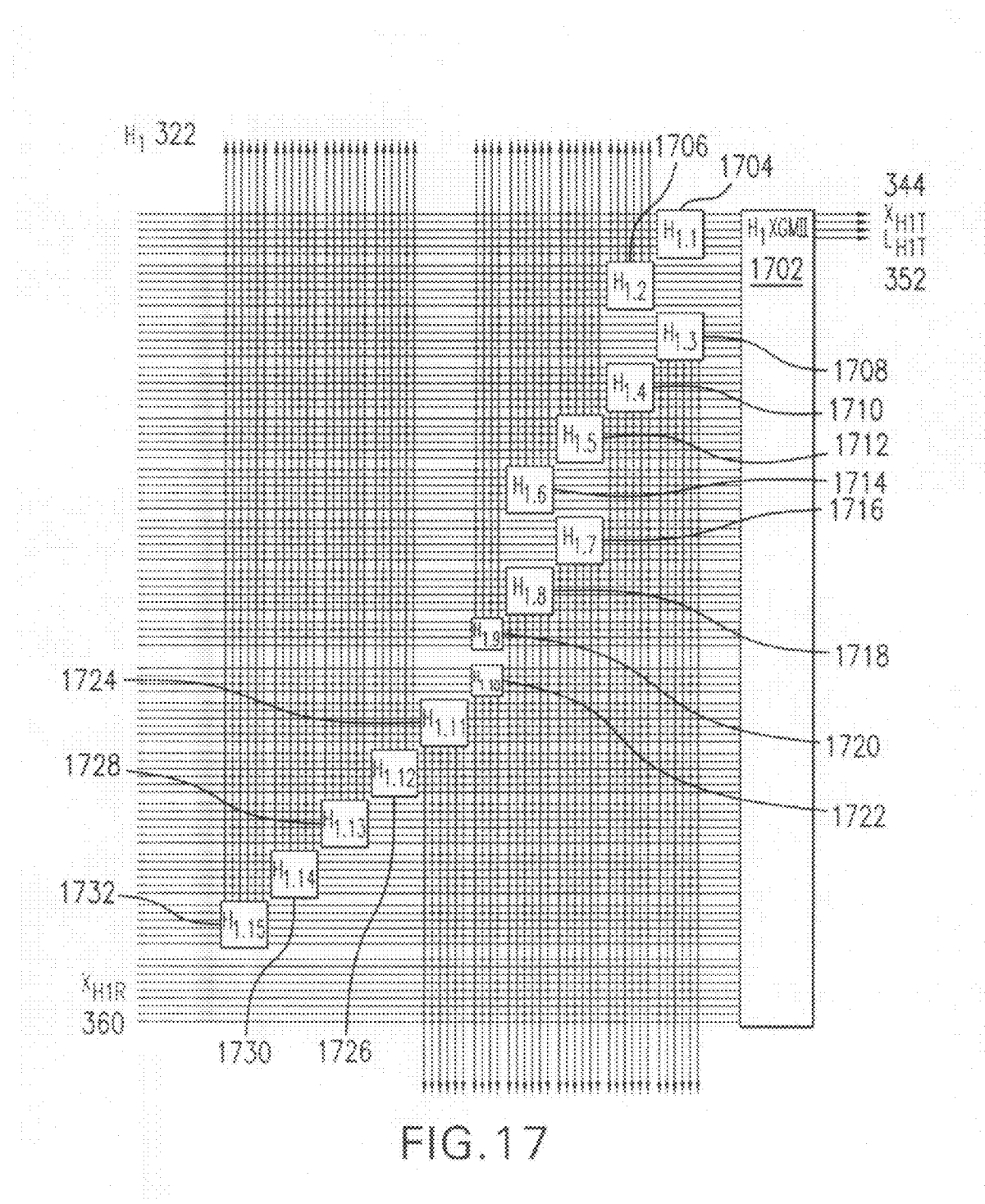
FIG. 17 is a block diagram of an embodiment of cross link bus multiplexer $H_1$ 322.

FIG. 17 is a block diagram of an embodiment of cross link bus multiplexer $H_1$ 322. Bus multiplexer $H_1$ 322 comprises a parallel receiver pad register $H_1$XGMII 702 and fifteen two-way bus drivers: $H_{1.1}$ 1704, $H_{1.2}$ 1706, $H_{1.3}$ 1708, $H_{1.4}$ 1710, $H_{1.5}$ 1712, $H_{1.6}$ 1714, $H_{1.7}$ 1716, $H_{1.8}$ 1718, $H_{1.9}$ 1720, $H_{1.10}$ 1722, $H_{1.11}$ 1724, $H_{1.12}$ 1726, $H_{1.13}$ 1728, $H_{1.14}$ 1730, and $H_{1.15}$ 1732. Each of the bus drivers can receive a signal and transmit it to parallel receiver pad register $H_1$XGMII 1702. The two-way bus drivers can each be configured in a similar manner as two-way bus driver $E_{1.1}$ 506, described above with reference to FIG. 8. Bus multiplexer $H_1$ 322 has external port $X_{H1T}$ 344 than can transmit XGMII protocol signals. Bus multiplexer $H_1$ 322 also has external port $X_{H1R}$ 360 that can receive serial formatted signals and loop back port $L_{H1T}$ 352 that can transmit the serial formatted signals to bus multiplexer $H_2$ 324.

Two-way bus driver $H_{1.1}$ 1704 can receive a XAUI protocol signal from external port $X_{G1X}$ 330 via bus multiplexer $G_2$ 320. Driver $H_{1.1}$ 1704 can transmit this signal to bus multiplexer $H_2$ 324. Two-way bus driver $H_{1.2}$ 1706 can receive a XAUI protocol signal from external port $X_{G2X}$ 332. Driver $H_{1.2}$ 1706 can transmit this signal to bus multiplexer $E_1$ 310 via bus multiplexer $H_2$ 324. Two-way bus driver $H_{1.3}$ 1708 can receive a XAUI protocol signal from external port $X_{E2X}$ 328 via bus multiplexer $H_2$ 324. Two-way bus driver $H_{1.4}$ 1710 can receive a XAUI protocol signal from external port $X_{E1X}$ 326 via bus multiplexer $H_2$ 324. Driver $H_{1.4}$ 1710 can transmit this signal to bus multiplexer $G_2$ 320.

Two-way bus driver $H_{1.5}$ 1712 can receive a CDL protocol signal from external port $X_{G1C}$ 338 via bus multiplexer $G_2$ 320. Driver $H_{1.5}$ 1712 can transmit this signal to bus multiplexer $H_2$ 324. Two-way bus driver $H_{1.6}$ 1714 can receive a CDL protocol signal from external port $X_{G2C}$ 340. Driver $H_{1.6}$ 1714 can transmit this signal to bus multiplexer $E_1$ 310 via bus multiplexer $H_2$ 324. Two-way bus driver $H_{1.7}$ 1716 can receive a CDL protocol signal from external port $X_{E2C}$ 336 via bus multiplexer $H_2$ 324. Two-way bus driver $H_{1.8}$ 1718 can receive a CDL protocol signal from external port $X_{E1C}$ 334 via bus multiplexer $H_2$ 324. Driver $H_{1.8}$ 1718 can transmit this signal to bus multiplexer $G_2$ 320.

Two-way bus driver $H_{1.9}$ 1720 can receive an XGMII protocol signal from external port $X_{F2}$ 346 via bus multiplexer $G_2$ 320. Two-way bus driver $H_{1.10}$ 1722 can receive an XGMII protocol signal from external port $X_{H2}$ 348. Driver $H_{1.10}$ 1722 can transmit this signal to bus multiplexer $F_2$ 316 via bus multiplexer $G_2$ 320.

Two-way bus driver $H_{1.11}$ 1724 can receive a PBERT signal from internal port $I_5$ 370 via bus multiplexer $H_2$ 324. Driver $H_{1.11}$ 1724 can transmit this signal to bus multiplexer $F_2$ 316 via bus multiplexer $G_2$ 320.

Two-way bus driver $H_{1.12}$ 1726 can receive a signal from internal port $I_1$ 362 via bus multiplexer $G_2$ 320. Driver $H_{1.12}$ 1726 can transmit this signal to bus multiplexer $H_2$ 324. Two-way bus driver $H_{1.13}$ 1728 can receive a signal from internal port $I_2$ 364 via bus multiplexer $G_2$ 320. Driver $H_{1.13}$ 1728 can transmit this signal to bus multiplexer $H_2$ 324. Two-way bus driver $H_{1.14}$ 1730 can receive a signal from internal port $I_3$ 366 via bus multiplexer $G_2$ 320. Two-way bus driver $H_{1.15}$ 1732 can receive a signal from internal port $I_4$ 368 via bus multiplexer $G_2$ 320.

Bus multiplexer $F_1$ 314 can be configured in a similar manner to that of bus multiplexer $H_1$ 322, but bus multiplexer $F_1$ 314 also comprises a cross link multiplexer $F_1CORE_3$ for routing signals received from and transmitted to internal port $I_3$ 362.

Figure 18:
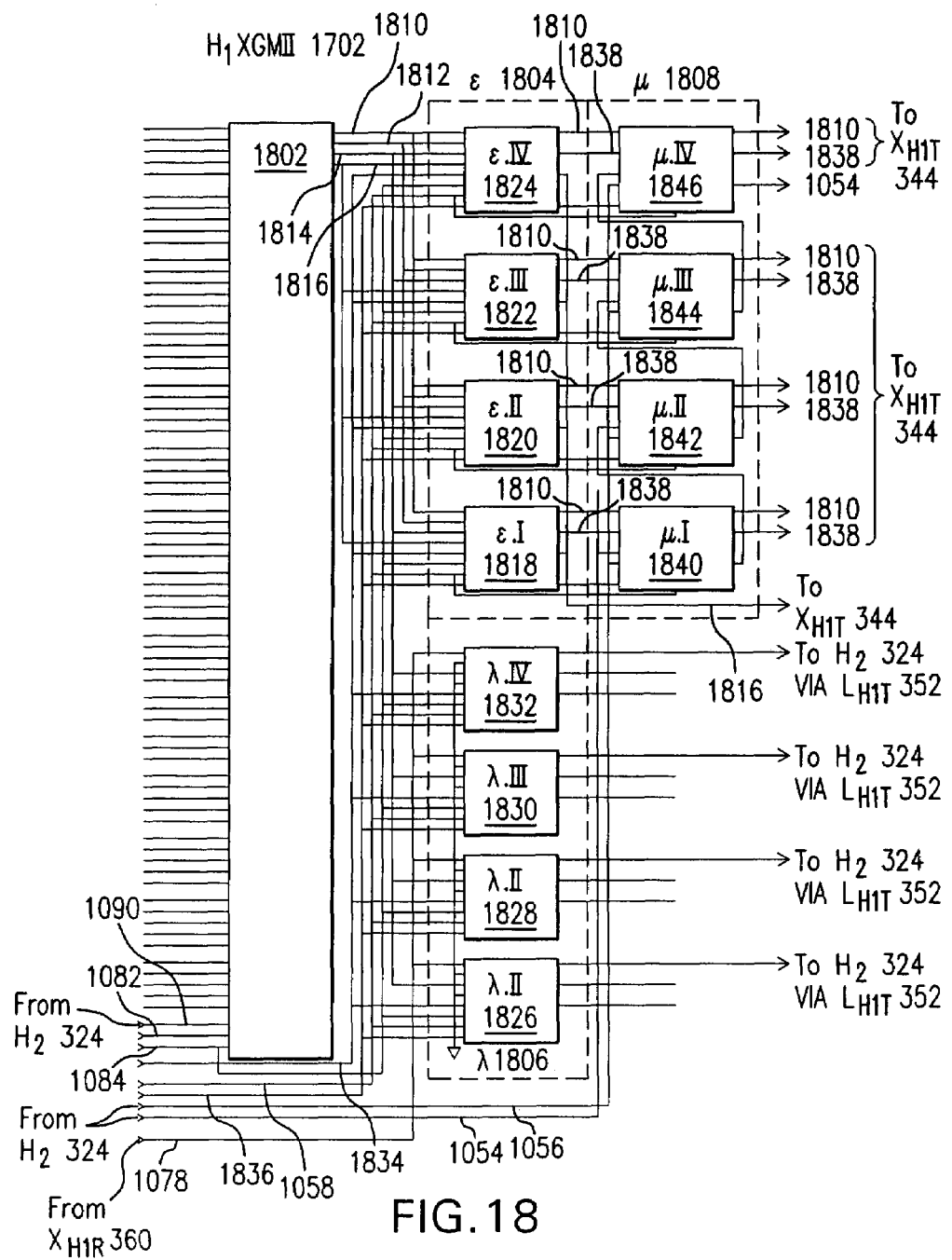
FIG. 18 is a block diagram of an embodiment of parallel receiver pad register $H_1$XGMII 1702.

FIG. 18 is a block diagram of an embodiment of parallel receiver pad register $H_1$XGMII 1702. Register $H_1$XGMII 1702 comprises a receiver pad multiplexer 1802, two banks of receiver pad registers: $\epsilon$ 1804 and $\lambda$ 1806, and a bank of receiver pad delay circuits $\mu$ 1808.

Receiver pad multiplexer 1802 can receive XAUI protocol signals that can be received by bus 300 at each of external ports $X_{E1X}$ 326, $X_{E2X}$ 328, $X_{G1X}$ 330, and $X_{G2X}$ 332, CDL protocol signals that can be received by bus 300 at each of external ports $X_{E1C}$ 334, $X_{E2C}$ 336, $X_{G1C}$ 338, and $X_{G2C}$ 340, and parallel formatted signals that can be received by bus 300 at each of internal ports $I_1$ 362, $I_2$ 364, $I_3$ 366, $I_4$ 368, and $I_5$ 370. Each of these signals comprises forty data bits, four clock bits, four fast clock bits, four link bits, and one CLOCK MODE SELECT bit. With each of these signals, four lock bits are transmitted to receiver pad multiplexer 1802, but they are not received by it.

Receiver pad multiplexer 1802 can also receive XGMII protocol signals that can be received by bus 300 at each of external ports $X_{F2R}$ 346 and $X_{H2R}$ 348. Each of these signals comprises eighty bit serial routing signal 1088, four bit routing clock signal 1090, and one bit CLOCK MODE SELECT signal 1092. For each of these signals, four bit lock signal 1080 is received by two-way bus driver $H_{1.9}$ 1720 or two-way bus driver $H_{1.10}$ 1722, but four bit lock signal 1080 is not transmitted to receiver pad multiplexer 1802 by two-way bus driver $H_{1.9}$ 1720 or two-way bus driver $H_{1.10}$ 1722.

Receiver pad multiplexer 1802 can also receive four bit routing clock signal 1090 from bus multiplexer $H_2$ 324. Receiver pad multiplexer 1802 can also receive four bit DATA SELECT signal 1082 and three bit MODE SELECT signal 1084. Receiver pad multiplexer 1802 can transmit a forty bit multiplexer output data signal 1810, a four bit multiplexer output clock signal 1812, a four bit multiplexer output fast clock signal 1814, and a four bit multiplexer output enable signal 1816.

Each bank of receiver pad registers ϵ 1804 and λ 1806 comprises four receiver pad registers. Bank of receiver pad registers ϵ 1804 comprises receiver pad registers ϵ.I 1818, ϵ.II 1820, ϵ.III 1822, and ϵ.IV 1824. Bank of receiver pad registers λ 1806 comprises receiver pad registers λ.I 1826, λ.II 1828, λ.III 1830, and λ.IV 1832. Each receiver pad register comprises three delay flip-flops. These are described in greater detail below.

Each receiver pad register can receive each of one bit RESET signal 1058, three bit MODE SELECT signal 1084, a one bit CLOCK POLARITY signal 1834, and a one bit TEST RESET signal 1836. CLOCK POLARITY signal 1834 can be used to configure all of the receiver pad registers to process received bits in response to a clock signal having either a positive or a negative polarity. Each receiver pad register can receive can receive one bit of four bit multiplexer output fast clock signal 1814. Receiver pad registers ϵ.I 1818 and λ.I 1826 can each receive the $1^{st}$ least significant bit of multiplexer output fast clock signal 1814. Receiver pad registers ϵ.II 1820 and λ.II 1828 can each receive the $2^{nd}$ least significant bit of multiplexer output fast clock signal 1814. Receiver pad registers ϵ.III 1822 and λ.III 1830 can each receive the $3^{rd}$ least significant bit of multiplexer output fast clock signal 1814. Receiver pad registers ϵ.IV 1824 and λ.IV 1832 can each receive the $4^{th}$ least significant bit of multiplexer output fast clock signal 1814.

Each receiver pad register in bank of receiver pad registers ϵ 1804 can receive ten bits (e.g., a lane) of multiplexer output data signal 1810. Receiver pad register ϵ.I 1818 can receive the $1^{st}$ through $10^{th}$ least significant bits of multiplexer output data signal 1810. Receiver pad register ϵ.II 1820 can receive the $11^{th}$ through $20^{th}$ least significant bits of multiplexer output data signal 1810. Receiver pad register ϵ.III 1822 can receive the $21^{st}$ through $30^{th}$ least significant bits of multiplexer output data signal 1810. Receiver pad register ϵ.IV 1824 can receive the $31^{st}$ through $40^{th}$ least significant bits of multiplexer output data signal 1810.

Each receiver pad register in bank of receiver pad registers ϵ 1804 can also receive one bit of each of multiplexer output clock signal 1812 and one bit of multiplexer output enable signal 1816. Receiver pad register ϵ.I 1818 can receive the $1^{st}$ least significant bit of multiplexer output clock signal 1812 and the $1^{st}$ least significant bit of multiplexer output enable signal 1816. Receiver pad register ϵ.II 1820 can receive the $2^{nd}$ least significant bit of multiplexer output clock signal 1812 and the $2^{nd}$ least significant bit of multiplexer output enable signal 1816. Receiver pad register ϵ.III 1822 can receive the $3^{rd}$ least significant bit of multiplexer output clock signal 1812 and the $3^{rd}$ least significant bit of multiplexer output enable signal 1816. Receiver pad register ϵ.IV 1824 can receive the $4^{th}$ least significant bit of multiplexer output clock signal 1812 and the $4^{th}$ least significant bit of multiplexer output enable signal 1816.

Each receiver pad register in bank of receiver pad registers ϵ 1804 can transmit its ten bits of multiplexer output data signal 1810 and one bit of a register output clock signal 1838 to a corresponding receiver pad delay circuit in bank of receiver pad delay circuits μ 1808. Receiver pad register ϵ.I 1818 can transmit the $1^{st}$ through $10^{th}$ least significant bits of multiplexer output data signal 1810 and the $1^{st}$ least significant bit of multiplexer output clock signal 1812 to receiver pad delay circuit μ.I 1840. Receiver pad register ϵ.II 1820 can transmit the $11^{th}$ through $20^{th}$ least significant bits of multiplexer output data signal 1810 and the $2^{nd}$ least significant bit of multiplexer output clock signal 1812 to receiver pad delay circuit μ.II 1842. Receiver pad register ϵ.III 1822 can transmit the $21^{st}$ through $30^{th}$ least significant bits of multiplexer output data signal 1810 and the $3^{rd}$ least significant bit of multiplexer output clock signal 1812 to receiver pad delay circuit μ.III 1844. Receiver pad register ϵ.IV 1824 can transmit the $31^{st}$ through $40^{th}$ least significant bits of multiplexer output data signal 1810 and the $4^{th}$ least significant bit of multiplexer output clock signal 1812 to receiver pad delay circuit μ.IV 1846. Each receiver pad register in bank of receiver pad registers ϵ 1804 can also transmit its one bit of multiplexer output enable signal 1816 to external port $X_{H1T}$ 344.

Each receiver pad register in bank of receiver pad registers λ 1806 can receive ten bits (e.g., a lane) of serial formatted signal 1078 from external port $X_{H1R}$ 360. Receiver pad register λ.I 1826 can receive the $1^{st}$ through $10^{th}$ least significant bits of serial formatted signal 1078. Receiver pad register λ.II 1828 can receive the $11^{th}$ through $20^{th}$ least significant bits of serial formatted signal 1078. Receiver pad register λ.III 1830 can receive the $21^{st}$ through $30^{th}$ least significant bits of serial formatted signal 1078. Receiver pad register λ.IV 1832 can receive the $31^{st}$ through $40^{th}$ least significant bits of serial formatted signal 1078. Each receiver pad register in bank of receiver pad registers λ 1806 can transmit its ten bits of serial formatted signal 1078 to bus multiplexer $H_2$ 324 via loop back port $L_{H1T}$ 352. For each receiver pad register in bank of receiver pad registers λ 1806, the ports for the one bit of multiplexer output clock signal 1812 and the one bit of multiplexer output enable signal 1816 are set to ground.

Bank of receiver pad delay circuits μ 1808 comprises four receiver pad delay circuits: μ.I 1840, μ.II 1842, μ.III 1844, and μ.IV 1846. Each receiver pad delay circuit can receive ten bits (e.g., a lane) of multiplexer output data signal 1810 and one bit of register output clock signal 1838 from a corresponding receiver pad register in bank of receiver pad registers ϵ 1804. Receiver pad delay circuit μ.I 1840 can receive the $1^{st}$ through $10^{th}$ least significant bits of multiplexer output data signal 1810 and the $1^{st}$ least significant bit of multiplexer output clock signal 1812 from receiver pad register ϵ.I 1818. Receiver pad delay circuit μ.II 1842 can receive the $11^{th}$ through $20^{th}$ least significant bits of multiplexer output data signal 1810 and the $2^{nd}$ least significant bit of multiplexer output clock signal 1812 from receiver pad register ϵ.II 1820. Receiver pad delay circuit μ.III 1844 can receive the $21^{st}$ through $30^{th}$ least significant bits of multiplexer output data signal 1810 and the $3^{rd}$ least significant bit of multiplexer output clock signal 1812 from receiver pad register ϵ.III 1822. Receiver pad delay circuit μ.IV 1846 can receive the $31^{st}$ through $40^{th}$ least significant bits of multiplexer output data signal 1810 and the $4^{th}$ least significant bit of multiplexer output clock signal 1812 from receiver pad register ϵ.IV 1824. Each receiver pad delay circuit can transmit its ten bits of multiplexer output data signal 1810 and its one bit of multiplexer output clock signal 1812 to external port $X_{H1T}$ 344.

Each receiver pad delay circuit can also receive delay set bit stream 1054 from bus multiplexer $H_2$ 324 (described above with reference to FIG. 13A) and delay set clock 1056. Each receiver pad delay circuit can transmit delay set bit stream 1054. The manner in which bank of receiver pad delay circuits μ 1808 uses delay set bit stream 1054 and delay set clock 1056 is described in greater detail below. Each receiver pad delay circuit comprises eleven pad delay circuits. Each pad delay circuit comprises three delay flip-flops, as described above with reference to FIG. 13A. One bit RESET signal 1058 can be used to reset all of the delay flip-flops in bank of receiver pad delay circuits μ 1808.

Figure 19:
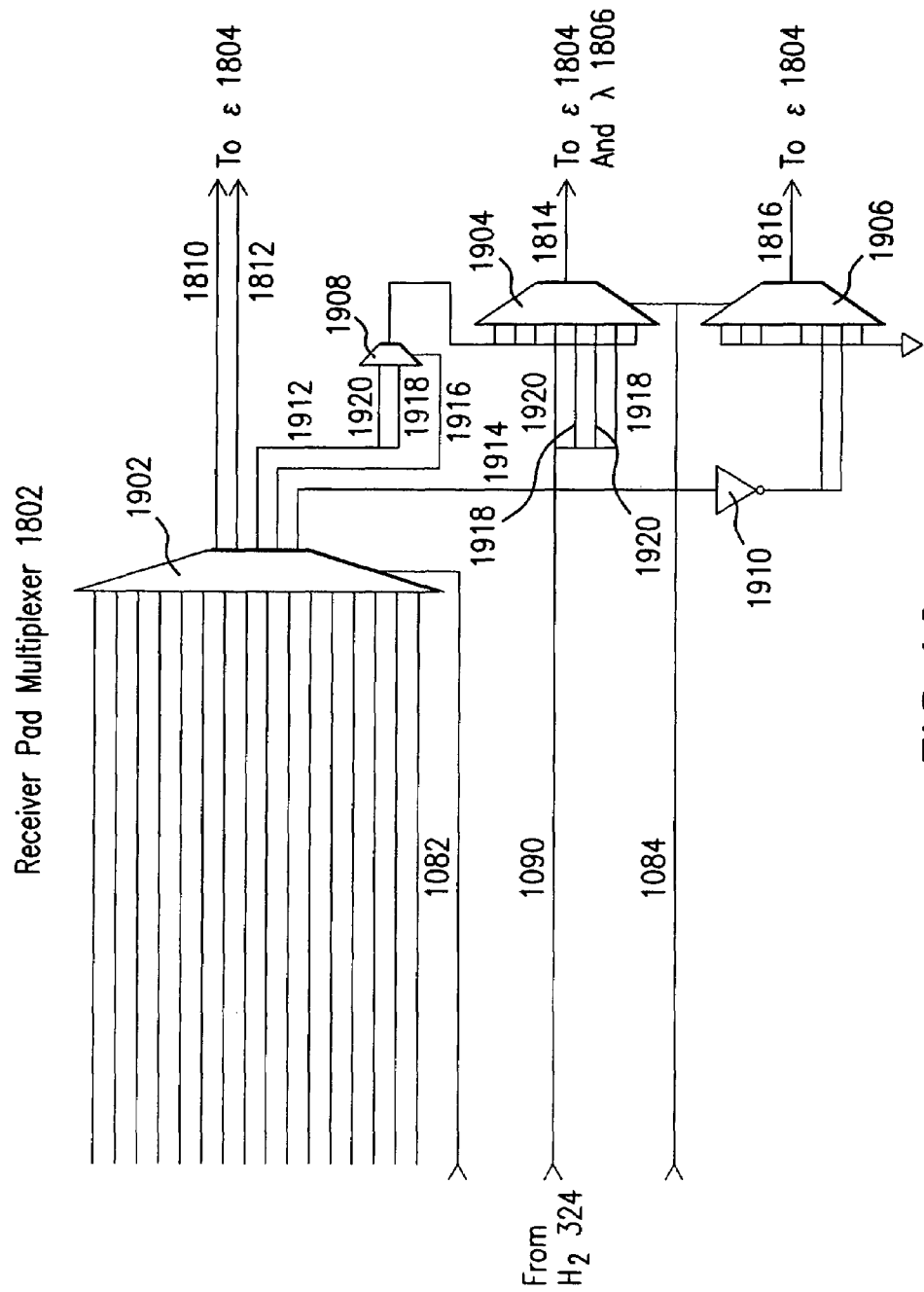
FIG. 19 is a schematic diagram of an embodiment of receiver pad multiplexer 1802.

FIG. 19 is a schematic diagram of an embodiment of receiver pad multiplexer 1802. Receiver pad multiplexer 1802 comprises a first multiplexer 1902, a second multiplexer 1904, a third multiplexer 1906, a fast clock multiplexer 1908, and an inverter 1910.

First multiplexer 1902 can receive sixteen signals. The sixteen signals include XAUI protocol signals that can be received by bus 300 at each of external ports $X_{E1X}$ 326, $X_{E2X}$ 328, $X_{G1X}$ 330, and $X_{G2X}$ 332, CDL protocol signals that can be received by bus 300 at each of external ports $X_{E1C}$ 334, $X_{E2C}$ 336, $X_{G1C}$ 338, and $X_{G2C}$ 340, parallel formatted signals that can be received by bus 300 at each of internal ports $I_1$ 362, $I_2$ 364, $I_3$ 366, $I_4$ 368, and $I_5$ 370, XGMII protocol signals that can be received by bus 300 at each of external ports $X_{F2R}$ 346 and $X_{H2R}$ 348, and a default signal. First multiplexer 1902 can also receive four bit DATA SELECT signal 1082 to determine which one of the sixteen signals will be transmitted from external port $X_{H1T}$ 344. The bits of each signal are positioned as follows: forty data bits, four clock bits, four fast clock bits, one CLOCK MODE SELECT bit, and four link bits. For the default signal, dummy bits are placed in the positions of all of the bits. For an XGMII protocol signal, the four fast clock bits and the four link bits set to ground.

Also for an XGMII protocol signal, first multiplexer 1902 can receive eighty bit serial routing signal 1088, but can only transmit the forty least significant bits. Recall, however, that when XGMII protocol signals are converted from forty data bits to eighty data bits, data for each character is transmitted twice: within the forty most significant data bits and within the forty least significant data bits. Therefore, no data from an XGMII protocol signal is lost when first multiplexer 1902 receives only the forty least significant data bits.

First multiplexer 1902 can transmit forty bit multiplexer output data signal 1810, four bit multiplexer output clock signal 1812, a four bit first multiplexer output fast clock signal 1912, a four bit first multiplexer output enable signal 1914, and a one bit CLOCK MODE SELECT signal 1916. First multiplexer 1902 can transmit multiplexer output data signal 1810 and multiplexer output clock signal 1812 to each of the receiver pad registers in bank of receiver pad registers ε 1804. First multiplexer output fast clock signal 1912 can be configured for two modes of operation. In a first mode 1918, all four bits of first multiplexer output fast clock signal 1912 are transmitted in parallel along four interconnect routes (only one interconnect route is shown in FIG. 19.) In a second mode 1920, one of the four bits of first multiplexer output fast clock signal 1912 is transmitted in parallel along each of the four interconnect routes. For example, in second mode 1920 the second least significant bit of the four bits of first multiplexer output fast clock signal 1912 is transmitted in parallel along each of the four interconnect routes. Fast clock multiplexer 1908 can receive both first mode 1918 and second mode 1920 of first multiplexer output fast clock signal 1912. Fast clock multiplexer 1908 can also receive CLOCK MODE SELECT signal 1916 to determine which of first mode 1918 and second mode 1920 will be transmitted to second multiplexer 1904. First multiplexer 1902 can transmit first multiplexer output enable signal 1914 to inverter 1910.

Second multiplexer 1904 can receive eight different inputs. Each input is related to a mode by which XGMII protocol signals can be communicated. Each input is first multiplexer output fast clock signal 1912 or routing clock signal 1090 from bus multiplexer $H_2$ 324. First multiplexer output fast clock signal 1912 and routing clock signal 1090 can each be received by second multiplexer 1904 in first mode 1918 or second mode 1920. Second multiplexer 1904 can also receive three bit MODE SELECT signal 1084 to determine which of the eight different inputs that second multiplexer 1904 will transmit to each of the receiver pad registers in bank of receiver pad registers ε 1804 and each of the receiver pad registers in bank of receiver pad registers λ 1806 as four bit multiplexer output fast clock signal 1814.

Third multiplexer 1906 can receive eight different inputs. Each input is related to a mode by which XGMII protocol signals can be communicated. Each input is an output of inverter 1910 or ground. Third multiplexer 1906 can also receive three bit MODE SELECT signal 1084 to determine which of the eight different inputs that third multiplexer 1906 will transmit to each of the receiver pad registers in bank of receiver pad registers ε 1804 as four bit multiplexer output enable signal 1816.

Figure 20:
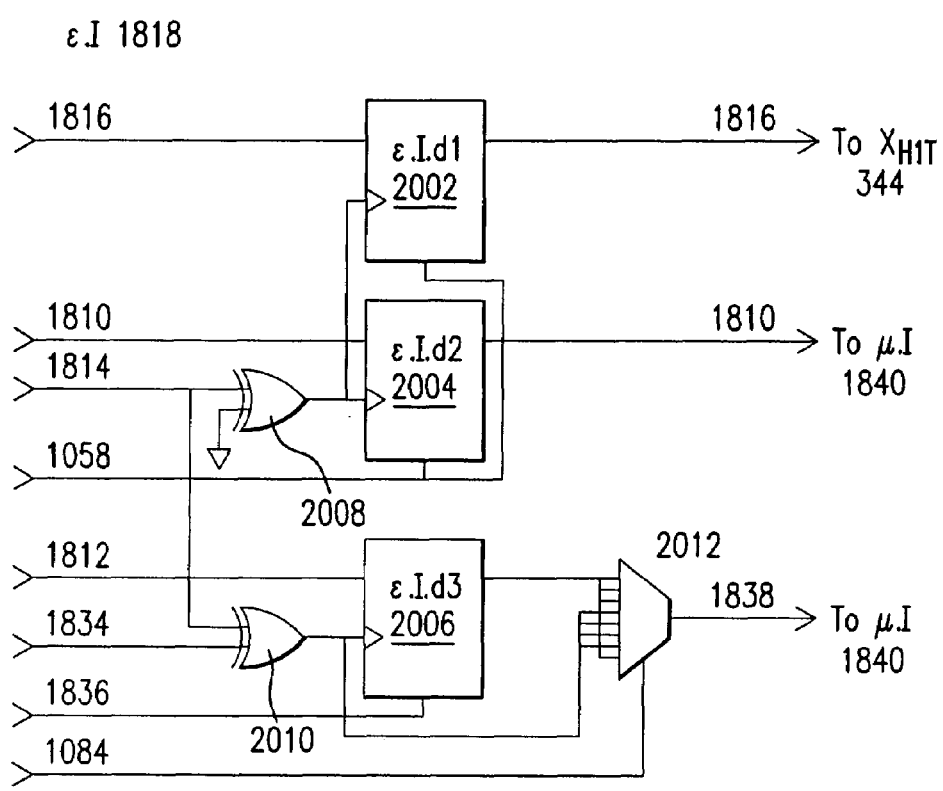
FIG. 20 is a schematic diagram of an embodiment of receiver pad register ε.I 1818.

FIG. 20 is a schematic diagram of an embodiment of receiver pad register ε.I 1818. Receiver pad registers ε.II 1820, ε.III 1822, ε.IV 1824, λ.I 1826, λ.II 1828, λ.III 1830, and λ.IV 1832 can each be configured in a similar manner. Receiver pad register ε.I 1818 comprises three delay flip-flops: ε.I.d1 2002, ε.I.d2 2004, and ε.I.d3 2006, a first Exclusive OR gate 2008, a second Exclusive OR gate 2010, and a multiplexer 2012. Delay flip-flops ε.I.d1 2002 and ε.I.d2 2004 are rising edge flip-flops. They each receive a bit on a rising edge of a clock cycle. Delay flip-flop ε.I.d3 2006 is a falling edge flip-flop. It receives a bit on a falling edge of a clock cycle. An output of first Exclusive OR gate 2008 is used to clock delay flip-flops ε.I.d1 2002 and ε.I.d2 2004. RESET signal 1058 can be used to reset delay flip-flops ε.I.d1 2002 and ε.I.d2 2004. An output of second Exclusive OR gate 2010 is used to clock delay flip-flop ε.I.d3 2006. TEST RESET signal 1836 can be used to reset delay flip-flop ε.I.d3 2006.

First and second Exclusive OR gates 2008 and 2010 can each receive the $1^{st}$ least significant bit of four bit multiplexer output fast clock signal 1814 as first input. First Exclusive OR gate 2008 can receive ground as a second input. Second Exclusive OR gate 2010 can receive one bit CLOCK POLARITY signal 1834 as a second input. CLOCK POLARITY signal 1834 ensures that the $1^{st}$ least significant bit of four bit multiplexer output clock signal 1812 remains synchronous with the $1^{st}$ least significant bit of four bit multiplexer output enable signal 1816 and the $1^{st}$ through $10^{th}$ least significant bits of forty bit multiplexer output data signal 1810 regardless of the polarity of four bit multiplexer output fast clock signal 1814. If multiplexer output fast clock signal 1814 has a positive polarity, then CLOCK POLARITY signal 1834 is set to one. If multiplexer output fast clock signal 1814 has a negative polarity, then CLOCK POLARITY signal 1834 is set to zero.

Delay flip-flop ε.I.d1 2002 can receive the $1^{st}$ least significant bit of four bit multiplexer output enable signal 1816 and transmit it to external port $X_{H1T}$ 344. Delay flip-flop ε.I.d2 2004 can receive and produce the $1^{st}$ through $10^{th}$ least significant bits of forty bit multiplexer output data signal 1810 and transmit it to receiver pad delay circuit μ.I 1840. Delay flip-flop ε.I.d3 2006 can receive and produce the $1^{st}$ least significant bit of four bit multiplexer output clock signal 1812.

Multiplexer 2012 can receive eight different inputs. Each input is related to a mode by which XGMII protocol signals can be communicated. Each input is an output of delay flip-flop ϵ.I.d3 2006 or an output of second Exclusive OR gate 2010. Multiplexer 2012 can also receive three bit MODE SELECT signal 1084 to determine which of the eight different inputs that multiplexer 2012 will transmit to receiver pad delay circuit μ.I 1840 as the $1^{st}$ least significant bit of four bit register output clock signal 1838.

Figure 21A:
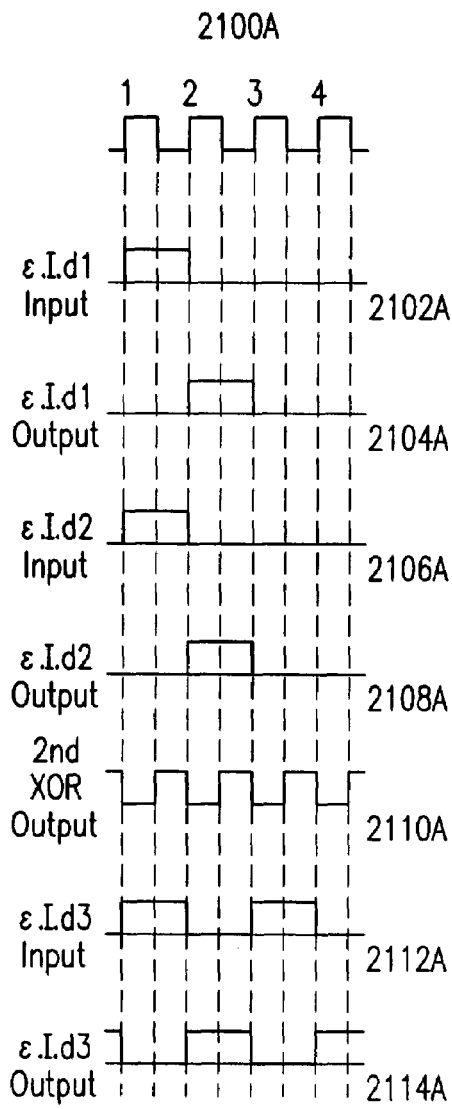
FIGS. 21A and 21B show series of graphs 2100A and 2100B that depict, for each delay flip-flop of receiver pad register ε.I 1818, a bit being processed in response to, respectively, multiplexer output fast clock signal 1814 having a positive polarity and multiplexer output fast clock signal 1814 having a negative polarity.
Figure 21B:
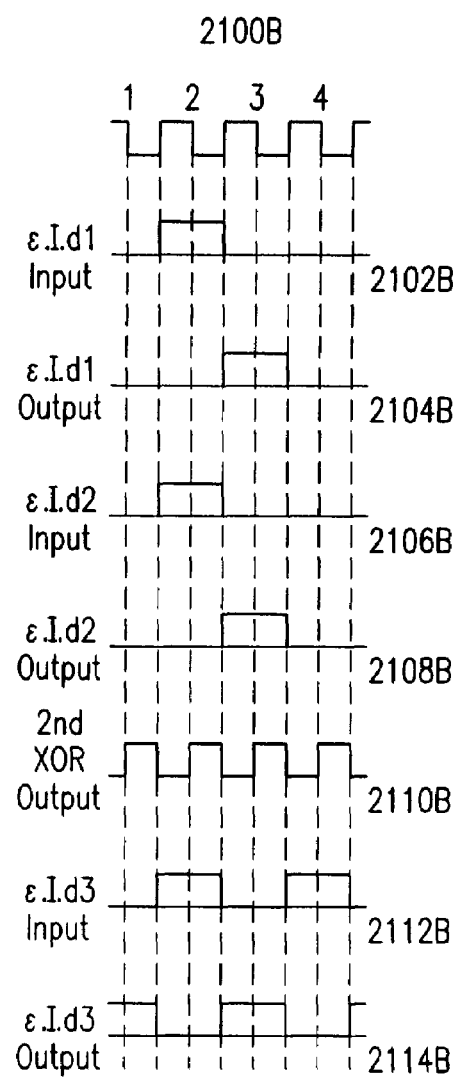

FIGS. 21A and 21B show series of graphs 2100A and 2100B that depict, for each delay flip-flop of receiver pad register ϵ.I 1818, a bit being processed in response to, respectively, multiplexer output fast clock signal 1814 having a positive polarity and multiplexer output fast clock signal 1814 having a negative polarity. For delay flip-flops ϵ.I.d1 2002 and ϵ.I.d2 2004, series of graphs 2100A and 2100B assume that: (1) receiver pad register ϵ.I 1818 has processed a stream of bits with values of zero, (2) at a first clock cycle, a bit with a value of one is received, and (3) at subsequent clock cycles, a stream of bits with values of zero are received.

At series of graphs 2100A, CLOCK POLARITY signal 1834 is set to one. At a rising edge of a first clock cycle, a bit with the value of one is received at the input of each of delay flip-flop ϵ.I.d1 2002 (graph 2102A) and delay flip-flop ϵ.I.d2 2004 (graph 2106A). The output of second Exclusive OR gate 2010 is zero (graph 2110A). A first $1^{st}$ least significant bit of four bit multiplexer output clock signal 1812 is received at the input of delay flip-flop ϵ.I.d3 2006 (graph 2112A). At a falling edge of first clock cycle, the output of second Exclusive OR gate 2010 is one (graph 2110A). At a rising edge of a second clock cycle, the bit with the value of one is received at the output of each of delay flip-flop ϵ.I.d1 2002 (graph 2104A) and delay flip-flop ϵ.I.d2 2004 (graph 2108A). The output of second Exclusive OR gate 2010 is zero (graph 2110A). The first $1^{st}$ least significant bit of four bit multiplexer output clock signal 1812 is received at the output of delay flip-flop ϵ.I.d3 2006 (graph 2114A). At a falling edge of second clock cycle, the output of second Exclusive OR gate 2010 is one (graph 2110A).

At a rising edge of a third clock cycle, the output of second Exclusive OR gate 2010 is zero (graph 2110A). A second $1^{st}$ least significant bit of four bit multiplexer output clock signal 1812 is received at the input of delay flip-flop ϵ.I.d3 2006 (graph 2112A). At a falling edge of the third clock cycle, the output of second Exclusive OR gate 2010 is one (graph 2110A). At a rising edge of a fourth clock cycle, the output of second Exclusive OR gate 2010 is zero (graph 2110A). The second $1^{st}$ least significant bit of four bit multiplexer output clock signal 1812 is received at the output of delay flip-flop ϵ.I.d3 2006 (graph 2114A). At a falling edge of fourth clock cycle, the output of second Exclusive OR gate 2010 is one (graph 2110A).

At series of graphs 2100B, CLOCK POLARITY signal 1834 is set to zero. At a falling edge of a first clock cycle, the output of second Exclusive OR gate 2010 is one (graph 2110B). At a rising edge of first clock cycle, a bit with the value of one is received at the input of each of delay flip-flop ϵ.I.d1 2002 (graph 2102B) and delay flip-flop ϵ.I.d2 2004 (graph 2106B). The output of second Exclusive OR gate 2010 is zero (graph 2110B). A first $1^{st}$ least significant bit of four bit multiplexer output clock signal 1812 is received at the input of delay flip-flop ϵ.I.d3 2006 (graph 2112B). At a falling edge of a second clock cycle, the output of second Exclusive OR gate 2010 is one (graph 2110B). At a rising edge of second clock cycle, the bit with the value of one is received at the output of each of delay flip-flop ϵ.I.d1 2002 (graph 2104B) and delay flip-flop ϵ.I.d2 2004 (graph 2108B). The output of second Exclusive OR gate 2010 is zero (graph 2110B). The first $1^{st}$ least significant bit of four bit multiplexer output clock signal 1812 is received at the output of delay flip-flop ϵ.I.d3 2006 (graph 2114B).

At a falling edge of a third clock cycle, the output of second Exclusive OR gate 2010 is one (graph 2110B). At a rising edge of a third clock cycle, the output of second Exclusive OR gate 2010 is zero (graph 2110B). A second $1^{st}$ least significant bit of four bit multiplexer output clock signal 1812 is received at the input of delay flip-flop ϵ.I.d3 2006 (graph 2112B). At a falling edge of a fourth clock cycle, the output of second Exclusive OR gate 2010 is one (graph 2110B). At a rising edge of fourth clock cycle, the output of second Exclusive OR gate 2010 is zero (graph 2110B). The second $1^{st}$ least significant bit of four bit multiplexer output clock signal 1812 is received at the output of delay flip-flop ϵ.I.d3 2006 (graph 2114B).

Figure 22:
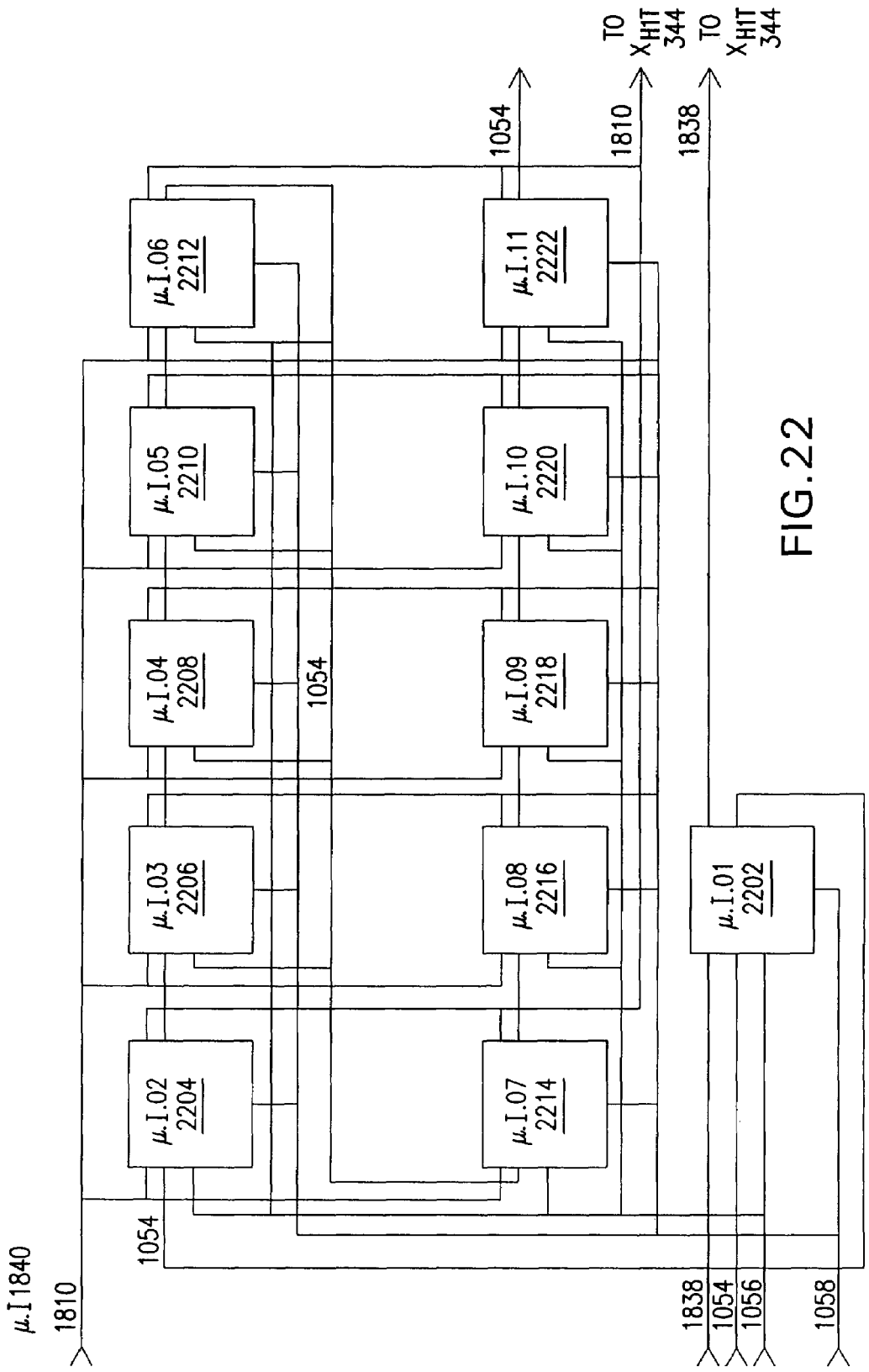
FIG. 22 is a schematic diagram of an embodiment of receiver pad delay circuit µ.I 1840.

FIG. 22 is a schematic diagram of an embodiment of receiver pad delay circuit μ.I 1840. Receiver pad delay circuits μ.II 1842, μ.III 1844, and μ.IV 1846 can each be configured in a similar manner. Receiver pad delay circuit μ.I 1840 comprises eleven pad delay circuits: μ.I.01 2202, μ.I.02 2204, μ.I.03 2206, μ.I.04 2208, μ.I.05 2210, μ.I.06 2212, μ.I.07 2214, μ.I.08 2216, μ.I.09 2218, μ.I.10 2220, and μ.I.11 2222. Each pad delay circuit can be configured in a similar manner as pad delay circuit α.I.01 1102, described above with reference to FIG. 13A. As described above with reference to FIG. 13A, each pad delay circuit comprises three delay flip-flops. RESET signal 1058 can be used to reset all of the delay flip-flops in all of the pad delay circuits.

Receiver pad delay circuit μ.I 1840 can receive the $1^{st}$ through $10^{th}$ least significant bits of forty bit multiplexer output data signal 1810 and the $1^{st}$ least significant bit of four bit register output clock signal 1838. Receiver pad delay circuit μ.I 1840 can transmit the $1^{st}$ through $10^{th}$ least significant bits of multiplexer output data signal 1810 and the $1^{st}$ least significant bit of register output clock signal 1838 to external port $X_{H1T}$ 344. Receiver pad delay circuit μ.I 1840 can be used to synchronize the $1^{st}$ through $10^{th}$ least significant bits of multiplexer output data signal 1810 and the $1^{st}$ least significant bit of register output clock signal 1838.

Pad delay circuit μ.I.01 2202 can receive the $1^{st}$ least significant bit of register output clock signal 1838 and transmit it to external port $X_{H1T}$ 344. Pad delay circuits μ.I.02 2204, μ.I.03 2206, μ.I.04 2208, μ.I.05 2210, μ.I.06 2212, μ.I.07 2214, μ.I.08 2216, μ.I.09 2218, μ.I.10 2220, and μ.I.11 2222 can receive, respectively, the $1^{st}$, the $2^{nd}$, the $3^{rd}$, the $4^{th}$, the $5^{th}$, the $6^{th}$, the $7^{th}$, the $8^{th}$, the $9^{th}$, and the $10^{th}$ least significant bits of multiplexer output data signal 1810. Pad delay circuits μ.I.02 2204, μ.I.03 2206, μ.I.04 2208, μ.I.05 2210, μ.I.06 2212, μ.I.07 2214, μ.I.08 2216, μ.I.09 2218, μ.I.10 2220, and μ.I.11 2222 can transmit, respectively, the $1^{st}$, the $2^{nd}$, the $3^{rd}$, the $4^{th}$, the $5^{th}$, the $6^{th}$, the $7^{th}$, the $8^{th}$, the $9^{th}$, and the $10^{th}$ least significant bits of multiplexer output data signal 1810 to external port $X_{H1T}$ 344. Each pad delay circuit can also receive delay set bit stream 1054 and delay set clock 1056. Each pad delay circuit can transmit delay set bit stream 1054. Delay set bit stream 1054 and delay set clock 1056 are described above with reference to FIG. 13A and are further described in greater detail below.

As described above with reference to FIG. 13A, delay set clock 1056 is used to clock all of the delay flip-flops in each of the pad delay circuits. Delay set bit stream 1054 is used to change the values of nodes $N_9$ 1354, $N_{10}$ 1356, and $N_{11}$ 1358 in each of the pad delay circuits. As cycles of delay set clock 1056 continue in the manner described above with reference to FIG. 13A, delay set bit stream 1054 is received, in turn, at pad delay circuits μ.I.01 2202, μ.I.02 2204, μ.I.03 2206, μ.I.04 2208, μ.I.05 2210, μ.I.06 2212, μ.I.07 2214, μ.I.08 2216, μ.I.09 2218, μ.I.10 2220, and μ.I.11 2222. Pad delay circuit μ.I.11 2222 can transmit delay set bit stream 1054 outside of bus 300. Thus, within bus 300 delay set bit stream 1054 comprises 267 bits. From its most to its least significant bit, delay set bit stream 1054 is: the 30 bits of transmitter data pad delay circuit α.I 1014, the 30 bits of transmitter data pad delay circuit α.II 1016, the 30 bits of transmitter data pad delay circuit α.III 1018, the 30 bits of transmitter data pad delay circuit α.IV 1020, the 15 bits of transmitter clock pad delay circuit 1004, the 33 bits of receiver pad delay circuit μ.I 1840, the 33 bits of receiver pad delay circuit μ.II 1842, the 33 bits of receiver pad delay circuit μ.III 1844, and the 33 bits of receiver pad delay circuit μ.IV 1846.

As described above with reference to FIG. 13A, after bus 300 is manufactured, tests can be performed to determine what value for each of nodes $N_9$ 1354, $N_{10}$ 1356, and $N_{11}$ 1358 for each of the pad delay circuits yields a desired delay time for the corresponding bit 1360 processed by the pad delay circuit. Once a value for each of nodes $N_9$ 1354, $N_{10}$ 1356, and $N_{11}$ 1358 for each of the pad delay circuits is determined, the values are assembled as delay set bit stream 1054 and clocked to their appropriate delay flip-flops using delay set clock 1056. Once each of nodes $N_9$ 1354, $N_{10}$ 1356, and $N_{11}$ 1358 for each of the pad delay circuits is set to its corresponding determined value, delay set clock 1056 is disabled so that each of nodes $N_9$ 1354, $N_{10}$ 1356, and $N_{11}$ 1358 for each of the pad delay circuits is locked at its corresponding determined value.

Forty bit serial formatted signal 1078 can be used in the performance of these tests. As described above with reference to FIG. 18, forty bit serial formatted signal 1078 can be received at bus multiplexer $H_1$ 322 via external port $X_{H1R}$ 360. Each receiver pad register in bank of receiver pad registers λ 1806 of bus multiplexer $H_1$ 322 can receive ten bits (e.g., a lane) of forty bit serial formatted signal 1078. Each receiver pad register in bank of receiver pad registers λ 1806 can transmit its ten bits of serial formatted signal 1078 to bus multiplexer $H_2$ 324 via loop back port $L_{H1T}$ 352.

As described above with reference to FIG. 10, forty bit serial formatted signal 1078 can be received at bus multiplexer $H_2$ 324 via loop back port $L_{H2R}$ 356. As described above with reference to FIG. 16, second multiplexer 1606 of transmitter register multiplexer 1012 of bus multiplexer $H_2$ 324 can receive forty bit serial formatted signal 1078 as eighty bit serial routing signal 1088. (Forty dummy bits are used as the forty most significant bits.) Second multiplexer 1606 can transmit eighty bit serial routing signal 1088 (forty bit serial formatted signal 1078) to three-way bus driver $H_{2.10}$ 924. As described above with reference to FIG. 9, driver $H_{2.10}$ 924 can transmit eighty bit serial routing signal 1088 (forty bit serial formatted signal 1078) to bus multiplexer $F_1$ 314 via bus multiplexer $E_1$ 310 and to bus multiplexer $F_2$ 316 via bus multiplexer $H_1$ 322.

Forty bit serial formatted signal 1078 does not pass through either bank of receiver pad delay circuits μ 1808 of bus multiplexer $H_1$ 322 (see FIG. 18) or bank of transmitter data pad delay circuits α 1002 of bus multiplexer $H_2$ 324 (see FIG. 10). Therefore, measurements of the delay times of the bits of forty bit serial formatted signal 1078 can provide an indication of variations in the lengths of the interconnects that are routed through the pad delay circuits. These measurements can be used in the process of determining a value for each of nodes $N_9$ 1354, $N_{10}$ 1356, and $N_{11}$ 1358 for each of the pad delay circuits that yields a desired delay time.

Forty bit serial formatted signal 1078 can also be received at bus multiplexer $F_1$ 314 via external port $X_{F1R}$ 358, transmitted to bus multiplexer $F_2$ 316 via loop back port $L_{F1T}$ 350, received at bus multiplexer $F_2$ 316 via loop back port $L_{F2R}$ 354, and transmitted from a three-way bus driver as eighty bit serial routing signal 1088 to bus multiplexer $H_1$ 322 via bus multiplexer $G_1$ 318 and to bus multiplexer $H_2$ 324 via bus multiplexer $F_1$ 314.

Figure 23:
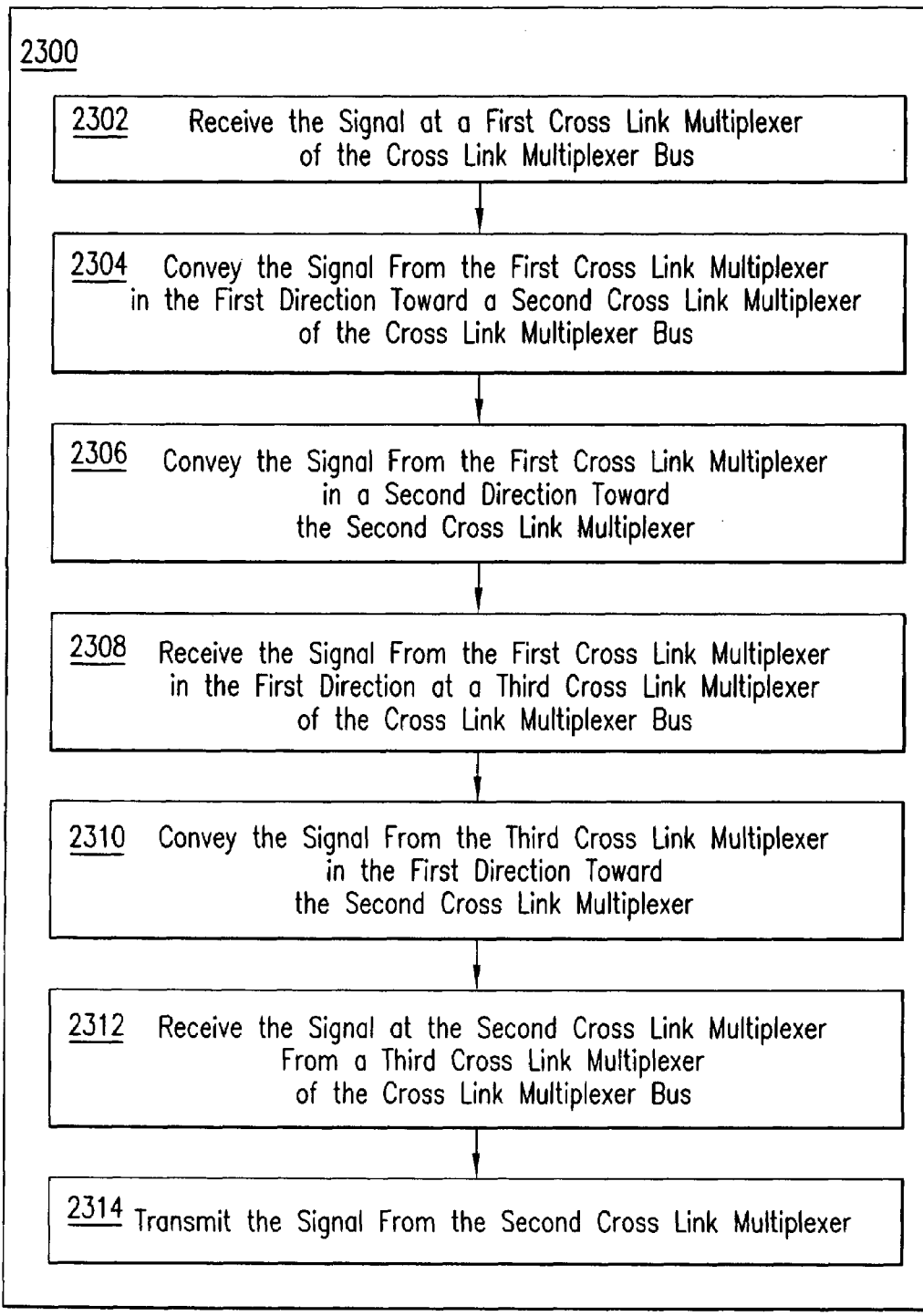
FIG. 23 shows a flow chart of a method 2300 for conveying a signal across a cross link multiplexer bus.

FIG. 23 shows a flow chart of a method 2300 for conveying a signal across a cross link multiplexer bus. In method 2300, at a step 2302, the signal can be received at a first cross link multiplexer of the cross link multiplexer bus.

At a step 2304, the signal is conveyed from the first cross link multiplexer in a first direction toward a second cross link multiplexer of the cross link multiplexer bus. At a step 2306, the signal is conveyed from the first cross link multiplexer in a second direction toward the second cross link multiplexer. In a configuration, at a step 2308, the signal from the first cross link multiplexer in the first direction can be received at a third cross link multiplexer of the cross link multiplexer bus. Optionally, at a step 2310, the signal can be conveyed from the third cross link multiplexer in the first direction toward the second cross link multiplexer. In another configuration, at a step 2312, the signal can be received at the second cross link multiplexer from a third cross link multiplexer of the cross link multiplexer bus. At a step 2314, the signal can be transmitted from the second cross link multiplexer.

Figure 24:
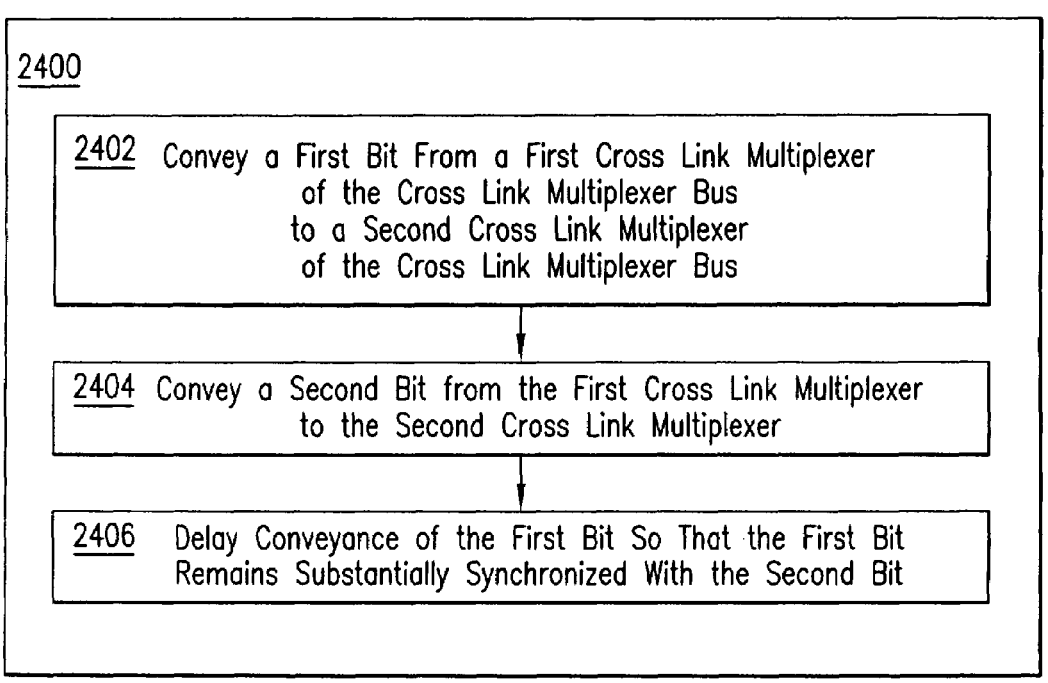
FIG. 24 shows a flow chart of a method 2400 for conveying, in parallel, bits of a character of a signal across a cross link multiplexer bus.

FIG. 24 shows a flow chart of a method 2400 for conveying, in parallel, bits of a character of a signal across a cross link multiplexer bus. In method 2400, at a step 2402, a first bit is conveyed from a first cross link multiplexer of the cross link multiplexer bus to a second cross link multiplexer of the cross link multiplexer bus. At a step 2404, a second bit is conveyed from the first cross link multiplexer to the second cross link multiplexer. At a step 2406, conveyance of the first bit is delayed so that the first bit remains substantially synchronized with the second bit. For example, the first bit can be conveyed through a delay buffer.

Figure 25:
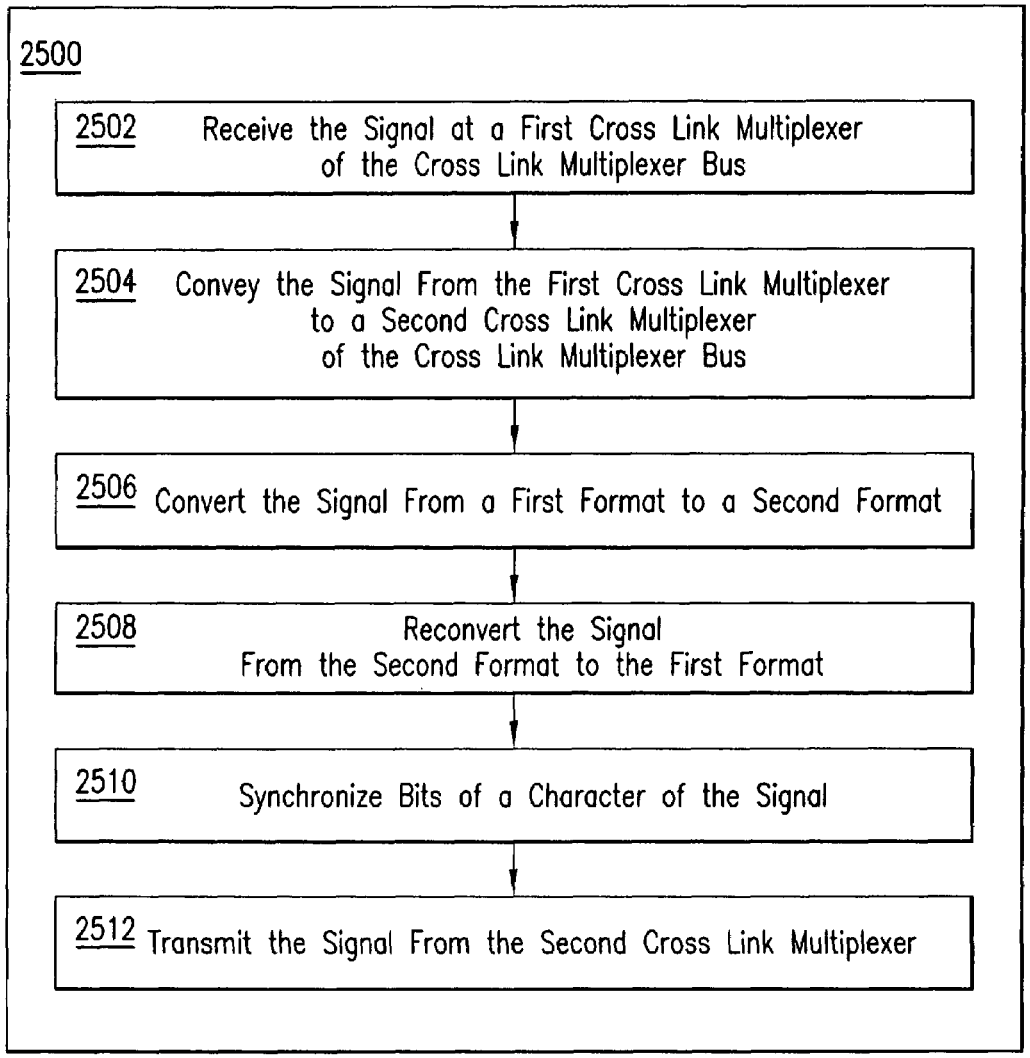
FIG. 25 shows a flow chart of a method 2500 for conveying a signal across a cross link multiplexer bus.

FIG. 25 shows a flow chart of a method 2500 for conveying a signal across a cross link multiplexer bus. In method 2500, at a step 2502, the signal can be received at a first cross link multiplexer of the cross link multiplexer bus. At a step 2504, the signal is conveyed from the first cross link multiplexer to a second cross link multiplexer of the cross link multiplexer bus. At a step 2506, the signal is converted from a first format to a second format. The signal can be converted at the first cross link multiplexer or the second cross link multiplexer.

For example, an XGMII protocol signal can be converted from a forty data bit format to an eighty data bit format at the first cross link multiplexer, or the XGMII protocol signal can be converted from an eighty data bit format to a forty data bit format at the second cross link multiplexer.

In an embodiment, the signal is capable of being represented as a series of characters. One character of the series of characters can be conveyed during one cycle of a clock that controls conveyance of the signal. The first format can have a first number of bits for data for a first character. The second format can have a second number of bits for data for the first character and data for a second character. FIG. 26 shows a flow chart of a method 2600 for an embodiment of converting the signal from the first format to the second format. In method 2600, at a step 2602, during a first cycle of a clock, a first character is conveyed from an input of a first interconnect to an output of the first interconnect. At a step 2604, also during the first cycle of the clock, the first character is conveyed from an input of a second interconnect to a delay flip-flop. At a step 2606, during a second cycle of the clock, the second character is conveyed from the input of the first interconnect to the output of the first interconnect. At a step 2608, also during the second cycle of the clock, the first character is conveyed from the delay flip-flop to an output of the second interconnect.

Returning to method 2500, optionally, the signal can be reconverted from the second format to the first format at a step 2508. Optionally, at a step 2510, bits of a character of the signal can be synchronized. For example, each bit can be conveyed through a corresponding delay flip-flop. A bit can also be conveyed through a delay buffer. At a step 2512, the signal can be transmitted from the second cross link multiplexer.

FIG. 27 shows a flow chart of a method 2700, in a cross link multiplexer bus configured to convey a signal in which a character is represented by a first bit and a second bit, for synchronizing the first bit and the second bit. In method 2700, at a step 2702, a first time is determined for the first bit to be conveyed via a first interconnect from a first cross link multiplexer to a second cross link multiplexer when a first series of delay buffers is bypassed. At a step 2704, a second time is determined for the second bit to be conveyed via a second interconnect from the first cross link multiplexer to the second cross link multiplexer when a second series of delay buffers is bypassed. The second time is greater than the first time. At a step 2706, a desired delay time is determined for the first bit so that the first bit is synchronized with the second bit. At a step 2708, the first series of delay buffers is aligned to increase the first time by the desired delay time so that the first bit is synchronized with the second bit. For example, the first series of delay buffers can be configured so that the first bit can be conveyed through a first delay buffer of the first series of delay buffers. The first series of delay buffers can also be configured so that the first bit can bypass a second delay buffer of the first series of delay buffers.

Figure 28:
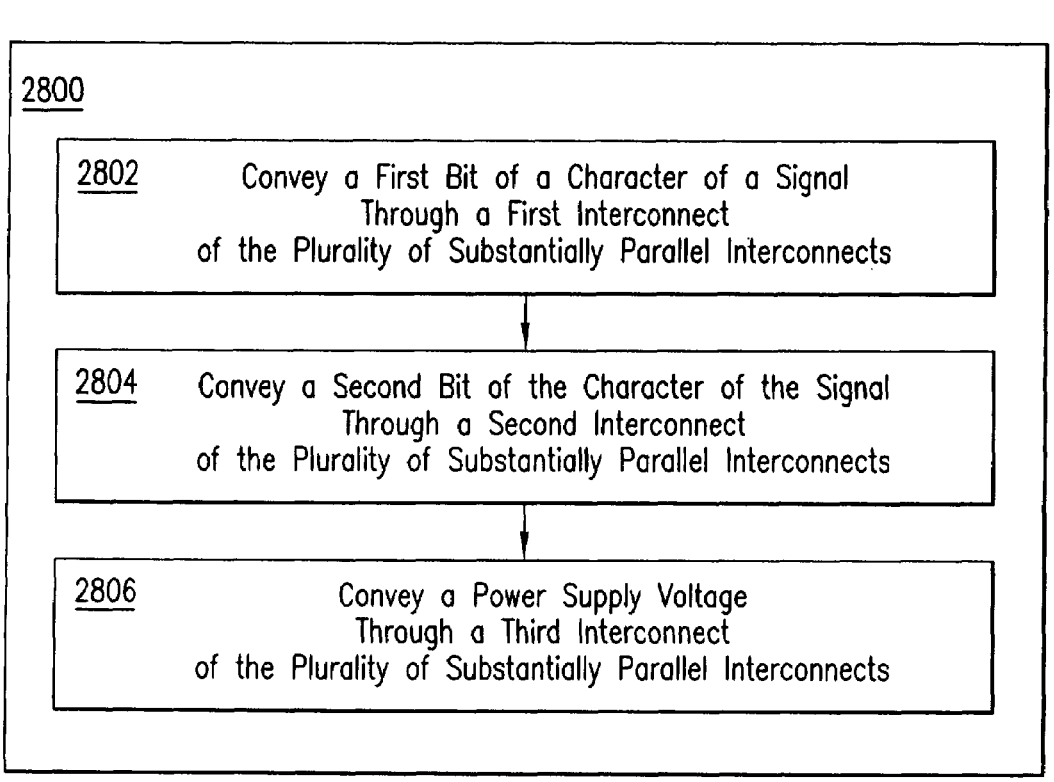
FIG. 28 shows a flow chart of a method 2800, in a cross link multiplexer bus having a plurality of substantially parallel interconnects coupled between a pair of adjacent cross link multiplexers, for reducing cross-talk.

FIG. 28 shows a flow chart of a method 2800, in a cross link multiplexer bus having a plurality of substantially parallel interconnects coupled between a pair of adjacent cross link multiplexers, for reducing cross-talk. In method 2800, at a step 2802, a first bit of a character of a signal is conveyed through a first interconnect of the substantially parallel interconnects. At a step 2804, a second bit of the character of the signal is conveyed through a second interconnect of the substantially parallel interconnects. At a step 2806, a power supply voltage is conveyed through a third interconnect of the substantially parallel interconnects. The third interconnect is positioned substantially between the first interconnect and the second interconnect. The power supply voltage can be ground.

Figure 29:
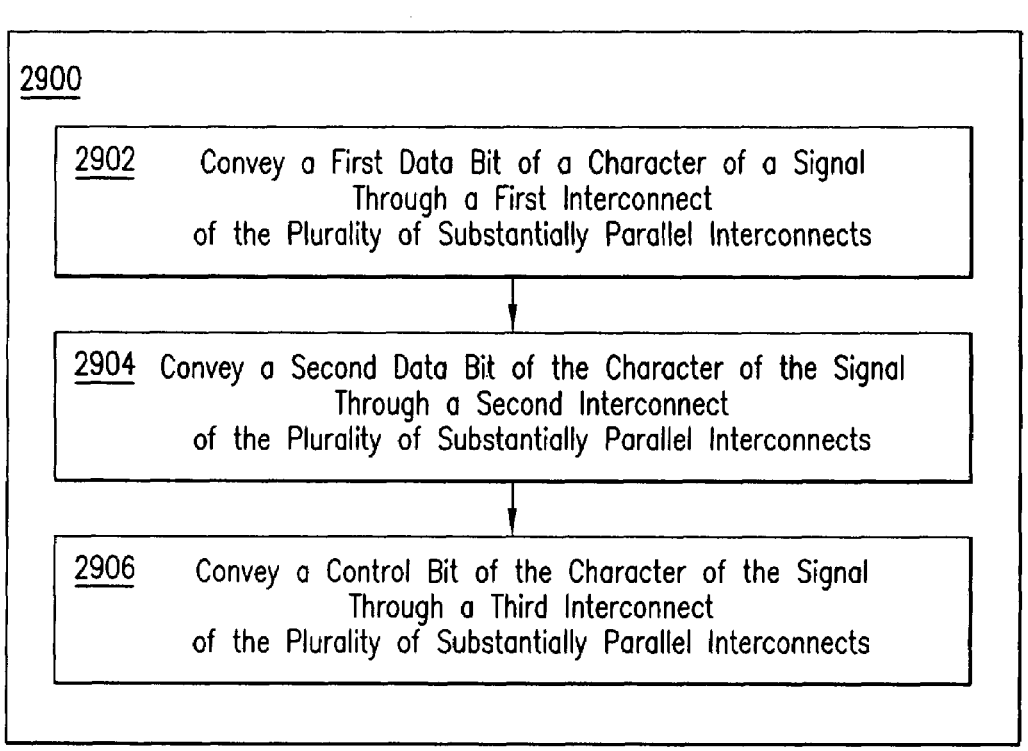
FIG. 29 shows a flow chart of a method 2900, in a cross link multiplexer bus having a plurality of substantially parallel interconnects coupled between a pair of adjacent cross link multiplexers, for reducing cross-talk.

FIG. 29 shows a flow chart of a method 2900, in a cross link multiplexer bus having a plurality of substantially parallel interconnects coupled between a pair of adjacent cross link multiplexers, for reducing cross-talk. In method 2900, at a step 2902, a first data bit of a character of a signal is conveyed through a first interconnect of the substantially parallel interconnects. At a step 2904, a second data bit of the character of the signal is conveyed through a second interconnect of the substantially parallel interconnects. At a step 2906, a control bit of the character of the signal is conveyed through a third interconnect of the substantially parallel interconnects. The third interconnect is positioned substantially between the first interconnect and the second interconnect.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A cross link multiplexer bus, comprising:
a plurality of cross link multiplexers, said plurality of cross link multiplexers having a destination port configured to receive a data signal and an origin port configured to produce said data signal; and
a plurality of interconnects, wherein a set of interconnects of said plurality of interconnects is coupled between a pair of adjacent cross link multiplexers of said plurality of cross link multiplexers;
wherein a first interconnect of said set of interconnects has a first length, a second interconnect of said set of interconnects has a second length, and said first length and said second length are substantially equal;
wherein said first interconnect is configured to convey a first bit of a number of bits of said data signal and said second interconnect is configured to convey a second bit of said number of bits of said data signal and said first bit remains substantially synchronized with said second bit.

2. The cross link multiplexer bus of claim 1, wherein said plurality of cross link multiplexers are arranged in a substantially circular configuration.

3. The cross link multiplexer bus of claim 1, wherein said plurality of cross link multiplexers are arranged in a substantially spherical configuration.

4. The cross link multiplexer bus of claim 1, wherein a cross link multiplexer of said plurality of cross link multiplexers comprises a cross link multiplexer pair.

5. The cross link multiplexer bus of claim 1, wherein:
said data signal is configured to be represented as a series of characters, and a character of said series of characters is configured to be represented as said number of bits.

6. A cross link multiplexer bus, comprising:
a plurality of cross link multiplexers, said plurality of cross link multiplexers having a destination port configured to receive a data signal, at least one delay buffer configured to delay conveyance of said data signal, and an origin port configured to produce said data signal; and
a plurality of interconnects, wherein a set of interconnects of said plurality of interconnects is coupled between a pair of adjacent cross link multiplexers of said plurality of cross link multiplexers;
wherein a first interconnect of said set of interconnects is configured to convey a first bit of a number of bits of said data signal and a second interconnect of said set of interconnects is configured to convey a second bit of said number of bits of said data signal and said first bit remains substantially synchronized with said second bit.

7. The cross link multiplexer of claim 6, wherein:
said data signal is configured to be represented as a series of characters, and a character of said series of characters is configured to be represented as said number of bits.

8. The cross link multiplexer bus of claim 6, wherein said at least one delay buffer is a series of delay buffers.

9. The cross link multiplexer bus of claim 8, wherein said series of delay buffers is configured to convey said first bit through said delay buffer and is configured to bypass said first bit around said delay buffer.

10. The cross link multiplexer bus of claim 9, wherein said cross link multiplexer has a control circuit, said control circuit configured to align said series of delay buffers to be configured to convey said first bit through said delay buffer or to bypass said first bit around said delay buffer.

11. The cross link multiplexer of claim 10, wherein said control circuit is configured to align said series of delay buffers so that said first bit remains substantially synchronized with said second bit.

12. A cross link multiplexer bus, comprising:
a plurality of cross link multiplexers, said plurality of cross link multiplexers having a first cross link multiplexer with a destination port configured to receive a data signal and a second cross link multiplexer with an origin port configured to produce said data signal; and
a plurality of interconnects, wherein a first set of interconnects of said plurality of interconnects is coupled between a pair of adjacent cross link multiplexers of said plurality of cross link multiplexers;
wherein a first interconnect of said first set of interconnects is configured to convey a first bit of a number of bits of said data signal in a first direction, a second interconnect of said first set of interconnects is configured to convey a second bit of said number of bits of said data signal in said first direction, and the first bit remains substantially synchronized with the second bit;
wherein said first cross link multiplexer is configured to convey said data signal toward said second cross link multiplexer in said first direction via said first set of interconnects coupled to a third cross link multiplexer of said plurality of cross link multiplexers and said first cross link multiplexer is configured to convey said data signal toward said second cross link multiplexer in a second direction via a second set of interconnects of said plurality of interconnects coupled other than to said third cross link multiplexer.

13. A cross link multiplexer bus, comprising:
a plurality of cross link multiplexers, said plurality of cross link multiplexers having a destination port configured to receive a data signal and an origin port configured to produce said data signal; and
a plurality of interconnects, wherein a set of interconnects of said plurality of interconnects is coupled between a pair of adjacent cross link multiplexers of said plurality of cross link multiplexers;
wherein said data signal is configured to be represented as a series of characters, and a character of said series of characters is configured to be represented as a number of bits;
wherein a first interconnect of said set of interconnects is configured to convey a first bit of said number of bits of said data signal in a direction and a second interconnect of said set of interconnects is configured to convey a second bit of said number of bits of said data signal in said direction;
wherein at least one of said plurality of cross link multiplexers and said plurality of interconnects is configured so that said first bit remains substantially synchronized with said second bit.

14. A cross link multiplexer bus, comprising:
a plurality of cross link multiplexers, said plurality of cross link multiplexers having a destination port configured to receive a signal and an origin port configured to produce said signal; and
a plurality of interconnects, wherein a set of interconnects of said plurality of interconnects is coupled between a pair of adjacent cross link multiplexers of said plurality of cross link multiplexers;
wherein said signal is configured to be represented as a series of characters, and a character of said series of characters is configured to be represented as a number of bits;
wherein at least one of said plurality of cross link multiplexers and said plurality of interconnects is configured so that a first bit of said number of bits, conveyed by a first interconnect of said plurality of interconnects, remains substantially synchronized with a second bit of said number of bits, conveyed by a second interconnect of said plurality of interconnects; and
wherein said plurality of cross link multiplexers is configured to delay conveyance of said first bit by a gate delay time;
wherein said plurality of interconnects is configured to delay conveyance of said second bit by a path delay time; and
wherein said gate delay time and said path delay time are set so that said first bit remains substantially synchronized with said second bit.

15. A cross link multiplexer bus, comprising:
a plurality of cross link multiplexers, said plurality of cross link multiplexers having a destination port configured to receive a signal and an origin port configured to produce said signal; and
a plurality of interconnects, wherein a set of interconnects of said plurality of interconnects is coupled between a pair of adjacent cross link multiplexers of said plurality of cross link multiplexers;
wherein said signal is configured to be represented as a series of characters, and a character of said series of characters is configured to be represented as a number of bits;
wherein at least one of said plurality of cross link multiplexers and said plurality of interconnects is configured so that a first bit of said number of bits, conveyed by a first interconnect of said plurality of interconnects, remains substantially synchronized with a second bit of said number of bits, conveyed by a second interconnect of said plurality of interconnects; and
wherein a first cross link multiplexer of said plurality of cross link multiplexers is configured to process said signal formatted according to a first physical layer communications protocol and a second cross link multiplexer of said plurality of cross link multiplexers is configured to process said signal formatted according to a second physical layer communications protocol.

16. The cross link multiplexer bus of claim 15, wherein said first physical layer communications protocol is a 10 Gigabit Media Independent Interface protocol.

17. The cross link multiplexer bus of claim 15, wherein said second physical layer communications protocol is a 10 Gigabit Attachment Unit Interface protocol.

18. The cross link multiplexer bus of claim 15, wherein said second physical layer communications protocol is a Converged Data Link protocol.

19. The cross link multiplexer bus of claim 15, wherein said first cross link multiplexer is configured to reformat said signal formatted according to said first physical layer communications protocol.

20. A method for conveying a data signal across a cross link multiplexer bus, comprising the steps of:

(1) conveying the data signal from a first cross link multiplexer of the cross link multiplexer bus via a second cross link multiplexer of the cross link multiplexer bus toward a third cross link multiplexer of the cross link multiplexer bus; and (2) conveying the data signal from the first cross link multiplexer other than via the second cross link multiplexer toward the third cross link multiplexer;

wherein a first interconnect of a plurality of interconnects is used to convey a first bit of the data signal from the first cross link multiplexer to the second cross link multiplexer, a second interconnect of the plurality of interconnects is used to convey a second bit of the data signal from the first cross link multiplexer to the second cross link multiplexer, and the first bit remains substantially synchronized with the second bit.

21. The method of claim 20, further comprising the step of:
(3) receiving the data signal at the first cross link multiplexer.

22. The method of claim 20, further comprising the step of:
(3) transmitting the data signal from the third cross link multiplexer.

23. A method for conveying, in parallel, bits of a character of a data signal across a cross link multiplexer bus, comprising the steps of:

(1) conveying a first bit of the bits of the character of the data signal from a first cross link multiplexer of the cross link multiplexer bus to a second cross link multiplexer of the cross link multiplexer bus, wherein a first interconnect of a plurality of interconnects is used to convey the first bit from the first cross link multiplexer to the second cross link multiplexer;

(2) conveying a second bit of the bits of the character of the data signal from the first cross link multiplexer to the second cross link multiplexer, wherein a second interconnect of the plurality of interconnects is used to convey the second bit from the first cross link multiplexer to the second cross link multiplexer; and (3) delaying said conveyance of the first bit so that the first bit remains substantially synchronized with the second bit.

24. The method of claim 23, wherein said delaying step comprises the step of conveying the first bit through a delay buffer.

25. A method for conveying a data signal across a cross link multiplexer bus, comprising the steps of:

(1) conveying the data signal from a first cross link multiplexer of the cross link multiplexer bus to a second cross link multiplexer of the cross link multiplexer bus, wherein a first interconnect of a plurality of interconnects is used to convey a first bit of the data signal from the first cross link multiplexer to the second cross link multiplexer and a second interconnect of the plurality of interconnects is used to convey a second bit of the data signal from the first cross link multiplexer to the second cross link multiplexer;

(2) at one of the first cross link multiplexer and the second cross link multiplexer, converting the data signal from a first format to a second format, wherein the first format is one of a 10 Gigabit Media Independent Interface protocol, a 10 Gigabit Attachment Unit Interface protocol, and a Converged Data Link protocol, the second format is one of the 10 Gigabit Media Independent Interface protocol, the 10 Gigabit Attachment Unit Interface protocol, and the Converged Data Link protocol, and the second format is different from the first format; and (3) synchronizing the first bit with the second bit.

26. The method of claim 25, further comprising the step of:
(4) receiving the data signal at the first cross link multiplexer.

27. The method of claim 25, further comprising the step of:
(4) reconverting the data signal from the second format to the first format.

28. The method of claim 25, further comprising the step of:
(4) transmitting the data signal from the second cross link multiplexer.

29. A method for conveying a data signal across a cross link multiplexer bus, comprising the steps of:

(1) conveying the data signal from a first cross link multiplexer of the cross link multiplexer bus to a second cross link multiplexer of the cross link multiplexer bus, wherein a first interconnect of a plurality of interconnects is used to convey a first bit of the data signal from the first cross link multiplexer to the second cross link multiplexer and a second interconnect of the plurality of interconnects is used to convey a second bit of the data signal from the first cross link multiplexer to the second cross link multiplexer;

(2) at one of the first cross link multiplexer and the second cross link multiplexer, converting the data signal from a first format to a second format; and conveying each of the first bit and the second bit through a corresponding delay flip-flop to synchronize the first bit with the second bit.

30. A method for conveying a data signal across a cross link multiplexer bus, comprising the steps of:

(1) conveying the data signal from a first cross link multiplexer of the cross link multiplexer bus to a second cross link multiplexer of the cross link multiplexer bus, wherein a first interconnect of a plurality of interconnects is used to convey a first bit of the data signal from the first cross link multiplexer to the second cross link multiplexer and a second interconnect of the plurality of interconnects is used to convey a second bit of the data signal from the first cross link multiplexer to the second cross link multiplexer;

(2) at one of the first cross link multiplexer and the second cross link multiplexer, converting the data signal from a first format to a second format, wherein the data signal is configured to be represented as a series of characters, a character of the series of characters is conveyed during one cycle of a clock that controls conveyance of the data signal, the first format has a first number of bits for data for a first character from the series of characters, the second format has a second number of bits for data for the first character and data for a second character from the series of characters, and the first number is different from the second number; and (3) synchronizing the first bit with the second bit.

31. The method of claim 30, wherein said converting step comprises the steps of:

(a) during a first cycle of the clock, conveying the first character from an input of a first interconnect to an output of the first interconnect;

(b) during the first cycle of the clock, conveying the first character from an input of a second interconnect to a delay flip-flop;

(c) during a second cycle of the clock, conveying the second character from the input of the first interconnect to the output of the first interconnect; and (d) during the second cycle of the clock, conveying the first character from the delay flip-flop to an output of the second interconnect.

32. In a cross link multiplexer bus configured to convey a data signal in which a character is represented by a first bit of the data signal and a second bit of the data signal, a method for synchronizing the first bit and the second bit, comprising the steps of:
- (1) determining a first time for the first bit of the data signal to be conveyed via a first interconnect from a first cross link multiplexer to a second cross link multiplexer when a first series of delay buffers is bypassed;
- (2) determining a second time for the second bit of the data signal to be conveyed via a second interconnect from the first cross link multiplexer to the second cross link multiplexer when a second series of delay buffers is bypassed, the second time greater than the first time;
- (3) determining a desired delay time for the first bit of the data signal so that the first bit of the data signal is synchronized with the second bit of the data signal; and
- (4) aligning the first series of delay buffers to increase the first time by the desired delay time so that the first bit of the data signal is synchronized with the second bit of the data signal.

33. The method of claim 32, wherein said aligning step comprises the step of configuring the first series of delay buffers so that the first bit of the data signal is conveyed through a first delay buffer of the first series of delay buffers.

34. In a cross link multiplexer bus configured to convey a data signal in which a character is represented by a first bit of the data signal and a second bit of the data signal, a method for synchronizing the first bit and the second bit, comprising the steps of:
- (1) determining a first time for the first bit of the data signal to be conveyed via a first interconnect from a first cross link multiplexer to a second cross link multiplexer when a first series of delay buffers is bypassed;
- (2) determining a second time for the second bit of the data signal to be conveyed via a second interconnect from the first cross link multiplexer to the second cross link multiplexer when a second series of delay buffers is bypassed, the second time greater than the first time;
- (3) determining a desired delay time for the first bit so that the first bit of the data signal is synchronized with the second bit of the data signal; and
- (4) aligning the first series of delay buffers to increase the first time by the desired delay time so that the first bit of the data signal is synchronized with the second bit of the data signal;

wherein said aligning step comprises the steps of:

configuring the first series of delay buffers so that the first bit of the data signal is conveyed through a first delay buffer of the first series of delay buffers; and configuring the first series of delay buffers so that the first bit of the data signal bypasses a second delay buffer of the first series of delay buffers.

* * * * *